US012432111B2

United States Patent
Smith et al.

(10) Patent No.: US 12,432,111 B2
(45) Date of Patent: Sep. 30, 2025

(54) SYSTEMS, APPARATUS, AND METHODS FOR DATA RESILIENCY IN AN EDGE NETWORK ENVIRONMENT

(71) Applicant: Intel Corporation, Santa Clara, CA (US)

(72) Inventors: Ned Smith, Beaverton, OR (US); Nageen Himayat, Fremont, CA (US); Srikathyayani Srikanteswara, Portland, OR (US); Kshitij Doshi, Tempe, AZ (US); Francesc Guim Bernat, Barcelona (ES); Satish Jha, Portland, OR (US); Vesh Raj Sharma Banjade, Portland, OR (US); S M Iftekharul Alam, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 836 days.

(21) Appl. No.: 17/485,366

(22) Filed: Sep. 25, 2021

(65) Prior Publication Data

US 2022/0014423 A1 Jan. 13, 2022

(51) Int. Cl.
*H04L 41/0806* (2022.01)
*H04L 41/0604* (2022.01)
(Continued)

(52) U.S. Cl.
CPC ...... *H04L 41/0806* (2013.01); *H04L 41/0627* (2013.01); *H04L 41/0654* (2013.01);
(Continued)

(58) Field of Classification Search
CPC . H04L 41/0627; H04L 41/0654; H04L 41/08; H04L 41/0806; H04L 41/0894;
(Continued)

(56) References Cited

U.S. PATENT DOCUMENTS 7,171,471 B1 1/2007 Nair
8,656,189 B2 2/2014 Orsini et al.
(Continued)

FOREIGN PATENT DOCUMENTS

WO 2018/144060 8/2018

OTHER PUBLICATIONS

European Patent Office, "Communication under Rule 71(3) EPC—Intention to Grant," issued in connection with European Patent Application No. 22 191 530.9-1215, dated May 10, 2024, 110 pages.

(Continued)

*Primary Examiner* — Jason D Recek
(74) *Attorney, Agent, or Firm* — Hanley, Flight & Zimmerman, LLC

(57) ABSTRACT

Methods, apparatus, systems, and articles of manufacture are disclosed for data resiliency in an edge network environment. An example apparatus includes at least one memory, instructions in the apparatus, and processor circuitry to at least one of execute and/or instantiate the instructions to generate spectrum metadata based on spectrum data, determine a resiliency operation based on one or more resiliency requirements, generate a resiliency policy based on at least one of the resiliency operation or the one or more resiliency requirements, generate a resiliency operation map based on at least one of the resiliency policy or first identifiers of respective workloads associated with the network environment, the first identifiers including a second identifier, and, in response to identifying a FAFO event associated with the second identifier, execute the resiliency operation based on mapping the second identifier to the resiliency operation in the resiliency operation map.

20 Claims, 21 Drawing Sheets

(51) Int. Cl.
*H04L 41/0654* (2022.01)
*H04L 41/08* (2022.01)
*H04L 41/0894* (2022.01)
*H04L 41/0895* (2022.01)
*H04L 41/40* (2022.01)
*H04L 43/08* (2022.01)
*H04L 67/10* (2022.01)
*H04L 67/1008* (2022.01)
*H04L 67/1095* (2022.01)
*H04L 67/12* (2022.01)
*H04L 67/561* (2022.01)
*H04L 41/147* (2022.01)
*H04L 41/149* (2022.01)

(52) U.S. Cl.
CPC .......... *H04L 41/08* (2013.01); *H04L 41/0894* (2022.05); *H04L 41/0895* (2022.05); *H04L 41/40* (2022.05); *H04L 43/08* (2013.01); *H04L 67/10* (2013.01); *H04L 67/1008* (2013.01); *H04L 67/1095* (2013.01); *H04L 67/12* (2013.01); *H04L 67/561* (2022.05); *H04L 41/147* (2013.01); *H04L 41/149* (2022.05)

(58) Field of Classification Search
CPC . H04L 41/0895; H04L 41/145; H04L 41/147; H04L 41/149; H04L 41/16; H04L 41/40; H04L 41/5019; H04L 43/08; H04L 67/10; H04L 67/1008; H04L 67/1095; H04L 67/12; H04L 67/52; H04L 67/55; H04L 67/566; H04L 67/61; H04L 69/40; H04L 67/561

See application file for complete search history.

(56) References Cited

U.S. PATENT DOCUMENTS

| | | |
|---|---|---|
| 10,348,574 B2 | 7/2019 | Kulkarni et al. |
| 10,440,096 B2 | 10/2019 | Sabella et al. |
| 2017/0006135 A1* | 1/2017 | Siebel ............... H04L 69/40 |
| 2017/0251368 A1 | 8/2017 | Ross et al. |
| 2018/0189081 A1 | 7/2018 | Upasani et al. |
| 2019/0243685 A1 | 8/2019 | Guim Bernat et al. |
| 2019/0260787 A1* | 8/2019 | Zou .................... G06N 3/08 |
| 2019/0394081 A1 | 12/2019 | Tahhan et al. |
| 2020/0134207 A1 | 4/2020 | Doshi et al. |
| 2020/0236085 A1* | 7/2020 | Spurlock ............ G06F 11/3409 |
| 2021/0232607 A1* | 7/2021 | Heyrani-Nobari ...... G06F 16/26 |
| 2023/0044961 A1* | 2/2023 | Resnick .............. G06F 3/017 |

OTHER PUBLICATIONS

European Telecommunications Standards Institute (ETSI), "Network Functions Virtualisation (NFV); Resiliency Requirements," Group Specification, Jan. 1, 2015, 82 pages.

European Patent Office, "Extended European Search Report," issued in connection with European Patent Application No. 22191530.9, Feb. 8, 2023, 10 pages.

* cited by examiner

SYSTEMS, APPARATUS, AND METHODS FOR DATA RESILIENCY IN AN EDGE NETWORK ENVIRONMENT

FIELD OF THE DISCLOSURE

This disclosure relates generally to edge network environments and, more particularly, to systems, apparatus, and methods for data resiliency in an edge network environment.

BACKGROUND

Edge network environments (e.g., an Edge, Fog, multi-access edge computing (MEC), or Internet of Things (IoT) network) enable a workload execution (e.g., an execution of one or more computing tasks, an execution of a machine learning model using input data, etc.) near endpoint devices that request an execution of the workload. Edge network environments may include infrastructure, such as an edge service, that is connected to cloud infrastructure, endpoint devices, or additional edge infrastructure via networks such as the Internet. Edge services may be closer in proximity to endpoint devices than cloud infrastructure, such as centralized servers.

DETAILED DESCRIPTION

Figure 1:
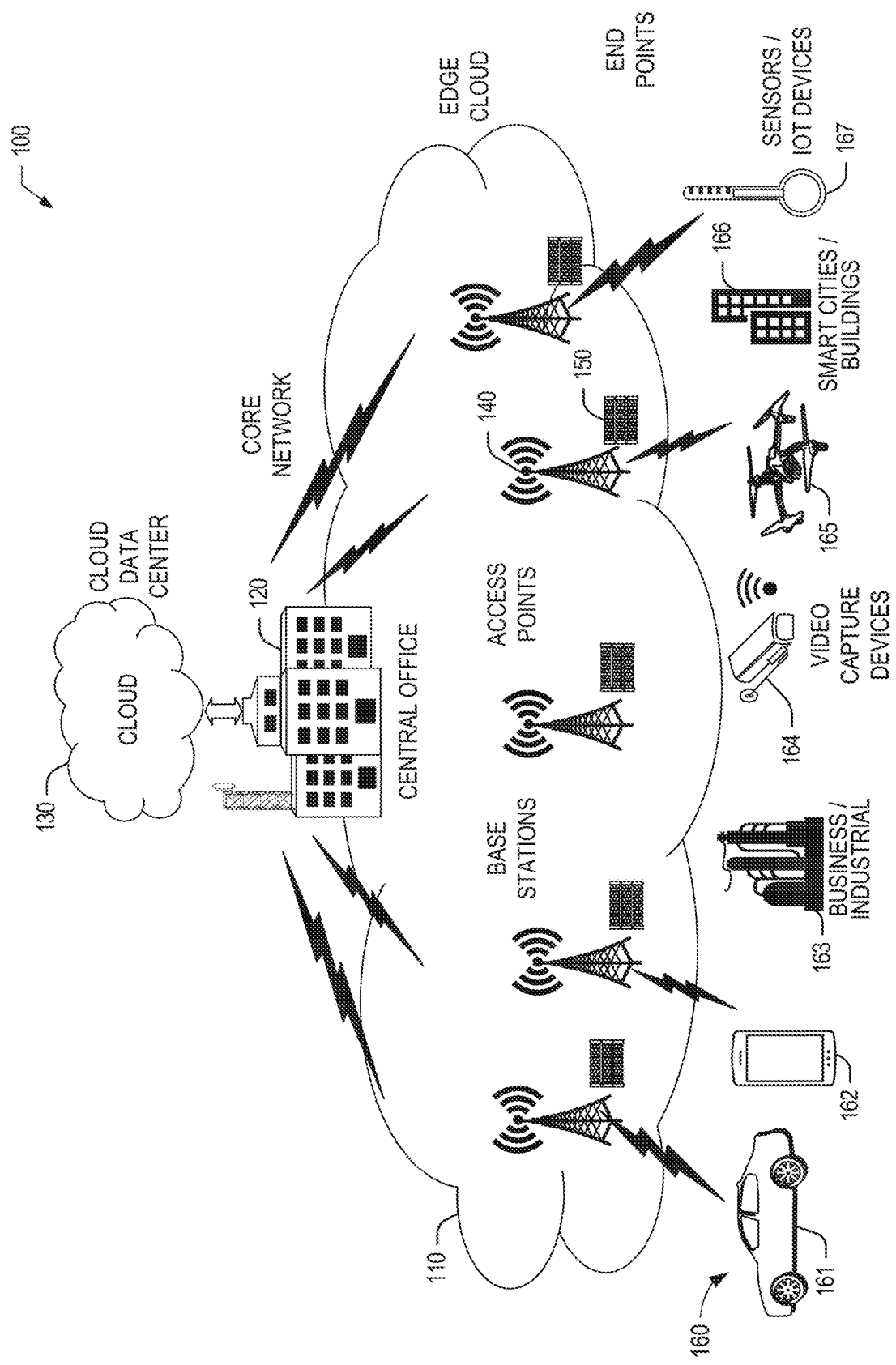
FIG. 1 illustrates an overview of an example edge cloud configuration for edge computing that may implement the examples disclosed herein.

The figures are not to scale. In general, the same reference numbers will be used throughout the drawing(s) and accompanying written description to refer to the same or like parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein "substantially real time" refers to occurrence in a near instantaneous manner recognizing there may be real world delays for computing time, transmission, etc. Thus, unless otherwise specified, "substantially real time" refers to real time+/−1 second. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s). In some examples, processor circuitry may instantiate instructions by configuring portion(s) of the processor circuitry to execute operation(s) that correspond to the instructions. In some examples, processor circuitry may instantiate instructions by execution operation(s) that correspond to the instructions. In some examples, processor circuitry that implements a network device (e.g., a network interface card (NIC), a smart NIC, interface circuitry, an Infrastructure Processing Unit (IPU), etc.) may instantiate instructions by executing a first partial operation, a first portion of one or more operations, etc., with a second partial operation, a second portion of the one or more operations, etc., to be executed at a different time. In some such examples, the processor circuitry may not complete the one or more operations in full to instantiate the instructions.

Effectuating data management, data recovery (also known as disaster recovery), and data resiliency in network environments is a complex and substantial undertaking. In some instances when effectuating data recovery, maintaining redundant copies of voluminous data invokes multiple trade-off costs along multiple vectors such as consistency, cost, latency, and/or throughput. In some network environments, only the most valuable data is protected from Fault-Attack-Failure-Outage (FAFO) events and lesser valued data is at high risk given occurrences of FAFO events. Advantageously, examples disclosed herein transform and/or otherwise improve typical steep-function trade-off curve (e.g., data is either protected or not protected) to a gradual trade-off curve where data may be recovered and/or reconstructed.

Examples disclosed herein include systems, apparatus, and methods for data resiliency in a network environment (e.g., an edge network environment, or a network environment at the edge). In some disclosed examples, data resiliency may be implemented by recovering and/or reconstructing data in various forms of data abstraction. For example, content, data, etc., may exist in six layers of abstraction (e.g., data abstraction) that range from abstract (e.g., data abstraction layer 1 (L1)) to an individual copy (e.g., data abstraction layer 6 (L6)) of the content, data, etc. In some such examples, the intermediate layers of data abstraction may represent content, data, etc., based on varying objectives for how the content, data, etc., is/are used. In some examples, the individual copy may implement the data and the intermediate layers of data abstraction may implement metadata based on the data. As used herein, the term "metadata" refers to a set of data that describes and gives information about other data. For example, real-time audio may be data and a bitstream based on the real-time audio may be metadata.

In some disclosed examples, the six layers of abstraction may be defined as Layer 1 (L1) abstraction creation, Layer 2 (L2) semantic field, Layer 3 (L3) generic manifestation, Layer 4 (L4) format specific manifestation, Layer 5 (L5) exact digital manifestation, and Layer 6 (L6) individual copy. In some disclosed examples, data/information in the L1 data abstraction may be referred to herein as Type-1 data or Type-1 metadata. In some disclosed examples, data/information in the L2 data abstraction may be referred to herein as Type-2 data or Type-2 metadata. In some disclosed examples, data/information in the L3 data abstraction may be referred to herein as Type-3 data or Type-3 metadata. In some disclosed examples, data/information in the L4 data abstraction may be referred to herein as Type-4 data or Type-5 metadata. In some disclosed examples, data/information in the L5 data abstraction may be referred to herein as Type-5 data or Type-6 metadata. In some disclosed examples, data/information in the L6 data abstraction may be referred to herein as Type-6 data.

In some disclosed examples, information represented by the L6 data abstraction may be implemented by a copy of the actual data object, which may be audio (e.g., real-time audio), video (e.g., real-time video or real-time capture of a scene), or other data stored on a physical medium. In some disclosed examples, information represented by the L5 data abstraction may be implemented by a digital manifestation (e.g., an exact or substantially similar digital manifestation) of the data object and thereby constitute metadata of the data object. For example, the digital manifestation of a data object may be implemented by information represented as a digitization of an analog representation. In some such examples, the digital manifestation may be implemented by a bitstream (e.g., an image, video, bitmap, etc.). In some such examples, similarities (e.g., similarities determined by a similarity hash function) between L5 data items may be based on a checksum, which may be generated by a cryptographic hash that produces different outputs even if there are slight differences in the data sets.

In some disclosed examples, information represented by the L4 data abstraction may be implemented by a format specific manifestation such as according to an encoding or format and thereby constitute metadata. For example, data may be compressed, encoded, rendered, etc., according to algorithm(s) that may pre-process and/or post-process data. In some such examples, similarities (e.g., similarities determined by a similarity hash function) between L4 data items may be based on the raw format and rendering functions applied. For example, data depth (e.g., pixel depth) may differ without noticeable differences in the result.

In some disclosed examples, information represented by the L3 data abstraction may be implemented by a generic manifestation and thereby constitute metadata. For example, information is perceptual based on how the information is observed. In some such examples, Artificial Intelligence/Machine Learning (AI/ML) models may be trained to perceive a particular manifestation of the data. For example, an AI/ML model that implements facial recognition techniques may perceive the data according to a database of unique individuals, while an AI/ML model that implements feature recognition may categorize the data according to age, gender, species, etc. In some such examples, similarities (e.g., similarities determined by a similarity hash function) between L3 data items may be based on the process that observes (e.g., AI/ML training). For example, a K-nearest neighbor (KNN) based classifier may be considered to provide the ground truth or true sub-optimal estimate for training a multi-layer DNN for establishing a trained model. This trained model would then be updated (e.g., the SoftMax layer or a penultimate layer over time and with more data available periodically to capture the classification Dynamics).

In some disclosed examples, information represented by the L2 data abstraction may be implemented by a semantic field and thereby constitute metadata. In some such disclosed examples, the information may be represented in a semantic model or metadata in which semantic vectors may describe content of the data without actual data. For example, information represented by the L2 data abstraction may be implemented by ontology, taxonomy, tag value(s), etc. In some such disclosed examples, similarities (e.g., similarities determined by a similarity hash function) between L2 data items may be based on a similarity of the metadata. In some disclosed examples, information represented by the L1 data abstraction may be implemented by an abstract creation in which information may be represented symbolically (e.g., written language) and thereby constitute metadata. In some such disclosed examples, similarities (e.g., similarities determined by a similarity hash function) between L1 data items may be based on a similarity of the symbols.

In some disclosed examples, a resilient control network (RCN) (e.g., an RCN implemented by hardware, firmware, and/or software) may effectuate data resiliency in a network environment by generating, managing, and/or enforcing a resiliency policy on spectrum data. As used herein, "spectrum data" refers to a data item or portion of data that is expressed in a spectrum of abstraction over the data item or the portion of data. For example, spectrum data may be implemented by information represented in one of the layers of abstraction as described above. In some such examples, information represented by the L1 data abstraction, the L2 data abstraction, etc., is and/or otherwise implements spectrum data. In some examples, a portion of data may refer to data granularity and resolution (e.g., pixel depth) or to data context and/or metadata. In some such examples, the various types of data in spectrum data (e.g., audio, video, text, etc., in a digital media object) may be referred to as metadata.

In some disclosed examples, the RCN may employ the resiliency policy to preserve (e.g., protect) and/or recover data using resiliency operations, techniques, etc., as disclosed herein that are tailored and/or otherwise correspond to the specific data abstraction layer. For example, the RCN may protect and/or recover data represented by the L2 data abstraction using one or more resiliency operations that correspond to the L2 data abstraction. In some disclosed examples, the RCN may effectuate the resiliency policy by executing a recovery operation, a reconstruction operation, or an inference operation. For example, the RCN may execute the recovery operation by retrieving a copy of the data, or portion(s) thereof, stored in a datastore, a data repository, a database, etc. In some disclosed examples, the RCN may execute the reconstruction operation by reconstructing the data (e.g., the spectrum data) based on metadata (e.g., spectrum metadata) associated with the data. For example, the RCN may identify information represented by the L2 data abstraction (also referred to as type-2 data or type-2 spectrum data) based on a pathname associated with the information through an ontology where the ontology is well-known. In some such examples, the RCN may reconstruct the data by following a path via the pathname through the ontology. In some disclosed examples, the RCN may reconstruct type-1 data based on a uniform resource identifier (URI) or universally unique identifier (UUID). Advantageously, recovery and/or reconstruction operations for other types of data is disclosed herein.

In some disclosed examples, for resilient data pools to be managed, data identifiers that are specific to its respective abstract spectrum type may be used. For example, data may be rendered for different data types and assigned with corresponding identifiers. In some examples, a technique to determine an identifier for Type-2 spectrum data may include walking a standard ontology or taxonomy graph, which may result in a path through the graph. In some such examples, each node in the graph has a unique identifier (e.g., a UUID) that is concatenated into a pathname. The pathname identifies the content. In some examples, the pathname may be the identifier for the Type-2 spectrum data.

Examples disclosed herein include applying an appropriate resiliency policy for each spectrum data type to optimize and/or otherwise improve durability in the event of a network and/or system failure. For example, Type-2 data is small (relative to the other representations) that can be communicated quickly into core networks and replicated across multiple data repositories or within many router nodes of an Information-Centric Network (ICN) or a Named Data Networking (NDN). Type-5/6 data are large (relative to Type-2) and cannot quickly be migrated into core network data pools. These may achieve localized replication at an endpoint, base station, etc., or may target namespace (NS) nodes that have high-speed communication channels to data repository service(s). Using an ICN, chunks of the Type-5/6 data could migrate back out to access networks and to endpoint nodes based on interest. When a FAFO event occurs, Type-2 data may be first to be recovered using available Resiliency Control Networks (RCN) as RCNs may be the first to recover (or may be unlikely to be affected by FAFO events). Type-5 data may take longer to be recovered as these may require full recovery of the network before resources can be allocated to access data replication pools—assuming they survived the FAFO event.

In some disclosed examples, the creation of a dedicated name (e.g., "recovery") in a field in an NDN packet where the data is sent back returned even if incomplete or partially corrupted. Normally such data would not be sent back in response to an interest packet. In some such disclosed examples, if multiple recovery strategies are employed, each strategy may return data (either corrupt or not). Examples disclosed herein may use data from other strategies (e.g., resiliency strategies) to reconstruct corrupted data.

In some disclosed examples, even if Type-5 data does not survive FAFO events, there is a possibility data can be reconstructed from one of the other types. For example, a Type-4 representation could apply re-rendering functions, or a combination of Type-2 and Type-3 data could be inferred with AI/ML (e.g., a DNN-based inference with a generative network capable of synthetically generating missing data) to produce a synthetic version of the Type-5 data. Examples disclosed herein may train AI/ML model(s) for all the abstract types so that regardless of which form a user selects for resiliency protection, the trained AI/ML model(s) may accommodate automation at whatever level of service level agreement (SLA) is chosen.

Advantageously with AI/ML techniques as disclosed herein, a hierarchy of reconstruction possibilities may be implemented. For example, a generative model capturing the essential characteristic of the data may be stored and the data may be generated synthetically. Advantageously, the AI/ML model(s) for predictions may be stored instead of the predictions to reduce data storage requirements. The AI/ML model(s) may be compressed and reconstructed via decompression upon failure (e.g., a FAFO event). In some disclosed examples, sketching techniques may be utilized to store data in a compressed form that may later be used to re-train the AI/ML model(s) without the need to store large datasets.

In some disclosed examples, in addition to replication, data or AI/ML models may also be stored in a distributed manner with appropriate redundancy based on data hierarchy and the level of resilience required. AI/ML models may also be stored in a split manner, wherein earlier layers may be brought up quickly to provide coarse inference, while the whole model may take longer. Examples disclosed herein consider other aspects, factors, etc., to resiliency policy, such as the relative importance of original/raw data, popularity/demand of data, load on the network for resiliency decision based on small or huge amount of various data need resiliency, etc. These factors may be used to select optimal and/or otherwise improved selection of spectrum data types to be focused for spectrum data of interest to process.

Turning to the figures, FIG. 1 is a block diagram 100 showing an overview of a configuration for edge computing, which includes a layer of processing referred to in many of the following examples as an "edge cloud". As shown, the edge cloud 110 is co-located at an edge location, such as an access point or base station 140, a local processing hub 150, or a central office 120, and thus may include multiple entities, devices, and equipment instances. The edge cloud 110 is located much closer to the endpoint (consumer and producer) data sources 160 (e.g., autonomous vehicles 161, user equipment 162, business and industrial equipment 163, video capture devices 164, drones 165, smart cities and building devices 166, sensors and Internet-of-Things (IoT) devices 167, etc.) than the cloud data center 130. Compute, memory, and storage resources that are offered at the edges in the edge cloud 110 are critical to providing ultra-low latency response times for services and functions used by the endpoint data sources 160 as well as reduce network backhaul traffic from the edge cloud 110 toward cloud data center 130 thus improving energy consumption and overall network usages among other benefits.

In some examples, the central office 120, the cloud data center 130, and/or portion(s) thereof, may implement one or more location engines that locate and/or otherwise identify positions of devices of the endpoint (consumer and producer) data sources 160 (e.g., autonomous vehicles 161, user equipment 162, business and industrial equipment 163, video capture devices 164, drones 165, smart cities and building devices 166, sensors and Internet-of-Things (IoT) devices 167, etc.). In some such examples, the central office 120, the cloud data center 130, and/or portion(s) thereof, may implement one or more location engines to execute location detection operations with improved accuracy.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

In contrast to the network architecture of FIG. 1, traditional endpoint (e.g., UE, vehicle-to-vehicle (V2V), vehicle-to-everything (V2X), etc.) applications are reliant on local device or remote cloud data storage and processing to exchange and coordinate information. A cloud data arrangement allows for long-term data collection and storage, but is not optimal for highly time varying data, such as a collision, traffic light change, etc. and may fail in attempting to meet latency challenges.

Depending on the real-time requirements in a communications context, a hierarchical structure of data processing and storage nodes may be defined in an edge computing deployment. For example, such a deployment may include local ultra-low-latency processing, regional storage and processing as well as remote cloud data-center based storage and processing. Key performance indicators (KPIs) may be used to identify where sensor data is best transferred and where it is processed or stored. This typically depends on the ISO layer dependency of the data. For example, lower layer (PHY, MAC, routing, etc.) data typically changes quickly and is better handled locally in order to meet latency requirements. Higher layer data such as Application Layer data is typically less time critical and may be stored and processed in a remote cloud data-center. At a more generic level, an edge computing system may be described to encompass any number of deployments operating in the edge cloud 110, which provide coordination from client and distributed computing devices.

Figure 2:
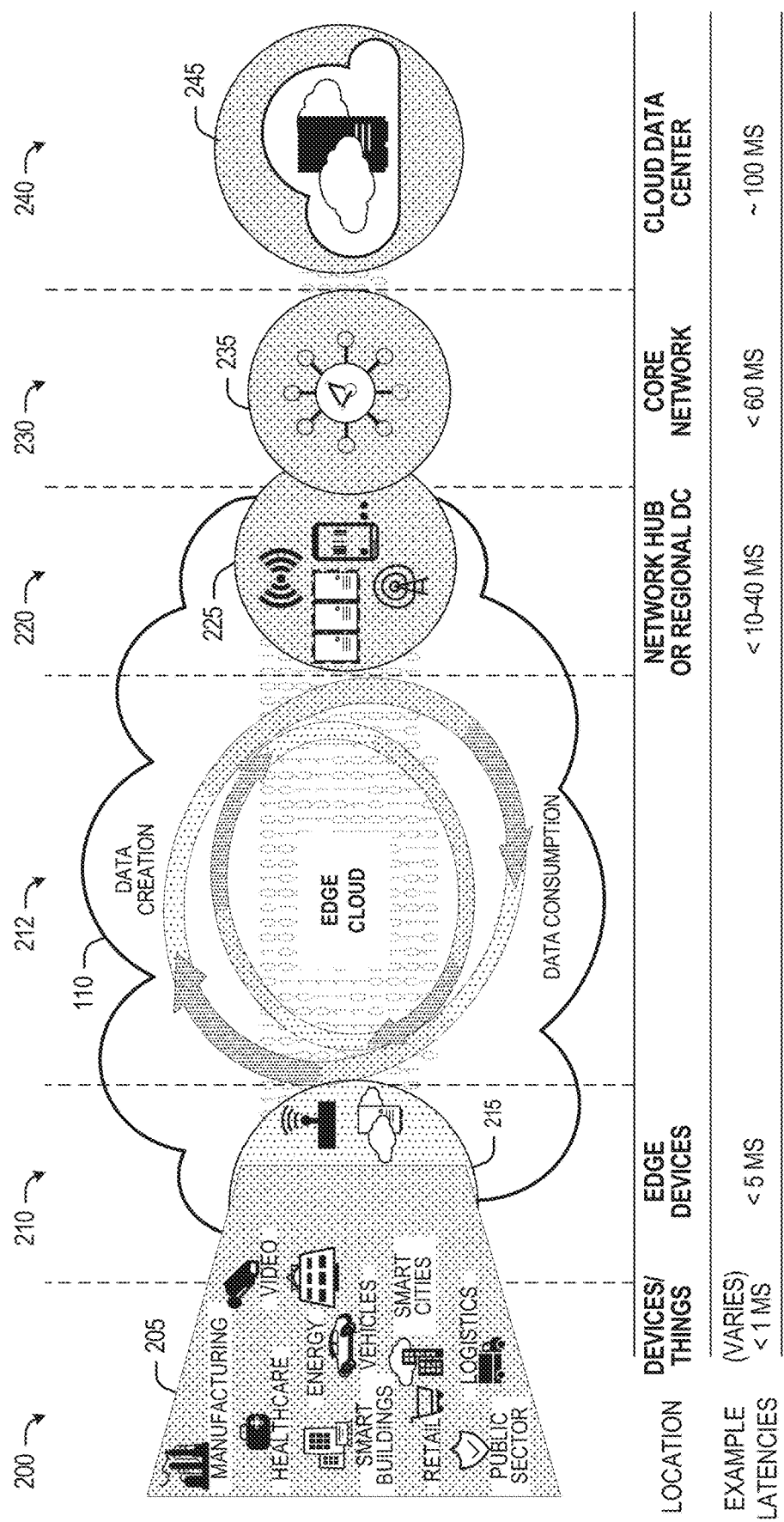
FIG. 2 illustrates operational layers among example endpoints, an example edge cloud, and example cloud computing environments that may implement the examples disclosed herein.

FIG. 2 illustrates operational layers among endpoints, an edge cloud, and cloud computing environments. Specifically, FIG. 2 depicts examples of computational use cases 205, utilizing the edge cloud 110 of FIG. 1 among multiple illustrative layers of network computing. The layers begin at an endpoint (devices and things) layer 200, which accesses the edge cloud 110 to conduct data creation, analysis, and data consumption activities. The edge cloud 110 may span multiple network layers, such as an edge devices layer 210 having gateways, on-premise servers, or network equipment (nodes 215) located in physically proximate edge systems; a network access layer 220, encompassing base stations, radio processing units, network hubs, regional data centers (DC), or local network equipment (equipment 225); and any equipment, devices, or nodes located therebetween (in layer 212, not illustrated in detail). The network communications within the edge cloud 110 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 200, under 5 ms at the edge devices layer 210, to even between 10 to 40 ms when communicating with nodes at the network access layer 220. Beyond the edge cloud 110 are core network 230 and cloud data center 232 layers, each with increasing latency (e.g., between 50-60 ms at the core network layer 230, to 100 or more ms at the cloud data center layer 240). As a result, operations at a core network data center 235 or a cloud data center 245, with latencies of at least 50 to 100 ms or more, will not be able to accomplish many time-critical functions of the use cases 205. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 235 or a cloud data center 245, a central office or content data network may be considered as being located within a "near edge" layer ("near" to the cloud, having high latency values when communicating with the devices and endpoints of the use cases 205), whereas an access point, base station, on-premise server, or network gateway may be considered as located within a "far edge" layer ("far" from the cloud, having low latency values when communicating with the devices and endpoints of the use cases 205). It will be understood that other categorizations of a particular network layer as constituting a "close", "local", "near", "middle", or "far" edge may be based on latency, distance, number of network hops, or other measurable characteristics, as measured from a source in any of the network layers 200-240.

The various use cases 205 may access resources under usage pressure from incoming streams, due to multiple services utilizing the edge cloud. For example, location detection of devices associated with such incoming streams of the various use cases 205 is desired and may be achieved with example location engines as described herein. To achieve results with low latency, the services executed within the edge cloud 110 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to service level agreement (SLA), the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 110 may provide the ability to serve and respond to multiple applications of the use cases 205 (e.g., object tracking, location detection, video surveillance, connected cars, etc.) in real-time or near real-time, and meet ultra-low latency requirements for these multiple applications. These advantages enable a whole new class of applications (VNFs), Function-as-a-Service (FaaS), Edge-as-a-Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 110 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 110 (network layers 210-230), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

In some examples, nodes, such as edge gateway nodes and/or edge switch nodes, \may instantiate instructions by configuring portion(s) of the nodes to execute operation(s) that correspond to the instructions. In some examples, nodes may instantiate instructions by execution operation(s) that correspond to the instructions. In some examples, nodes that implement a network device may instantiate instructions by executing a first partial operation, a first portion of one or more operations, etc., with a second partial operation, a second portion of the one or more operations, etc., to be executed at a different time. In some such examples, the nodes may not complete the one or more operations in full to instantiate the instructions.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 110.

As such, the edge cloud 110 is formed from network components and functional features operated by and within edge gateway nodes, edge aggregation nodes, or other edge compute nodes among network layers 210-230. The edge cloud 110 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 110 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 110 may be servers, multi-tenant servers, appliance computing devices, and/or any other type of computing devices. For example, the edge cloud 110 may include an appliance computing device that is a self-contained electronic device including a housing, a chassis, a case or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, light emitting diodes (LEDs), speakers, I/O ports (e.g., universal serial bus (USB)), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include IoT devices. The appliance computing device may include hardware and software components to manage local issues such as device temperature, vibration, resource utilization, updates, power issues, physical and network security, etc. The example processor systems of at least FIGS. 30, 31, 32, and/or 33 illustrate example hardware for implementing an appliance computing device. The edge cloud 110 may also include one or more servers and/or one or more multi-tenant servers. Such a server may include an operating system and a virtual computing environment. A virtual computing environment may include a hypervisor managing (spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figure 3:
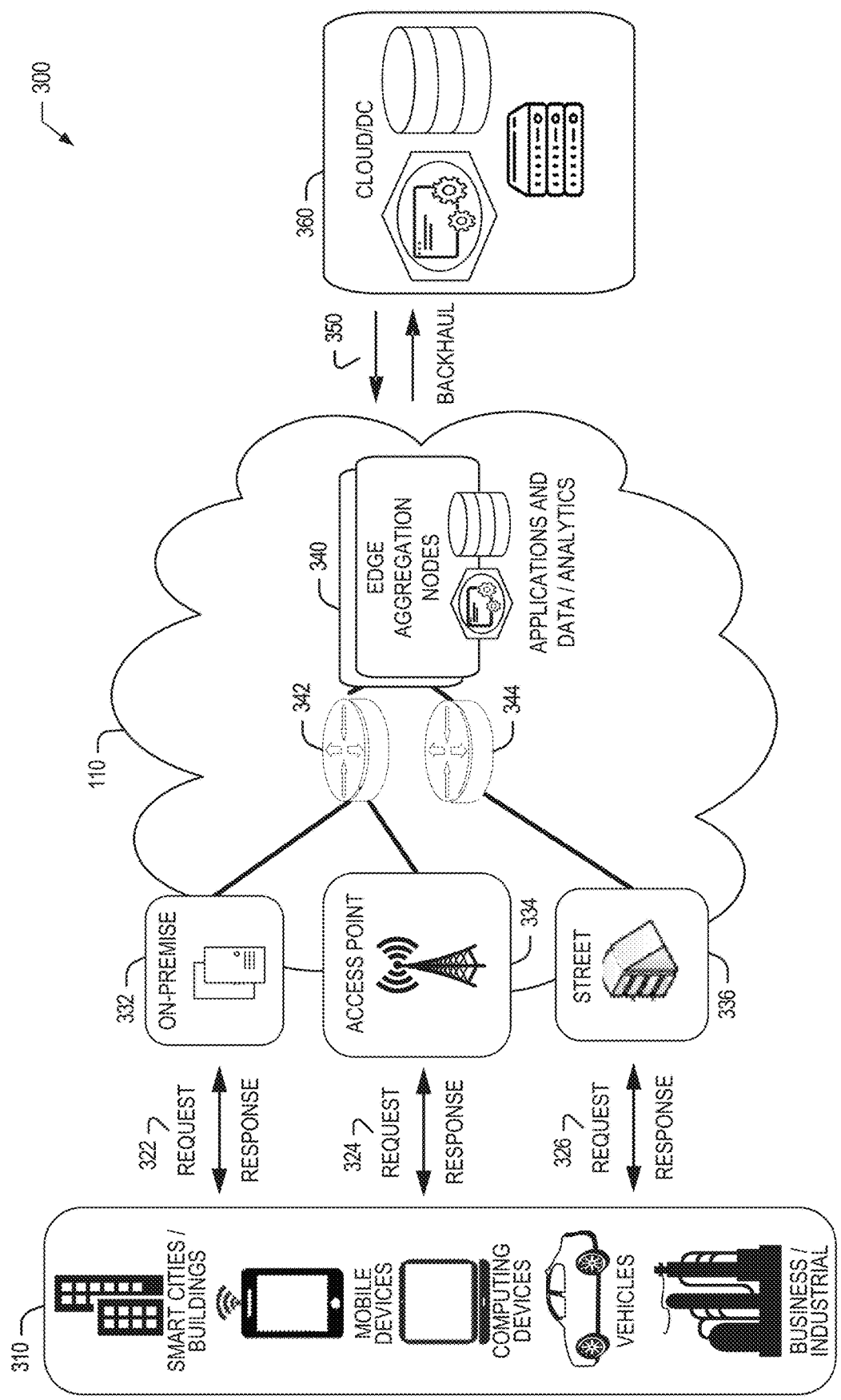
FIG. 3 illustrates an example approach for networking and services in an edge computing system that may implement the examples disclosed herein.

In FIG. 3, various client endpoints 310 (in the form of mobile devices, computers, autonomous vehicles, business computing equipment, industrial processing equipment) exchange requests and responses that are specific to the type of endpoint network aggregation. For instance, client endpoints 310 may obtain network access via a wired broadband network, by exchanging requests and responses 322 through an on-premise network system 332. Some client endpoints 310, such as mobile computing devices, may obtain network access via a wireless broadband network, by exchanging requests and responses 324 through an access point (e.g., cellular network tower) 334. Some client endpoints 310, such as autonomous vehicles may obtain network access for requests and responses 326 via a wireless vehicular network through a street-located network system 336. However, regardless of the type of network access, the TSP may deploy aggregation points 342, 344 within the edge cloud 110 of FIG. 1 to aggregate traffic and requests. Thus, within the edge cloud 110, the TSP may deploy various compute and storage resources, such as at edge aggregation nodes 340, to provide requested content. The edge aggregation nodes 340 and other systems of the edge cloud 110 are connected to a cloud or data center (DC) 360, which uses a backhaul network 350 to fulfill higher-latency requests from a cloud/data center for websites, applications, database servers, etc. Additional or consolidated instances of the edge aggregation nodes 340 and the aggregation points 342, 344, including those deployed on a single server framework, may also be present within the edge cloud 110 or other areas of the TSP infrastructure. Advantageously, example location engines as described herein may detect and/or otherwise determine locations of the client endpoints 310 with improved performance and accuracy and reduced latency.

Figure 4:
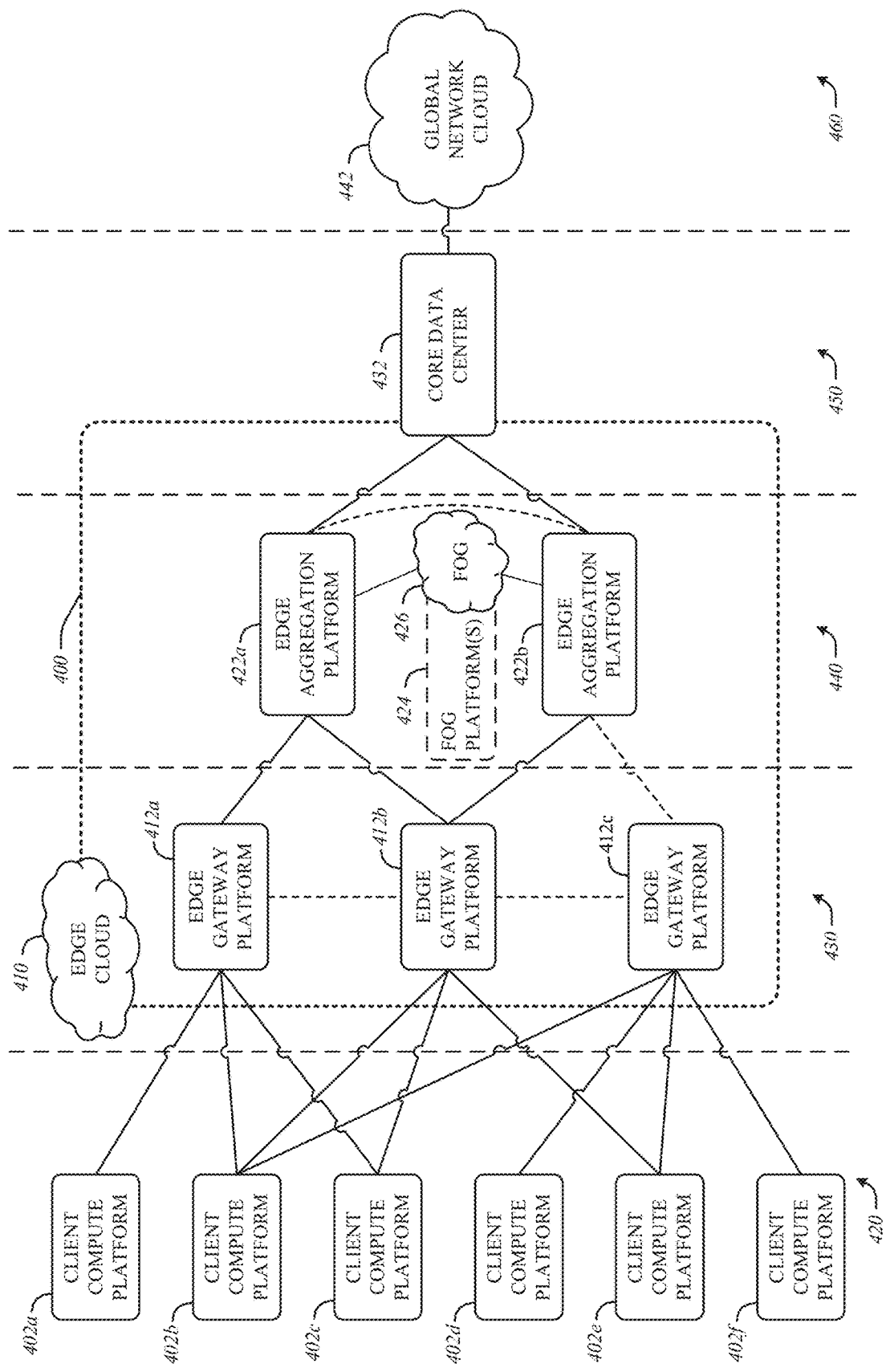
FIG. 4 depicts an example edge computing system for providing edge services and applications to multi-stakeholder entities, as distributed among one or more client compute platforms, one or more edge gateway platforms, one or more edge aggregation platforms, one or more core data centers, and a global network cloud, as distributed across layers of the edge computing system.

FIG. 4 depicts an example edge computing system 400 for providing edge services and applications to multi-stakeholder entities, as distributed among one or more client compute platforms 402, one or more edge gateway platforms 412, one or more edge aggregation platforms 422, one or more core data centers 432, and a global network cloud 442, as distributed across layers of the edge computing system 400. The implementation of the edge computing system 400 may be provided at or on behalf of a telecommunication service provider ("telco", or "TSP"), internet-of-things service provider, cloud service provider (CSP), enterprise entity, or any other number of entities. Various implementations and configurations of the edge computing system 400 may be provided dynamically, such as when orchestrated to meet service objectives.

Individual platforms or devices of the edge computing system 400 are located at a particular layer corresponding to layers 420, 430, 440, 450, and 460. For example, the client compute platforms 402a, 402b, 402c, 402d, 402e, 402f are located at an endpoint layer 420, while the edge gateway platforms 412a, 412b, 412c are located at an edge devices layer 430 (local level) of the edge computing system 400. Additionally, the edge aggregation platforms 422a, 422b (and/or fog platform(s) 424, if arranged or operated with or among a fog networking configuration 426) are located at a network access layer 440 (an intermediate level). Fog computing (or "fogging") generally refers to extensions of cloud computing to the edge of an enterprise's network or to the ability to manage transactions across the cloud/edge landscape, typically in a coordinated distributed or multi-node network. Some forms of fog computing provide the deployment of compute, storage, and networking services between end devices and cloud computing data centers, on behalf of the cloud computing locations. Some forms of fog computing also provide the ability to manage the workload/workflow level services, in terms of the overall transaction, by pushing certain workloads to the edge or to the cloud based on the ability to fulfill the overall service level agreement.

Fog computing in many scenarios provides a decentralized architecture and serves as an extension to cloud computing by collaborating with one or more edge node devices, providing the subsequent amount of localized control, configuration and management, and much more for end devices. Furthermore, fog computing provides the ability for edge resources to identify similar resources and collaborate to create an edge-local cloud which can be used solely or in conjunction with cloud computing to complete computing, storage or connectivity related services. Fog computing may also allow the cloud-based services to expand their reach to the edge of a network of devices to offer local and quicker accessibility to edge devices. Thus, some forms of fog computing provide operations that are consistent with edge computing as discussed herein; the edge computing aspects discussed herein are also applicable to fog networks, fogging, and fog configurations. Further, aspects of the edge computing systems discussed herein may be configured as a fog, or aspects of a fog may be integrated into an edge computing architecture.

The core data center 432 is located at a core network layer 450 (a regional or geographically central level), while the global network cloud 442 is located at a cloud data center layer 460 (a national or world-wide layer). The use of "core" is provided as a term for a centralized network location—deeper in the network—which is accessible by multiple edge platforms or components; however, a "core" does not necessarily designate the "center" or the deepest location of the network. Accordingly, the core data center 432 may be located within, at, or near the edge cloud 410. Although an illustrative number of client compute platforms 402a, 402b, 402c, 402d, 402e, 402f; edge gateway platforms 412a, 412b, 412c; edge aggregation platforms 422a, 422b; edge core data centers 432; and global network clouds 442 are shown in FIG. 4, it should be appreciated that the edge computing system 400 may include any number of devices and/or systems at each layer. Devices at any layer can be configured as peer nodes and/or peer platforms to each other and, accordingly, act in a collaborative manner to meet service objectives. For example, in additional or alternative examples, the edge gateway platforms 412a, 412b, 412c can be configured as an edge of edges such that the edge gateway platforms 412a, 412b, 412c communicate via peer to peer connections. In some examples, the edge aggregation platforms 422a, 422b and/or the fog platform(s) 424 can be configured as an edge of edges such that the edge aggregation platforms 422a, 422b and/or the fog platform(s) communicate via peer to peer connections. Additionally, as shown in FIG. 4, the number of components of respective layers 420, 430, 440, 450, and 460 generally increases at each lower level (e.g., when moving closer to endpoints (e.g., client compute platforms 402a, 402b, 402c, 402d, 402e, 402f)). As such, one edge gateway platforms 412a, 412b, 412c may service multiple ones of the client compute platforms 402a, 402b, 402c, 402d, 402e, 402f, and one edge aggregation platform (e.g., one of the edge aggregation platforms 422a, 422b) may service multiple ones of the edge gateway platforms 412a, 412b, 412c.

Consistent with the examples provided herein, a client compute platform (e.g., one of the client compute platforms 402a, 402b, 402c, 402d, 402e, 402f) may be implemented as any type of endpoint component, device, appliance, or other thing capable of communicating as a producer or consumer of data. For example, a client compute platform can include a mobile phone, a laptop computer, a desktop computer, a processor platform in an autonomous vehicle, etc. In additional or alternative examples, a client compute platform can include a camera, a sensor, etc. Further, the label "platform," "node," and/or "device" as used in the edge computing system 400 does not necessarily mean that such platform, node, and/or device operates in a client or slave role; rather, any of the platforms, nodes, and/or devices in the edge computing system 400 refer to individual entities, platforms, nodes, devices, and/or subsystems which include discrete and/or connected hardware and/or software configurations to facilitate and/or use the edge cloud 410. Advantageously, example location engines as described herein may detect and/or otherwise determine locations of the client compute platforms 402a, 402b, 402c, 402d, 402e, 402f with improved performance and accuracy as well as with reduced latency.

As such, the edge cloud 410 is formed from network components and functional features operated by and within the edge gateway platforms 412a, 412b, 412c and the edge aggregation platforms 422a, 422b of layers 430, 440, respectively. The edge cloud 410 may be implemented as any type of network that provides edge computing and/or storage resources which are proximately located to radio access network (RAN) capable endpoint devices (e.g., mobile computing devices, IoT devices, smart devices, etc.), which are shown in FIG. 4 as the client compute platforms 402a, 402b, 402c, 402d, 402e, 402f. In other words, the edge cloud 410 may be envisioned as an "edge" which connects the endpoint devices and traditional network access points that serves as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

In some examples, the edge cloud 410 may form a portion of, or otherwise provide, an ingress point into or across a fog networking configuration 426 (e.g., a network of fog platform(s) 424, not shown in detail), which may be implemented as a system-level horizontal and distributed architecture that distributes resources and services to perform a specific function. For instance, a coordinated and distributed network of fog platform(s) 424 may perform computing, storage, control, or networking aspects in the context of an IoT system arrangement. Other networked, aggregated, and distributed functions may exist in the edge cloud 410 between the core data center 432 and the client endpoints (e.g., client compute platforms 402a, 402b, 402c, 402d, 402e, 402f). Some of these are discussed in the following sections in the context of network functions or service virtualization, including the use of virtual edges and virtual services which are orchestrated for multiple tenants.

As discussed in more detail below, the edge gateway platforms 412a, 412b, 412c and the edge aggregation platforms 422a, 422b cooperate to provide various edge services and security to the client compute platforms 402a, 402b, 402c, 402d, 402e, 402f. Furthermore, because a client compute platforms (e.g., one of the client compute platforms 402a, 402b, 402c, 402d, 402e, 402f) may be stationary or mobile, a respective edge gateway platform 412a, 412b, 412c may cooperate with other edge gateway platforms to propagate presently provided edge services, relevant service data, and security as the corresponding client compute platforms 402a, 402b, 402c, 402d, 402e, 402f moves about a region. To do so, the edge gateway platforms 412a, 412b, 412c and/or edge aggregation platforms 422a, 422b may support multiple tenancy and multiple tenant configurations, in which services from (or hosted for) multiple service providers, owners, and multiple consumers may be supported and coordinated across a single or multiple compute devices.

In examples disclosed herein, edge platforms in the edge computing system 400 includes meta-orchestration functionality. For example, edge platforms at the far-edge (e.g., edge platforms closer to edge users, the edge devices layer 430, etc.) can reduce the performance or power consumption of orchestration tasks associated with far-edge platforms so that the execution of orchestration components at far-edge platforms consumes a small fraction of the power and performance available at far-edge platforms.

The orchestrators at various far-edge platforms participate in an end-to-end orchestration architecture. Examples disclosed herein anticipate that the comprehensive operating software framework (such as, open network automation platform (ONAP) or similar platform) will be expanded, or options created within it, so that examples disclosed herein can be compatible with those frameworks. For example, orchestrators at edge platforms implementing examples disclosed herein can interface with ONAP orchestration flows and facilitate edge platform orchestration and telemetry activities. Orchestrators implementing examples disclosed herein act to regulate the orchestration and telemetry activities that are performed at edge platforms, including increasing or decreasing the power and/or resources expended by the local orchestration and telemetry components, delegating orchestration and telemetry processes to a remote computer and/or retrieving orchestration and telemetry processes from the remote computer when power and/or resources are available.

The remote devices described above are situated at alternative locations with respect to those edge platforms that are offloading telemetry and orchestration processes. For example, the remote devices described above can be situated, by contrast, at a near-edge platforms (e.g., the network access layer 440, the core network layer 450, a central office, a mini-datacenter, etc.). By offloading telemetry and/or orchestration processes at a near edge platforms, an orchestrator at a near-edge platform is assured of (comparatively) stable power supply, and sufficient computational resources to facilitate execution of telemetry and/or orchestration processes. An orchestrator (e.g., operating according to a global loop) at a near-edge platform can take delegated telemetry and/or orchestration processes from an orchestrator (e.g., operating according to a local loop) at a far-edge platform. For example, if an orchestrator at a near-edge platform takes delegated telemetry and/or orchestration processes, then at some later time, the orchestrator at the near-edge platform can return the delegated telemetry and/or orchestration processes to an orchestrator at a far-edge platform as conditions change at the far-edge platform (e.g., as power and computational resources at a far-edge platform satisfy a threshold level, as higher levels of power and/or computational resources become available at a far-edge platform, etc.).

A variety of security approaches may be utilized within the architecture of the edge cloud 410. In a multi-stakeholder environment, there can be multiple loadable security modules (LSMs) used to provision policies that enforce the stakeholder's interests including those of tenants. In some examples, other operators, service providers, etc. may have security interests that compete with the tenant's interests. For example, tenants may prefer to receive full services (e.g., provided by an edge platform) for free while service providers would like to get full payment for performing little work or incurring little costs. Enforcement point environments could support multiple LSMs that apply the combination of loaded LSM policies (e.g., where the most constrained effective policy is applied, such as where if any of A, B or C stakeholders restricts access then access is restricted). Within the edge cloud 410, each edge entity can provision LSMs that enforce the Edge entity interests. The cloud entity can provision LSMs that enforce the cloud entity interests. Likewise, the various fog and IoT network entities can provision LSMs that enforce the fog entity's interests.

In these examples, services may be considered from the perspective of a transaction, performed against a set of contracts or ingredients, whether considered at an ingredient level or a human-perceivable level. Thus, a user who has a service agreement with a service provider, expects the service to be delivered under terms of the SLA. Although not discussed in detail, the use of the edge computing techniques discussed herein may play roles during the negotiation of the agreement and the measurement of the fulfillment of the agreement (e.g., to identify what elements are required by the system to conduct a service, how the system responds to service conditions and changes, and the like).

Additionally, in examples disclosed herein, edge platforms and/or orchestration components thereof may consider several factors when orchestrating services and/or applications in an edge environment. These factors can include next-generation central office smart network functions virtualization and service management, improving performance per watt at an edge platform and/or of orchestration components to overcome the limitation of power at edge platforms, reducing power consumption of orchestration components and/or an edge platform, improving hardware utilization to increase management and orchestration efficiency, providing physical and/or end to end security, providing individual tenant quality of service and/or service level agreement satisfaction, improving network equipment-building system compliance level for each use case and tenant business model, pooling acceleration components, and billing and metering policies to improve an edge environment.

A "service" is a broad term often applied to various contexts, but in general, it refers to a relationship between two entities where one entity offers and performs work for the benefit of another. However, the services delivered from one entity to another must be performed with certain guidelines, which ensure trust between the entities and manage the transaction according to the contract terms and conditions set forth at the beginning, during, and end of the service.

An example relationship among services for use in an edge computing system is described below. In scenarios of edge computing, there are several services, and transaction layers in operation and dependent on each other—these services create a "service chain". At the lowest level, ingredients compose systems. These systems and/or resources communicate and collaborate with each other in order to provide a multitude of services to each other as well as other permanent or transient entities around them. In turn, these entities may provide human-consumable services. With this hierarchy, services offered at each tier must be transactionally connected to ensure that the individual component (or sub-entity) providing a service adheres to the contractually agreed to objectives and specifications. Deviations at each layer could result in overall impact to the entire service chain.

One type of service that may be offered in an edge environment hierarchy is Silicon Level Services. For instance, Software Defined Silicon (SDSi)-type hardware provides the ability to ensure low level adherence to transactions, through the ability to intra-scale, manage and assure the delivery of operational service level agreements. Use of SDSi and similar hardware controls provide the capability to associate features and resources within a system to a specific tenant and manage the individual title (rights) to those resources. Use of such features is among one way to dynamically "bring" the compute resources to the workload.

For example, an operational level agreement and/or service level agreement could define "transactional throughput" or "timeliness"—in case of SDSi, the system and/or resource can sign up to guarantee specific service level specifications (SLS) and objectives (SLO) of a service level agreement (SLA). For example, SLOs can correspond to particular key performance indicators (KPIs) (e.g., frames per second, floating point operations per second, latency goals, etc.) of an application (e.g., service, workload, etc.) and an SLA can correspond to a platform level agreement to satisfy a particular SLO (e.g., one gigabyte of memory for 10 frames per second). SDSi hardware also provides the ability for the infrastructure and resource owner to empower the silicon component (e.g., components of a composed system that produce metric telemetry) to access and manage (add/remove) product features and freely scale hardware capabilities and utilization up and down. Furthermore, it provides the ability to provide deterministic feature assignments on a per-tenant basis. It also provides the capability to tie deterministic orchestration and service management to the dynamic (or subscription based) activation of features without the need to interrupt running services, client operations or by resetting or rebooting the system.

At the lowest layer, SDSi can provide services and guarantees to systems to ensure active adherence to contractually agreed-to service level specifications that a single resource has to provide within the system. Additionally, SDSi provides the ability to manage the contractual rights (title), usage and associated financials of one or more tenants on a per component, or even silicon level feature (e.g., SKU features). Silicon level features may be associated with compute, storage or network capabilities, performance, determinism or even features for security, encryption, acceleration, etc. These capabilities ensure not only that the tenant can achieve a specific service level agreement, but also assist with management and data collection, and assure the transaction and the contractual agreement at the lowest manageable component level.

At a higher layer in the services hierarchy, Resource Level Services, includes systems and/or resources which provide (in complete or through composition) the ability to meet workload demands by either acquiring and enabling system level features via SDSi, or through the composition of individually addressable resources (compute, storage and network). At yet a higher layer of the services hierarchy, Workflow Level Services, is horizontal, since service-chains may have workflow level requirements. Workflows describe dependencies between workloads in order to deliver specific service level objectives and requirements to the end-to-end service. These services may include features and functions like high-availability, redundancy, recovery, fault tolerance or load-leveling (we can include lots more in this). Workflow services define dependencies and relationships between resources and systems, describe requirements on associated networks and storage, as well as describe transaction level requirements and associated contracts in order to assure the end-to-end service. Workflow Level Services are usually measured in Service Level Objectives and have mandatory and expected service requirements.

At yet a higher layer of the services hierarchy, Business Functional Services (BFS) are operable, and these services are the different elements of the service which have relationships to each other and provide specific functions for the customer. In the case of Edge computing and within the example of Autonomous Driving, business functions may be composing the service, for instance, of a "timely arrival to an event"—this service would require several business functions to work together and in concert to achieve the goal of the user entity: GPS guidance, RSU (Road Side Unit) awareness of local traffic conditions, Payment history of user entity, Authorization of user entity of resource(s), etc. Furthermore, as these BFS(s) provide services to multiple entities, each BFS manages its own SLA and is aware of its ability to deal with the demand on its own resources (Workload and Workflow). As requirements and demand increases, it communicates the service change requirements to Workflow and resource level service entities, so they can, in-turn provide insights to their ability to fulfill. This step assists the overall transaction and service delivery to the next layer.

At the highest layer of services in the service hierarchy, Business Level Services (BLS), is tied to the capability that is being delivered. At this level, the customer or entity might not care about how the service is composed or what ingredients are used, managed, and/or tracked to provide the service(s). The primary objective of business level services is to attain the goals set by the customer according to the overall contract terms and conditions established between the customer and the provider at the agreed to a financial agreement. BLS(s) are comprised of several Business Functional Services (BFS) and an overall SLA.

This arrangement and other service management features described herein are designed to meet the various requirements of edge computing with its unique and complex resource and service interactions. This service management arrangement is intended to inherently address several of the resource basic services within its framework, instead of through an agent or middleware capability. Services such as: locate, find, address, trace, track, identify, and/or register may be placed immediately in effect as resources appear on the framework, and the manager or owner of the resource domain can use management rules and policies to ensure orderly resource discovery, registration and certification.

Moreover, any number of edge computing architectures described herein may be adapted with service management features. These features may enable a system to be constantly aware and record information about the motion, vector, and/or direction of resources as well as fully describe these features as both telemetry and metadata associated with the devices. These service management features can be used for resource management, billing, and/or metering, as well as an element of security. The same functionality also applies to related resources, where a less intelligent device, like a sensor, might be attached to a more manageable resource, such as an edge gateway. The service management framework is made aware of change of custody or encapsulation for resources. Since nodes and components may be directly accessible or be managed indirectly through a parent or alternative responsible device for a short duration or for its entire lifecycle, this type of structure is relayed to the service framework through its interface and made available to external query mechanisms.

Additionally, this service management framework is always service aware and naturally balances the service delivery requirements with the capability and availability of the resources and the access for the data upload the data analytics systems. If the network transports degrade, fail or change to a higher cost or lower bandwidth function, service policy monitoring functions provide alternative analytics and service delivery mechanisms within the privacy or cost constraints of the user. With these features, the policies can trigger the invocation of analytics and dashboard services at the edge ensuring continuous service availability at reduced fidelity or granularity. Once network transports are re-established, regular data collection, upload and analytics services can resume.

The deployment of a multi-stakeholder edge computing system may be arranged and orchestrated to enable the deployment of multiple services and virtual edge instances, among multiple edge platforms and subsystems, for use by multiple tenants and service providers. In a system example applicable to a cloud service provider (CSP), the deployment of an edge computing system may be provided via an "over-the-top" approach, to introduce edge computing platforms as a supplemental tool to cloud computing. In a contrasting system example applicable to a telecommunications service provider (TSP), the deployment of an edge computing system may be provided via a "network-aggregation" approach, to introduce edge computing platforms at locations in which network accesses (from different types of data access networks) are aggregated. However, these over-the-top and network aggregation approaches may be implemented together in a hybrid or merged approach or configuration.

Figure 5:
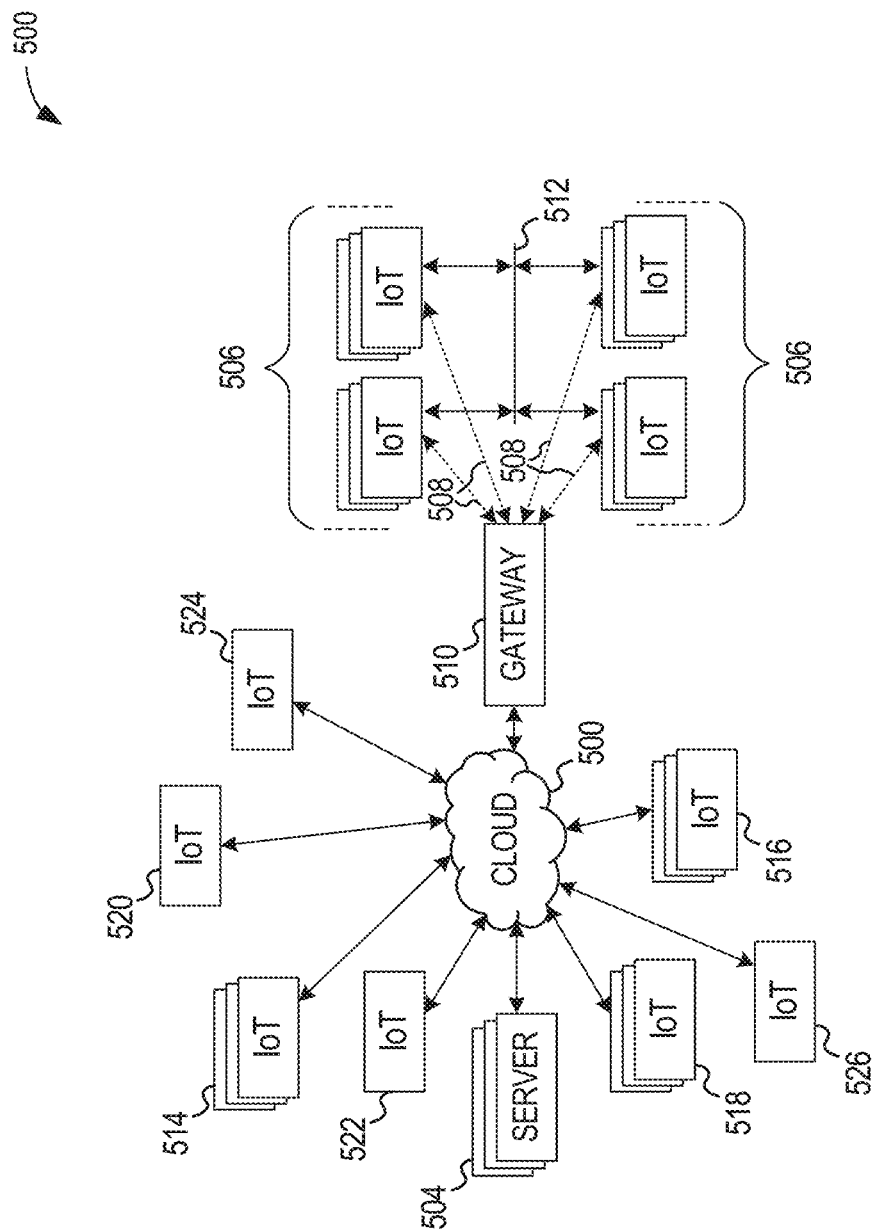
FIG. 5 illustrates a drawing of a cloud computing network, or cloud, in communication with a number of Internet of Things (IoT) devices, according to an example.

FIG. 5 illustrates a drawing of a cloud computing network, or cloud 500, in communication with a number of Internet of Things (IoT) devices. The cloud 500 may represent the Internet, or may be a local area network (LAN), or a wide area network (WAN), such as a proprietary network for a company. The IoT devices may include any number of different types of devices, grouped in various combinations. For example, a traffic control group 506 may include IoT devices along streets in a city. These IoT devices may include stoplights, traffic flow monitors, cameras, weather sensors, and the like. The traffic control group 506, or other subgroups, may be in communication with the cloud 500 through wired or wireless links 508, such as LPWA links, and the like. Further, a wired or wireless sub-network 512 may allow the IoT devices to communicate with each other, such as through a local area network, a wireless local area network, and the like. The IoT devices may use another device, such as a gateway 510 or 528 to communicate with remote locations such as the cloud 500; the IoT devices may also use one or more servers 530 to facilitate communication with the cloud 500 or with the gateway 510. For example, the one or more servers 530 may operate as an intermediate network node to support a local Edge cloud or fog implementation among a local area network. Further, the gateway 528 that is depicted may operate in a cloud-to-gateway-to-many Edge devices configuration, such as with the various IoT devices 514, 520, 524 being constrained or dynamic to an assignment and use of resources in the cloud 500.

Other example groups of IoT devices may include remote weather stations 514, local information terminals 516, alarm systems 518, automated teller machines 520, alarm panels 522, or moving vehicles, such as emergency vehicles 524 or other vehicles 526, among many others. Each of these IoT devices may be in communication with other IoT devices, with servers 504, with another IoT fog device or system (not shown, but depicted in FIG. F2), or a combination therein. The groups of IoT devices may be deployed in various residential, commercial, and industrial settings (including in both private or public environments). Advantageously, example location engines as described herein may achieve location detection of one(s) of the IoT devices of the traffic control group 506, one(s) of the IoT devices 514, 516, 518, 520, 522, 524, 526, etc., and/or a combination thereof with improved performance, improved accuracy, and/or reduced latency.

As may be seen from FIG. 5, a large number of IoT devices may be communicating through the cloud 500. This may allow different IoT devices to request or provide information to other devices autonomously. For example, a group of IoT devices (e.g., the traffic control group 506) may request a current weather forecast from a group of remote weather stations 514, which may provide the forecast without human intervention. Further, an emergency vehicle 524 may be alerted by an automated teller machine 520 that a burglary is in progress. As the emergency vehicle 524 proceeds towards the automated teller machine 520, it may access the traffic control group 506 to request clearance to the location, for example, by lights turning red to block cross traffic at an intersection in sufficient time for the emergency vehicle 524 to have unimpeded access to the intersection.

Clusters of IoT devices, such as the remote weather stations 514 or the traffic control group 506, may be equipped to communicate with other IoT devices as well as with the cloud 500. This may allow the IoT devices to form an ad-hoc network between the devices, allowing them to function as a single device, which may be termed a fog device or system (e.g., as described above with reference to FIG. 4).

Figure 6:
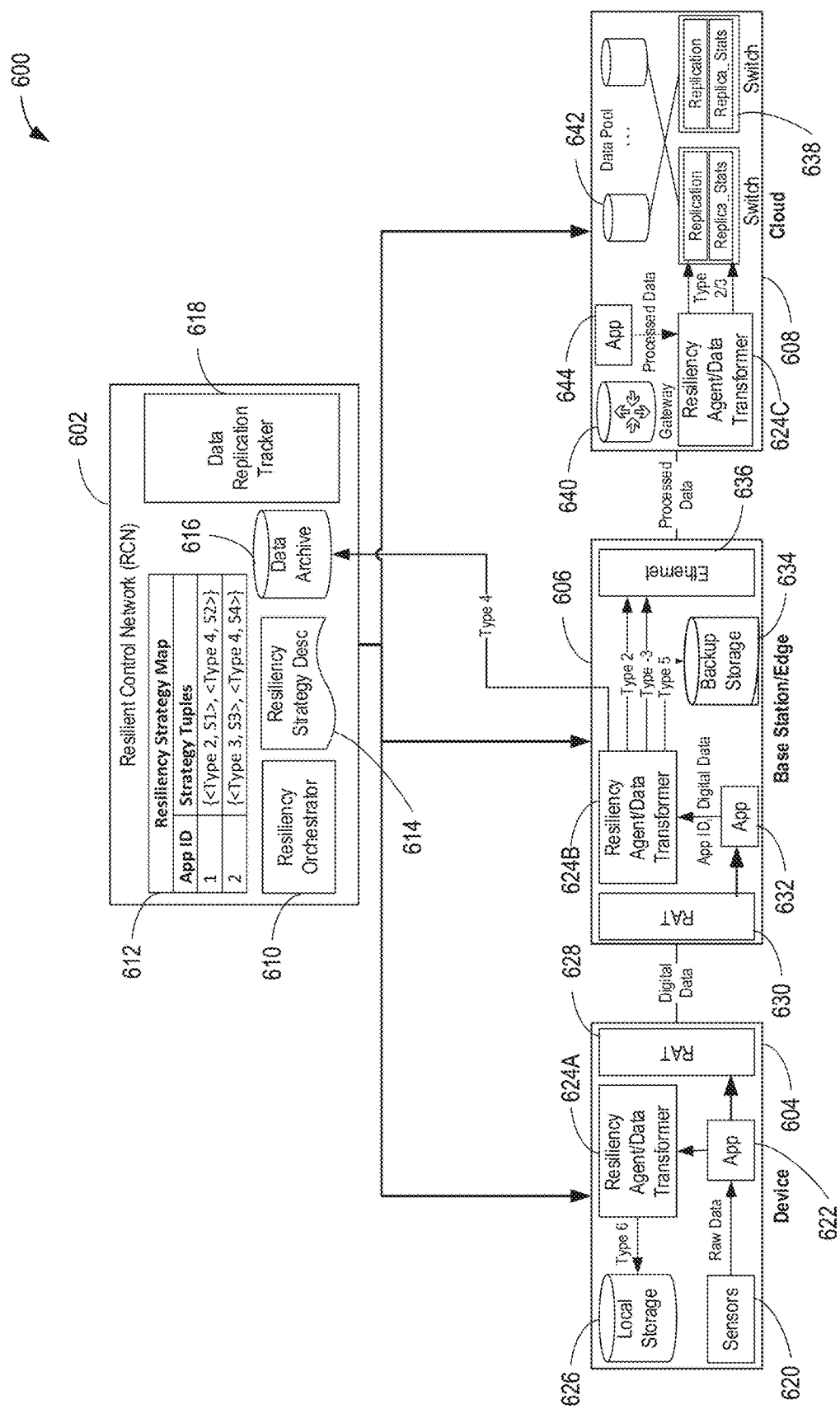
FIG. 6 illustrates an example resilient control network (RCN) to implement examples as disclosed herein.

FIG. 6 illustrates an example network environment 600, which includes an example resilient control network (RCN) 602, an example device 604, an example base station 606, and an example cloud (e.g., a cloud provider, a cloud computing network, etc.) 608. In some examples, the device 604 may be implemented by one of the data sources 160 of FIG. 1, one of the client compute platforms 402a-402f of FIG. 4, one of the IoT devices of FIG. 5, etc. In some examples, the base station 606 may be implemented by the base station 140 of FIG. 1. In some examples, the cloud 608 may be implemented by the cloud data center 130 of FIG. 1, the cloud data center 245 of FIG. 2, etc.

In the illustrated example, the RCN 602 may be implemented by hardware alone, software alone, firmware alone, and/or combination(s) thereof. In some examples, the RCN 602 may implement a platform, node, and/or node as described herein. For example, the RCN 602 may implement an intermediate network node or any other type of node in an edge network environment. The RCN 602 of the illustrated example includes an example resiliency orchestrator 610, an example resiliency strategy map 612, an example resiliency strategy description 614, an example data archive 616, and an example data replication tracker 618. In this example, the resiliency orchestrator 610 may receive spectrum data from at least one of the device 604, the base station 606, or the cloud 608. The resiliency orchestrator 610 may extract metadata from the spectrum data. The resiliency orchestrator 610 may identify a type of the spectrum data (e.g., a spectrum data type, one of the L1-L6 data abstractions, etc.) based on at least one of the spectrum data or the metadata. The resiliency orchestrator 610 may store the at least one of the spectrum data or the metadata in the data archive 616.

In the illustrated example, the resiliency strategy map 612 maps identifiers to resiliency operations. For example, the resiliency strategy map 612 may include and/or otherwise store associations between the identifiers and the resiliency operations. In this example, the identifiers (identified by APP ID 1, APP ID 2, etc.) correspond to a workload (e.g., a compute workload) that may be implemented by an application of the device 608, the base station 606, or the cloud 608. For example, a first identifier (e.g., a first workload identifier, a first application identifier, etc.), which may be identified by APP ID 1, may correspond to the first application 622 instantiated by the device 604. In this example, the resiliency operations (identified by STRATEGY TUPLES) include tuples, arrays, or sets of data that may include groupings of resiliency operations (e.g., resiliency techniques or strategies (e.g., resiliency strategy 1 (S1), resiliency strategy 2 (S2), etc.)) and types of data abstractions (Type 2 or Type-2 data, Type 3 or Type-3 data, etc.) as described herein. In the illustrated example, the first identifier is mapped to a first strategy tuple of <Type 2, S1> and a second strategy tuple of <Type 4, S2>. In this example, the first strategy tuple may be representative of executing resiliency strategy 1 (S1) (or resiliency operation 1) on data represented by L2 data abstraction. In this example, the second strategy tuple may be representative of executing resiliency strategy 2 (S2) (or resiliency operation 2) on data represented by L4 data abstraction.

In some examples, the resiliency orchestrator 610 may obtain spectrum data and/or metadata from the device 604, the base station 606, and/or the cloud 608 via one or more networks such as the Internet, one or more public networks, one or more private networks, one or more cellular networks, one or more satellite networks, one or more optical networks, etc. In some examples, the resiliency orchestrator 610, and/or, more generally, the RCN 602, may generate an identifier by executing one or more hash algorithms on the spectrum data, the metadata, and/or portion(s) thereof. For example, the resiliency orchestrator 610 may generate the identifier based on executing a cryptographic hash function such as secure hash algorithm 1 (SHA-1), SHA-2, or SHA-3. Alternatively, the resiliency orchestrator 610 may generate the identifier by using any other hash algorithm, technique, etc., with the spectrum data, the metadata, and/or portion(s) thereof, as input(s) to the hash algorithm, technique, etc., to generate the identifier as output(s) from the hash algorithm, technique, etc.

In some examples, the resiliency orchestrator 610, and/or, more generally, the RCN 602, may generate the identifier of APP ID 1 based on the spectrum data and/or the metadata. In some examples, the resiliency orchestrator 610 may map the identifier of APP IP 1 to the first strategy tuple and the second strategy tuple in the resiliency strategy map 612. In some examples, the resiliency orchestrator 610 may map a type of the spectrum data and/or the metadata to a data abstraction type in the tuple. For example, the resiliency orchestrator 610 may determine that the spectrum data is Type-2 data. In some such examples, the resiliency orchestrator 610 may map the identifier (APP IP 1) and the data abstraction type to S1. Advantageously, the resiliency orchestrator 610 may execute S1, or, in some examples, instruct a corresponding one of the resiliency agent/data transformer 624A, 624B, 624C to execute S1.

In the illustrated example, the resiliency strategy description 614 defines, describes, identifies, etc., one or more resilience or resiliency operations (e.g., a recovery operation, a reconstruction operation, an inference operation, etc.) to be executed in response to a Fault-Attack-Failure-Outage (FAFO) event. For example, the FAFO event may occur in response to a fault, an attack (e.g., a malware attack, a denial-of-service (DOS) attack, etc.), a failure, and/or an outage of the network environment 600, or portion(s) thereof (e.g., hardware, software, and/or firmware resources such as accelerator resources, compute resources, cloud computing hypervisors, network resources, storage resources, virtualized ones of the hardware, software, and/or firmware resources, etc.). In some examples, the resiliency strategy description 614 may include machine readable instructions, pointer(s) to the machine readable instructions, executable file(s) based on the machine readable instructions, etc., to implement the resiliency operations.

In the illustrated example, the data archive 616 may be implemented by one or more memories, one or more mass storage devices, etc., and/or combination(s) thereof. In the illustrated example, the data replication tracker 618 may log, track, etc., in memory, mass storage, etc., duplications or replications of data amongst different portion(s) of the network environment 600. For example, the data replication tracker 618 may log a duplication of data from the device 604 to the cloud 608.

The device 604 of the illustrated example includes example sensors 620, a first example application 622, an example resilience agent and/or data transformer 624, example local storage 626, and a first example radio access technology (RAT) interface 628. In some examples, the sensors 620 may include one or more sensors such as temperature sensors, vibration sensors, light sensors, acoustic sensors, capacitive sensors, proximity sensors, etc. In some examples, the sensors 620 may be a hardware sensor such as a hardware counter implemented by processor circuitry or a software sensor such as a software counter implemented by an operating system. The first application 622 may be a firmware and/or software application. For example, the device 604 may execute one or more workloads (e.g., computing workloads) by way of executing and/or instantiating the first application 622 based on raw data (e.g., sensor data) from the sensors 620. In some examples, the first RAT interface 628 may be implemented by one or more wireless interfaces such as GSM interfaces, LTE interfaces, 5G/6G interfaces, Wi-Fi, etc. In some examples, the first resiliency agent/data transformer 624A may execute a resiliency operation to recover and/or reconstruct data in response to a FAFO event. In some examples, the local storage 626 may be implemented by one or more memories, one or more mass storage devices, etc., and/or combination(s) thereof.

The base station 606 of the illustrated example includes a second example resiliency agent/data transformer 624B, a second example RAT interface 630, a second example application 632, example backup storage 634, and an example wireline interface 636, which in this example is Ethernet. Alternatively, the wirelines interface 636 may be any other type of wired interface such as an optical wired interface. In some examples, the second resiliency agent/data transformer 624B may execute a resiliency operation to recover and/or reconstruct data in response to a FAFO event. In some examples, the second RAT interface 630 may be implemented by one or more wireless interfaces such as GSM interfaces, LTE interfaces, 5G/6G interfaces, Wi-Fi, etc. In some examples, the backup storage 634 may be implemented by one or more memories, one or more mass storage devices, etc., and/or combination(s) thereof. In some examples, the second application 632 may be a firmware and/or software application. For example, the base station 606 may execute one or more workloads (e.g., computing workloads) by way of executing and/or instantiating the second application 632 based on data (e.g., digital data received from the device 604 and/or processed data received from the cloud 608).

The cloud 608 of the illustrated example includes a third example resiliency agent/data transformer 624C, example switches 638, an example gateway 640, an example data pool 642, and a third example application 644. In some examples, the third resiliency agent/data transformer 624C may execute a resiliency operation to recover and/or reconstruct data in response to a FAFO event. In some examples, the switches 638 may be implemented by Top-of-the-Rack (ToR) switch(es), spine switch(es), leaf switch(es), or any other type of switch and/or virtualized switch. In some examples, the gateway 640 may be implemented by a hardware gateway and/or a virtualized gateway. In some examples, the data pool 642 may be implemented by a pool of storage resources such as one or more memories, one or more mass storage devices, etc., and/or virtualized one(s) thereof.

In some examples, the third application 644 may be a firmware and/or software application. For example, the cloud 608 may execute one or more workloads (e.g., computing workloads) by way of executing and/or instantiating the third application 644 based on data (e.g., digital data, processed data, etc.). In some examples, the first application 622, the second application 632, and/or the third application 644 may be implemented by one or more virtual machines (VMs), containers, etc., and/or combination(s) thereof.

In example operation, the sensors 620 of the device 604 generates raw data, which may include video data from a camera, point cloud data from a light detection and ranging (LIDAR) sensor, etc. The sensors 620 may provide the raw data to the first application 622. The first application 622 may provide the raw data to the first resiliency agent/data transformer 624A. The first resiliency agent/data transformer 624 may store the raw data in the local storage 626. In some examples, the raw data may be implemented by information in the L6 data abstraction. For example, the first resiliency agent/data transformer 624 may identify the raw data as Type-6 data, L6 data, etc., and store indication(s) that the raw data is Type-6 data, L6 data, etc., in the local storage 626. In some examples, the first application 622 may convert the raw data into digital data. The first application 622 may instruct the first RAT interface 628 to deliver the digital data to the second RAT interface 630 of the base station 606.

In example operation, the second application 632 may execute a workload based on the digital data. For example, the second application 632 may execute a workload by processing the digital data into different types of data abstractions such as Type-2 data, Type-3 data, Type-5 data, etc. The second application 632 may provide an identifier (APP ID) associated with the workload and/or the second application 632 to the second resiliency agent/data transformer 624B. The second resiliency agent/data transformer 624B may identify the processed data as Type-2 data, Type-3 data, Type-4 data, Type-5 data, etc., and store indication(s) of the Type-2 data, Type-3 data, Type-4 data, Type-5 data, etc., in the backup storage 634. The second resiliency agent/data transformer 624B may provide the processed data and/or indication(s) thereof to at least one of (i) the data archive 616 of the RCN 602 by way of one or more networks or (ii) the cloud 608 by way of the wireline interface 636.

In example operation, the third application 644 may execute a workload based on the processed data. For example, the third application 644 may execute a workload by processing the processed data into different types of data abstractions such as Type-2 data, Type-3 data, etc. The third resiliency agent/data transformer 624C may identify type(s) of the data output from the third application 644 and store indication(s) of the identified type(s) in the data pool 642 by way of the switches 638. In some examples, the switches 638 may cause the data output from the third application 644, or indication(s) thereof, to be replicated amongst storage resource(s) of the data pool 642. In some examples, the switches 638 may cause the replication to occur by providing the data to the storage resource(s). In some examples, the switches 638 may store replication statistics, data, information, etc., (identified by REPLICA_STATS) associated with the replication of the data amongst the storage resource(s). In some examples, the cloud 608 may provide the replication statistics to the data replication tracker 618 for storage, logging, tracking, etc.

Figure 7:
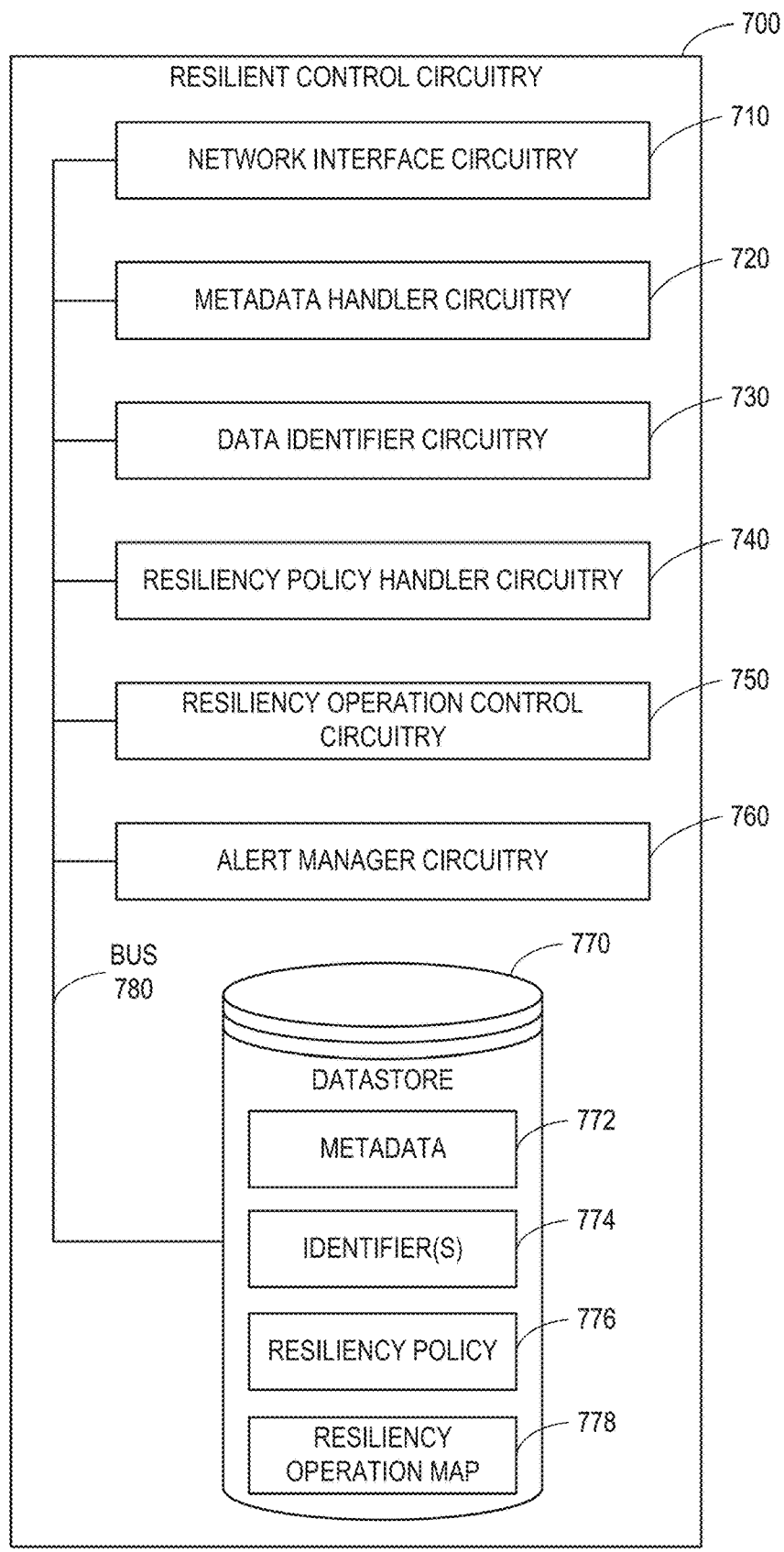
FIG. 7 is a block diagram of an example implementation of the RCN of FIG. 6.

FIG. 7 is a block diagram of example resilient control circuitry 700. The resilient control circuitry 700 of FIG. 7 may be instantiated by processor circuitry such as a central processing unit executing instructions. Additionally or alternatively, the resilient control circuitry 700 of FIG. 7 may be instantiated by an ASIC or an FPGA structured to perform operations corresponding to the instructions. In some examples, the resilient control circuitry 700 may be an example implementation of the RCN 602 of FIG. 6.

The resilient control circuitry 700 of the illustrated example includes example network interface circuitry 710, example metadata handler circuitry 720, example data identifier circuitry 730, example resiliency policy handler circuitry 740, example resiliency operation control circuitry 750, example alert manager circuitry 760, an example datastore 770, and an example bus 780. The datastore 770 of the illustrated example includes example metadata 772, example identifier(s) 774, an example resiliency policy 776, and an example resiliency operation map 778. In the illustrated example, the network interface circuitry 710, the metadata handler circuitry 720, the data identifier circuitry 730, the resiliency policy handler circuitry 740, the resiliency operation control circuitry 750, the alert manager circuitry 760, and the datastore 770 are in communication with one(s) of each other by way of the bus 780. In some examples, the bus 780 may be implemented by at least one of an Inter-Integrated Circuit (I2C) bus, a Serial Peripheral Interface (SPI) bus, a Peripheral Component Interconnect (PCI) bus, or a Peripheral Component Interconnect Express (PCIE) bus. Additionally or alternatively, the bus 780 may implement any other type of computing or electrical bus.

In the illustrated example, the resilient control circuitry 700 includes the network interface circuitry 710 to receive spectrum data in a network environment. For example, the network interface circuitry 710 may receive spectrum data, such as the raw data, from the device 604 of FIG. 6. In some examples, the network interface circuitry 710 may receive spectrum data, such as the digital data, from the base station 606. In some examples, the network interface circuitry 710 may receive spectrum data, such as the processed data, from the cloud 608. In some examples, at least one of the raw data, the digital data, or the processed data may be implemented by one or more data abstraction types, such as one(s) of L1-L6 data abstraction representations, Type-1 data, Type-2 data, etc., and the like. In some examples, the network interface circuitry 710 determines whether to monitor and/or continue monitoring the network environment.

In the illustrated example, the resilient control circuitry 700 includes the metadata handler circuitry 720 to generate, manage, and/or otherwise handle metadata. For example, the metadata handler circuitry 720 may generate, manage, and/or otherwise handle the metadata 772 in the datastore 770. In some examples, the metadata handler circuitry 720 generates spectrum metadata based on the spectrum data based on one or more types of data abstraction (e.g., L1-L6 data abstraction representations, manifestations, etc.). For example, the metadata handler circuitry 720 may generate Type-1, Type-2, Type-3, etc., metadata based on the raw data from the sensors 620.

In some examples, the metadata handler circuitry 720 extracts spectrum metadata from network traffic associated with a workload affected by a FAFO event. For example, the network interface circuitry 710 may obtain network traffic (e.g., one or more data packets, one or more data streams, one or more communications streams, etc.) from at least one of the device 604, the base station 606, or the cloud 608 in response to FAFO event(s) affecting the at least one of the device 604, the base station 606, or the cloud 608, or application(s) or portion(s) thereof. In some such examples, the metadata handler circuitry 720 may extract Type-1, Type-2, Type-3, etc., metadata from the network traffic. In some examples, the metadata handler circuitry 720 identifies spectrum metadata as input(s) to a resiliency operation as described herein.

In the illustrated example, the resilient control circuitry 700 includes the data identifier circuitry 730 to identify a type of spectrum metadata. In some examples, the data identifier circuitry 730 may identify a data abstraction type (e.g., type of L1-L6 data abstraction, Type-1 to Type-6 metadata, etc.) based on the spectrum data.

In some examples, the data identifier circuitry 730 may generate an identifier, such as an application identifier, a workload identifier, etc., based on at least one of spectrum data or spectrum metadata extracted from the spectrum metadata. For example, the data identifier circuitry 730 may execute one or more hash algorithms utilizing spectrum data as a hash input to generate a hash value as a hash output. In some such examples, the hash value may be the identifier. In some examples, the identifier may be stored as one of the identifier(s) 774 in the datastore 770. For example, the hash value may be one of APP ID 1, APP ID 2, etc., of FIG. 6. In some examples, the data identifier circuitry 730 may execute one or more hash algorithms utilizing spectrum metadata as a hash input to generate a hash value as a hash output. In some such examples, the hash value may be the identifier. For example, the hash value may be one of APP ID 1, APP ID 2, etc., of FIG. 6. In some such examples, the identifier may be stored as one of the identifier(s) 774 in the datastore 770.

In the illustrated example, the resilient control circuitry 700 includes the resiliency policy handler circuitry 740 to generate a resiliency policy based on at least one of resiliency operation(s) or resiliency requirement(s). In some examples, a resiliency requirement and/or a resiliency policy may be implemented by data or information in any form that may be ingested, processed, interpreted and/or otherwise manipulated by processor circuitry to produce a result. The produced result may itself be data. In some examples, the resiliency policy handler circuitry 740 may generate the resiliency policy 776 in the datastore 770. In some examples, the resilient policy may be representative of a set of applications, data, and/or system environments to be preserved in response to a FAFO event and associated operations to execute to preserve the set in response to the FAFO event. For example, the resiliency policy handler circuitry 740 may identify one or more resiliency requirements, which may include availability of data, a failure-to-tolerate (FTT) requirement (e.g., a number of failures before data is no longer retrievable), etc. In some examples, the one or more resiliency requirements may include a set of applications, data, and/or system environments that is/are required to be preserved, retrievable, etc., in response to a FAFO event. For example, the set of applications, data, and/or system environments may remain available (e.g., through a failover operation) when the system currently hosting them experiences an outage (e.g., a FAFO event). In some examples, the resilient policy handler circuitry 740 may generate the resiliency policy based on the one or more resiliency requirements. In some such examples, the one or more resiliency requirements may be obtained from a user (e.g., an Information Technology (IT) operative, a network environment operative, etc.), a computing device associated with the user, etc.

In some examples, the resiliency policy handler circuitry 740 determines resiliency operation(s) based on the resiliency requirement(s). For example, the resiliency policy handler circuitry 740 may determine that the resiliency requirement(s) may be satisfied by associating at least one of a recovery operation, a reconstruction operation, or an inference operation with the set of application, data, and/or system environments to be preserved.

In some examples, the resiliency policy handler circuitry 740 generates a resiliency operation map based on at least one of the resiliency policy or first identifiers of respective workloads. For example, the resiliency policy handler circuitry 740 may generate the resiliency operation map, which may implement the resiliency strategy map of FIG. 6, to include at least one of identifiers (e.g., identifiers associated with a workload, an application executing the workload, etc.) and corresponding strategy tuples as described above in connection with FIG. 6. In some examples, the resiliency policy handler circuitry 740 may generate the resiliency operation map 778 in the datastore 770. In some such examples, the resiliency operation map 778 may implement and/or be implemented by the resiliency strategy map 612 of FIG. 6.

In some examples, the resiliency policy handler circuitry 740 determines whether a resiliency policy is associated with spectrum metadata. For example, the resiliency policy handler circuitry 740 may determine that the resiliency strategy map of FIG. 6 is not associated with identified spectrum metadata by the metadata handler circuitry 720. In some such examples, the resiliency policy handler circuitry 740 may generate a resiliency policy to correspond to the identified spectrum metadata. In some examples, in response to a determination that the identified spectrum metadata is associated with an existing resiliency policy, the resiliency policy handler circuitry 740 may update a data archive, such as the data archive 616 of FIG. 6, based on the spectrum metadata.

In some examples, the resiliency policy handler circuitry 740 is invoked in response to an identification of a FAFO event. For example, in response to a determination that the first application 622 is undergoing or underwent a FAFO event, the resiliency policy handler circuitry 740 may map an identifier of the first application 622 to the first strategy tuple in the resiliency strategy map 612. In some such examples, the resiliency policy handler circuitry 740 may map a data abstraction type of metadata handled by the first application 622 to one of the data abstraction types in the first strategy tuple. In some such examples, the resiliency policy handler circuitry 740 may identify one or more resiliency operations (e.g., S1, S2, etc., of FIG. 6) based on the mapping(s).

In some examples, the resiliency policy handler circuitry 740 may identify the one or more resiliency operations as a data recovery operation or a data reconstruction operation. For example, the resiliency policy handler circuitry 740 may identify the data recovery operation or the data reconstruction operation as a non-lossy operation, a lossy operation, or an inference operation. For example, the resiliency policy handler circuitry 740 may determine that the data recovery operation is a non-lossy operation because copying and/or retrieving corrupted, lost, or desired data from a repository to local storage does not lose data in the data recovery process. In some examples, the resiliency policy handler circuitry 740 may determine that the data reconstruction operation is a lossy operation because reconstructing data based on metadata associated with the data may be unable to recover a portion of the data in the data reconstruction process. In some examples, the resiliency policy handler circuitry 740 may identify the data reconstruction operation as an inference operation because an AI/ML model may be executed on the metadata to infer the original data.

In the illustrated example, the resilient control circuitry 700 includes the resiliency operation control circuitry 750 to execute resiliency operation(s) based on a mapping of an identifier associated with a FAFO event to the resiliency operation(s) in a resiliency operation map. For example, the resiliency operation control circuitry 750 may execute an identified data recovery operation and/or data reconstruction operation to recover and/or reconstruct spectrum data associated with a workload that is associated with a FAFO event.

In some examples, the resiliency operation control circuitry 750 may execute a non-lossy operation on spectrum metadata input(s) to recover and/or reconstruct spectrum data that is corrupted, lost, desired, and/or otherwise inaccessible or easily retrievable. In some examples, the resiliency operation control circuitry 750 may execute a lossy operation on the spectrum metadata input(s) to reconstruct the spectrum data. In some examples, the resiliency operation control circuitry 750 may execute an inference operation by executing one or more AI/ML models using the spectrum metadata input(s) as model input(s) to reconstruct the spectrum data as model output(s).

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the AI/ML model(s) may be trained with data to recognize patterns and/or associations and follow such patterns and/or associations when processing input data such that other input(s) result in output(s) consistent with the recognized patterns and/or associations.

Many different types of machine-learning models and/or machine-learning architectures exist. In some examples, the resiliency operation control circuitry 750 generates the AI/ML model(s) as neural network model(s). Using a neural network model enables the resiliency operation control circuitry 750 to execute an AI/ML workload. In general, machine-learning models/architectures that are suitable to use in the example approaches disclosed herein include recurrent neural networks. However, other types of machine learning models could additionally or alternatively be used such as supervised learning ANN models, clustering models, classification models, etc., and/or a combination thereof. Example supervised learning ANN models may include two-layer (2-layer) radial basis neural networks (RBN), learning vector quantization (LVQ) classification neural networks, etc. Example clustering models may include k-means clustering, hierarchical clustering, mean shift clustering, density-based clustering, etc. Example classification models may include logistic regression, support-vector machine or network, Naive Bayes, etc. In some examples, the resiliency operation control circuitry 750 may compile and/or otherwise generate one(s) of the AI/ML model(s) as lightweight machine-learning models.

In general, implementing an ML/AI system involves two phases, a learning/training phase and an inference phase. In the learning/training phase, a training algorithm is used to train the AI/ML model(s) to operate in accordance with patterns and/or associations based on, for example, training data. In general, the AI/ML model(s) include(s) internal parameters that guide how input data is transformed into output data, such as through a series of nodes and connections within the AI/ML model(s) to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, the resiliency operation control circuitry 750 may invoke supervised training to use inputs and corresponding expected (e.g., labeled) outputs to select parameters (e.g., by iterating over combinations of select parameters) for the AI/ML model(s) that reduce model error. As used herein, "labeling" refers to an expected output of the machine learning model (e.g., a classification, an expected output value, etc.). Alternatively, the resiliency operation control circuitry 750 may invoke unsupervised training (e.g., used in deep learning, a subset of machine learning, etc.) that involves inferring patterns from inputs to select parameters for the AI/ML model(s) (e.g., without the benefit of expected (e.g., labeled) outputs).

In some examples, the resiliency operation control circuitry 750 trains the AI/ML model(s) using unsupervised clustering of operating observables. For example, the operating observables may include spectrum data, the metadata 772, the identifier(s) 774, etc. However, the resiliency operation control circuitry 750 may additionally or alternatively use any other training algorithm such as stochastic gradient descent, Simulated Annealing, Particle Swarm Optimization, Evolution Algorithms, Genetic Algorithms, Nonlinear Conjugate Gradient, etc.

In some examples, the resiliency operation control circuitry 750 may train the AI/ML model(s) until the level of error is no longer reducing. In some examples, the resiliency operation control circuitry 750 may train the AI/ML model(s) locally on the resilient control circuitry 700 and/or remotely at an external computing system (e.g., one(s) of the device 604, the base station 606, and/or the cloud 608) communicatively coupled to the resilient control circuitry 700. In some examples, the resiliency operation control circuitry 750 trains the AI/ML model(s) using hyperparameters that control how the learning is performed (e.g., a learning rate, a number of layers to be used in the machine learning model, etc.). In some examples, the resiliency operation control circuitry 750 may use hyperparameters that control model performance and training speed such as the learning rate and regularization parameter(s). The resiliency operation control circuitry 750 may select such hyperparameters by, for example, trial and error to reach an optimal model performance. In some examples, the resiliency operation control circuitry 750 utilizes Bayesian hyperparameter optimization to determine an optimal and/or otherwise improved or more efficient network architecture to avoid model overfitting and improve the overall applicability of the AI/ML model(s). Alternatively, the resiliency operation control circuitry 750 may use any other type of optimization. In some examples, the resiliency operation control circuitry 750 may perform re-training. The resiliency operation control circuitry 750 may execute such re-training in response to override(s) by a user of the resilient control circuitry 700, a receipt of new training data, etc.

In some examples, the resiliency operation control circuitry 750 facilitates the training of the AI/ML model(s) using training data. In some examples, the resiliency operation control circuitry 750 utilizes training data that originates from locally generated data, such as one(s) of the spectrum data, the metadata 772, the identifier(s) 774, etc. In some examples, the resiliency operation control circuitry 750 utilizes training data that originates from externally generated data. In some examples where supervised training is used, the resiliency operation control circuitry 750 may label the training data. Labeling is applied to the training data by a user manually or by an automated data pre-processing system. In some examples, the resiliency operation control circuitry 750 may pre-process the training data using, for example, the network interface circuitry 710, the metadata handler circuitry 720, etc., to generate and/or identify metadata that may be used to infer the original data of which the metadata is associated with. In some examples, the resiliency operation control circuitry 750 sub-divides the training data into a first portion of data for training the AI/ML model(s), and a second portion of data for validating the AI/ML model(s).

Once training is complete, the resiliency operation control circuitry 750 may deploy the AI/ML model(s) for use as executable construct(s) that process(es) an input and provides an output based on the network of nodes and connections defined in the AI/ML model(s). The resiliency operation control circuitry 750 may store the AI/ML model(s) in the datastore 770. In some examples, the resiliency operation control circuitry 750 may invoke the network interface circuitry 710 to transmit the AI/ML model(s) to one(s) of the device 604, the base station 606, or the cloud 608. In some such examples, in response to transmitting the AI/ML model(s) to the one(s) of the device 604, the base station 606, or the cloud 608, the one(s) of the device 604, the base station 606, or the cloud 608 may execute the AI/ML model(s) to reconstruct and/or otherwise infer corrupted, lost, inaccessible, and/or desired data with at least one of improved efficiency or performance.

Once trained, the deployed one(s) of the AI/ML model(s) may be operated in an inference phase to process data. In the inference phase, data to be analyzed (e.g., live data) is input to the AI/ML model(s), and the AI/ML model(s) execute(s) to create an output. This inference phase can be thought of as the AI "thinking" to generate the output based on what it learned from the training (e.g., by executing the AI/ML model(s) to apply the learned patterns and/or associations to the live data). In some examples, input data undergoes pre-processing before being used as an input to the AI/ML model(s). Moreover, in some examples, the output data may undergo post-processing after it is generated by the AI/ML model(s) to transform the output into a useful result (e.g., a display of data, a detection and/or identification of an object, an instruction to be executed by a machine, etc.).

In some examples, output of the deployed one(s) of the AI/ML model(s) may be captured and provided as feedback. By analyzing the feedback, an accuracy of the deployed one(s) of the AI/ML model(s) can be determined. If the feedback indicates that the accuracy of the deployed model is less than a threshold or other criterion, training of an updated model can be triggered using the feedback and an updated training data set, hyperparameters, etc., to generate an updated, deployed model.

In the illustrated example, the resilient control circuitry 700 includes the alert manager circuitry 760 to identify a FAFO event. For example, the alert manager circuitry 760 may identify whether an application, a workload carried out by the application, and/or, more generally, a computing system instantiating the application, is experiencing a FAFO event, such as a fault event, an attack event, a failure event, an outage event, etc., and/or combination(s) thereof.

In the illustrated example, the resilient control circuitry 700 includes the datastore 770 to record data (e.g., spectrum data, the metadata 772, the identifier(s) 774, the resiliency policy 776, the resiliency operation map 778, one or more AI/ML models, AI/ML model training data, etc.). The datastore 770 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The datastore 770 may additionally or alternatively be implemented by one or more double data rate (DDR) memories, such as DDR, DDR2, DDR3, DDR4, mobile DDR (mDDR), etc. The datastore 770 may additionally or alternatively be implemented by one or more mass storage devices such as hard disk drive(s) (HDD(s)), compact disk (CD) drive(s), digital versatile disk (DVD) drive(s), solid-state disk (SSD) drive(s), etc. While in the illustrated example the datastore 770 is illustrated as a single datastore, the datastore 770 may be implemented by any number and/or type(s) of datastores. Furthermore, the data stored in the datastore 770 may be in any data format such as, for example, binary data, comma delimited data, tab delimited data, structured query language (SQL) structures, etc. In some examples, the datastore 770 may implement one or more databases. The term "database" as used herein means an organized body of related data, regardless of the manner in which the data or the organized body thereof is represented. For example, the organized body of related data may be in the form of one or more of a table, a map, a grid, a packet, a datagram, a frame, a file, an e-mail, a message, a document, a report, a list or in any other form.

As used herein, data is information in any form that may be ingested, processed, interpreted and/or otherwise manipulated by processor circuitry to produce a result. The produced result may itself be data.

As used herein "threshold" is expressed as data such as a numerical value represented in any form, that may be used by processor circuitry as a reference for a comparison operation.

As used herein, a model is a set of instructions and/or data that may be ingested, processed, interpreted and/or otherwise manipulated by processor circuitry to produce a result. Often, a model is operated using input data to produce output data in accordance with one or more relationships reflected in the model. The model may be based on training data.

While an example manner of implementing the RCN 602 of FIG. 6 is illustrated in FIG. 7, one or more of the elements, processes, and/or devices illustrated in FIG. 7 may be combined, divided, re-arranged, omitted, eliminated, and/or implemented in any other way. Further, the network interface circuitry 710, the metadata handler circuitry 720, the data identifier circuitry 730, the resiliency policy handler circuitry 740, the resiliency operation control circuitry 750, the alert manager circuitry 760, the datastore 770, the bus 780, and/or, more generally, the example RCN 602 of FIG. 6, may be implemented by hardware alone or by hardware in combination with software and/or firmware. Thus, for example, any of the network interface circuitry 710, the metadata handler circuitry 720, the data identifier circuitry 730, the resiliency policy handler circuitry 740, the resiliency operation control circuitry 750, the alert manager circuitry 760, the datastore 770, the bus 780, and/or, more generally, the example RCN 602, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example RCN 602 of FIG. 6 may include one or more elements, processes, and/or devices in addition to, or instead of, those illustrated in FIG. 7, and/or may include more than one of any or all of the illustrated elements, processes and devices.

Figure 8:
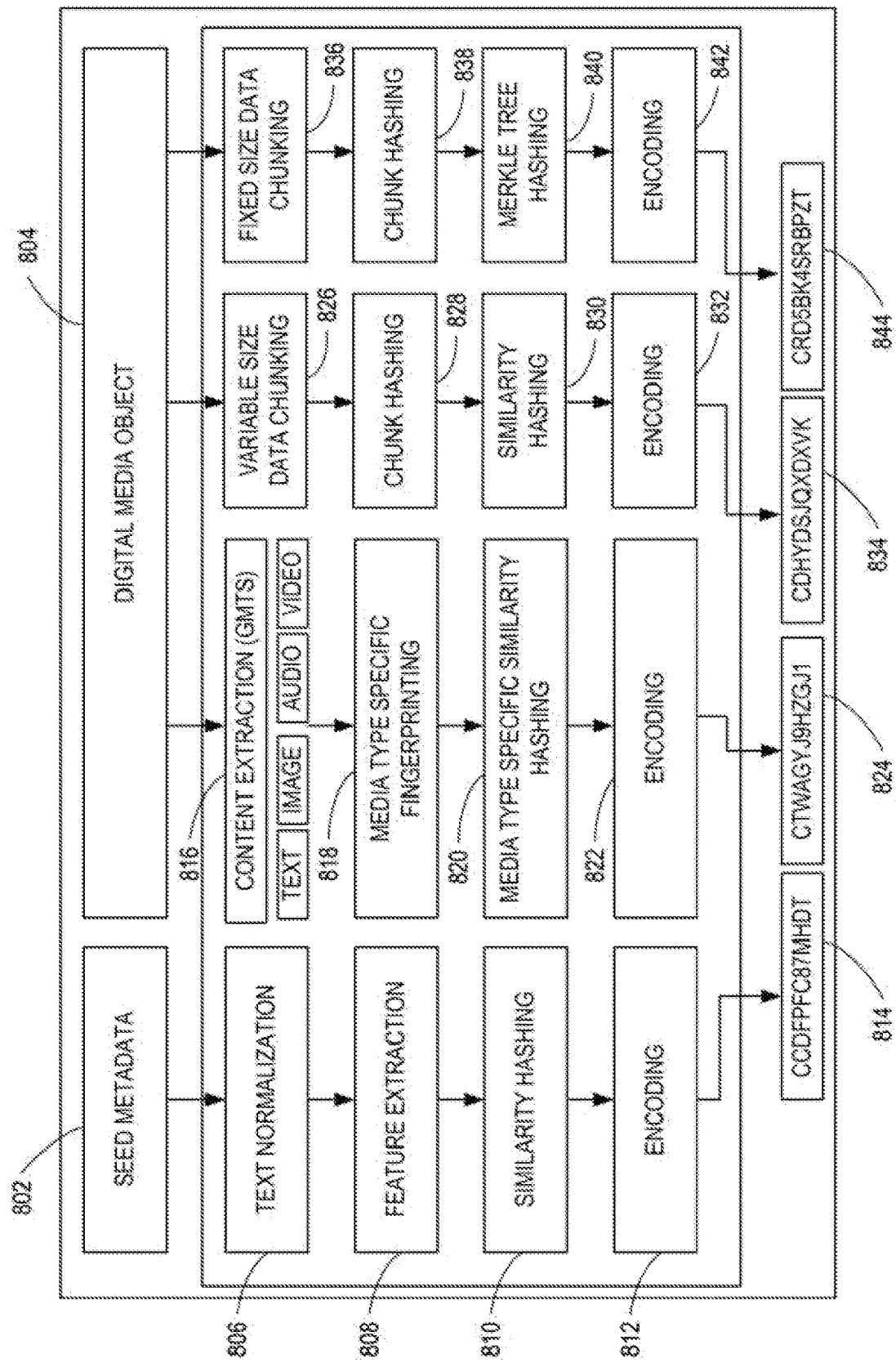
FIG. 8 is a block diagram of different example implementations of metadata as disclosed herein.

FIG. 8 is a block diagram of different example implementations of metadata as disclosed herein. The illustrated example includes example seed metadata 802 and an example data object 804. In this example, the data object 804 is a digital media object that includes text, image, audio, and video data. In this example, the seed metadata 802 corresponds to the digital media object 804 and/or otherwise is data that describes and/or conveys information about the digital media object 804. In some examples, the seed metadata 802 may be implemented by the metadata 772 of FIG. 7.

In some examples, the seed metadata 802 and/or the data object 804 may be processed by the resilient control circuitry 700 of FIG. 7. For example, the network interface circuitry 710 may obtain the seed metadata 802 and/or the digital media object 804 from the device 604, the base station 606, or the cloud 608 of FIG. 6. In some such examples, the metadata handler circuitry 720 may normalize text included in the seed metadata 802 by an example text normalization operation 806, extract feature(s) (e.g., portion(s) of the seed metadata 802) of the seed metadata 802 by an example feature extraction operation 808, and execute an example hash operation 810 on the extracted feature. In some examples, the data identifier circuitry 730 may implement similarity hashing with the hash operation 810. In response to the hash operation 810, the data identifier circuitry 730 may execute an example encoding operation 812 to generate a first example identifier 814. In this example, the first identifier 814 is a metacode, which may be implemented by encoding the output of the hash operation 810.

In some examples, the metadata handler circuitry 720 executes an example content extraction operation 816 to extract text, image, audio, and video data from the digital media object 804. The metadata handler circuitry 720 may execute an example media type specific fingerprinting operation 818 to generate a fingerprint (e.g., a digital fingerprint, a hash value, a signature, etc.) based on the text, image, audio, and/or video data. The data identifier circuitry 730 may execute an example media type specific similarity hashing operation 820 to generate a hash value based on the fingerprint. The data identifier circuitry 730 may encode the hash value in an example encoding operation 822 to generate a second example identifier 824. In this example, the second identifier 824 is a content code, which may be implemented by encoding the output of the hash operation 820.

In some examples, the metadata handler circuitry 720 executes an example variable sized data chunking operation 826 to divide the digital media object 804 into variable size chunks. The data identifier circuitry 730 may execute an example chunk hashing operation 828 to generate hash values for respective ones of the variable size chunks. The data identifier circuitry 730 may execute an example similarity hashing operation 830. The data identifier circuitry 730 may execute an example encoding operation 832 on an output from the similarity hashing operation 830 to generate a third example identifier 834. In this example, the third identifier 834 is a datacode.

In some examples, the metadata handler circuitry 720 executes an example fixed size data chunking operation 836 to divide the digital media object 804 into fixed size chunks. The data identifier circuitry 730 may execute an example chunk hashing operation 838 to generate hash values for respective ones of the fixed size chunks. The data identifier circuitry 730 may execute an example Merkle tree hashing operation 840 to implement a distributed ledger operation (e.g., a blockchain transaction). The data identifier circuitry 730 may execute an example encoding operation 842 on an output from the Merkle tree hashing operation 840 to generate a fourth example identifier 844. In this example, the fourth identifier 834 is an instance code.

In some examples, the data identifier circuitry 730 may store at least one of the first identifier 814, the second identifier 824, the third identifier 834, or the fourth identifier 844 as one(s) of the identifier(s) 774 of FIG. 7.

Figure 9:
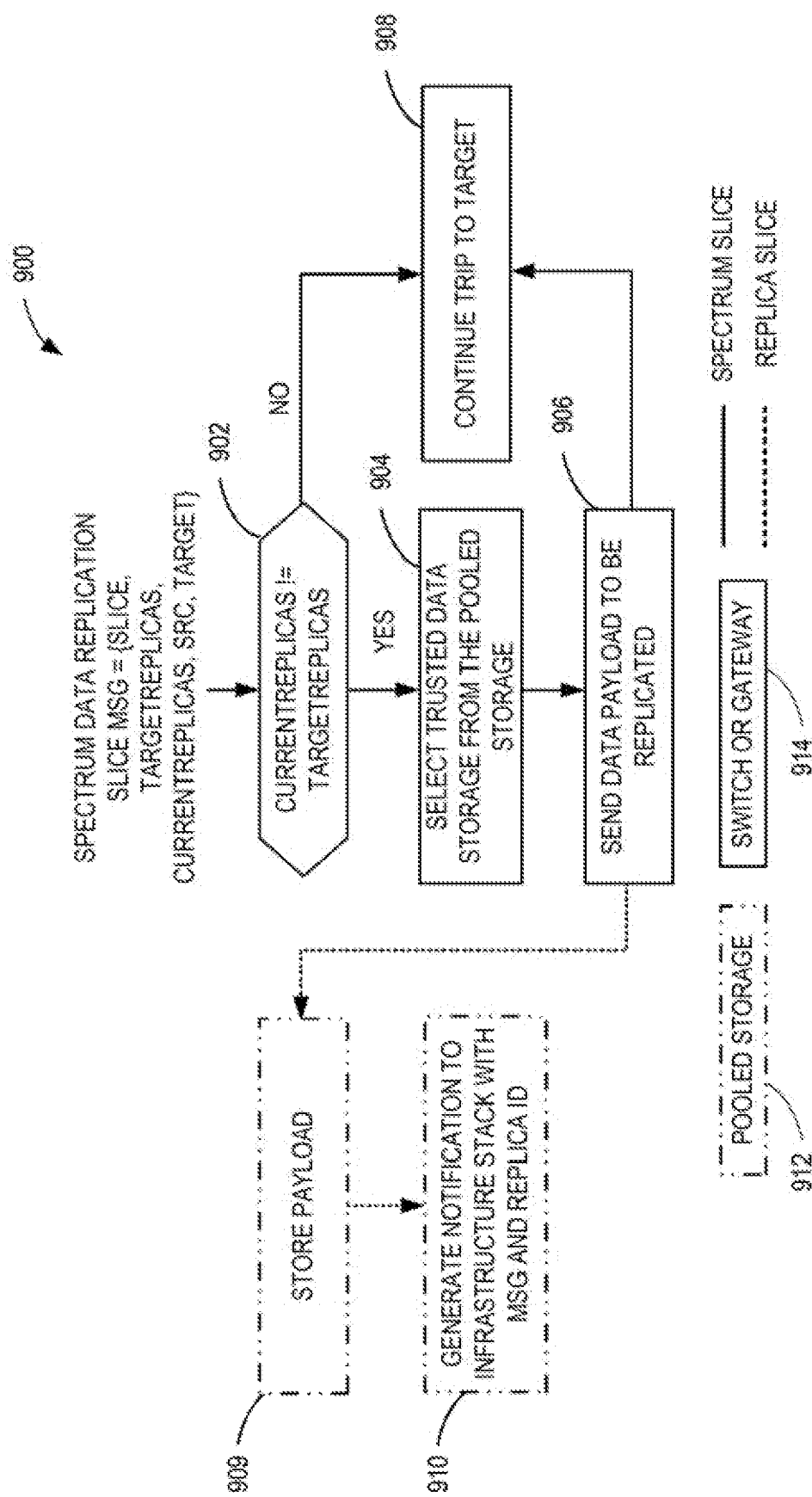
FIG. 9 is a first example workflow of example operations of the example RCN of FIGS. 6 and/or 7.

FIG. 9 is a first example workflow 900 of example operations of the example RCN 602 of FIG. 6 and/or the resilient control circuitry 702 of FIG. 7. For example, the RCN 602 of FIG. 6 and/or the resilient control circuitry 702 of FIG. 7 may implement the first workflow 900. In some examples, as messages (e.g., data messages) or payloads (e.g., data payloads) are traversing different parts of a network environment (e.g., a network infrastructure including different elements such as switches, gateways, or other network building blocks), fabric elements (e.g., data fabric elements) of the network environment can effectuate replication of the payloads into different data pools that are accessible through that element. In the illustrated example, a source (e.g., a data source, a data producer, the device 604, etc.) that generates a data block to be stored or delivered to a particular target can specify the level of reliability (e.g., a resiliency requirement) for the data block. In some examples, the network environment can translate the level of reliability into a number of replicas to be generated to establish such a level of reliability or data resiliency. Furthermore, in some examples, the data may be prioritized during transport based on the classification. In some examples, the network elements may proactively replicate the data payload to the data pools. In some such examples, the data pools may notify the network environment of the location where that message or payload is stored along with an identifier (e.g., a replica identifier (ID)) associated with the storage of the message or payload. In some examples, the replicas may have a specific lifetime. In some such examples, after the specific lifetime has elapsed, the pool may drop or remove the replica.

At a first block 902 of the first workflow 900, the resilient control circuitry 700 (or the RCN 602 of FIG. 6) may receive a spectrum data replication slice message (MSG), which may include slice data, target replicas, current replicas, a source (SRC) and a target of the message. At the first block 902, the resilient control circuitry 700 may determine whether the current replicas are equal to the target replicas. If they are not, control proceeds to block 908 to allow the message to continue traversing to the target. If they are the same, then, at block 904, the resilient control circuitry 700 selects a trusted data storage from a data pool, such as the data pool 642 of FIG. 6.

At block 906, the resilient control circuitry 700 sends the data payload (e.g., the slice data) to be replicated. For example, the resilient control circuitry 700 may send the data payload to the cloud 608 to be stored in the data pool 642. At block 909, the resilient control circuitry 700 causes the data payload to be stored. For example, the cloud 608 may store the data payload in a storage resource implemented by the data pool 642.

At block 910, the resilient control circuitry 700 may receive a notification to an infrastructure stack with the message and a replica identifier. For example, the cloud 608 may generate the notification and transmit the notification to the data replication tracker 618. In some such examples, the data replication tracker 618 may store an association of the message and the replica identifier to determine where the message is stored in response to a FAFO event associated with the message so that the message may be recovered in a data recovery operation. In the illustrated example of FIG. 9, at least one of block 902, 904, 906, or 908, or portion(s) thereof, may be implemented by an example network resource 914 such as a switch or gateway. In some examples, the network resource 914 may be implemented by the network interface circuitry 710 of FIG. 7. In the illustrated example of FIG. 9, at least one of block 909 or 910, or portion(s) thereof, may be implemented by example pooled storage 912. In some examples, the pooled storage 912 may be implemented by the data pool 642 of FIG. 6.

Figure 10:
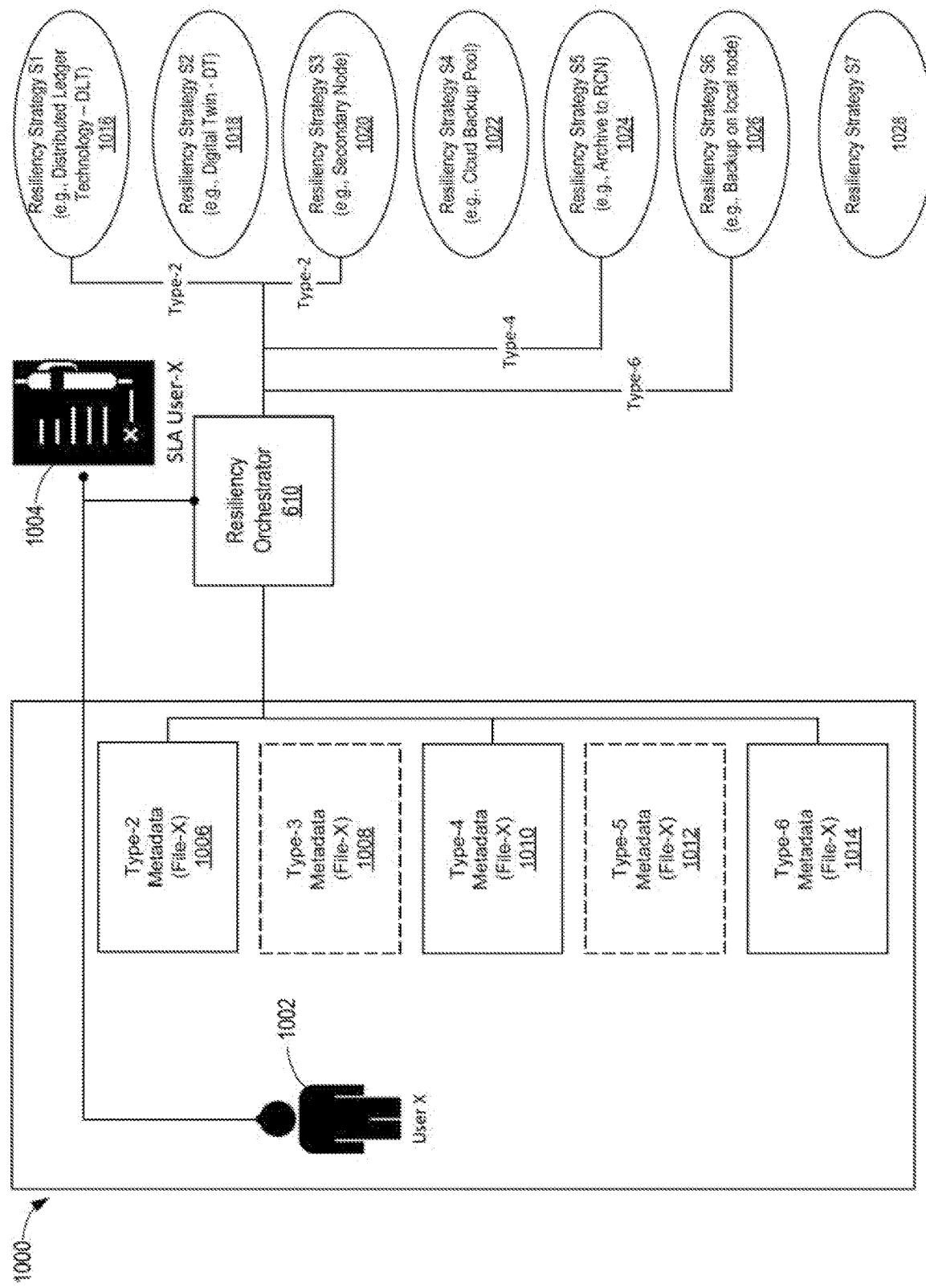
FIG. 10 is a second example workflow of example operations of the example RCN of FIGS. 6 and/or 7.

FIG. 10 is a second example workflow 1000 of example operations of the example RCN 602 of FIG. 6 and/or the resilient control circuitry 702 of FIG. 7. For example, the RCN 602 of FIG. 6 and/or the resilient control circuitry 702 of FIG. 7 may implement the second workflow 1000.

In the illustrated example, an example user 1002 (identified by User X) enters an example service level agreement (SLA) 1004 with the resiliency orchestrator 610 of FIG. 6. For example, the resiliency orchestrator 610 may be implemented by an enterprise system that offers data resiliency as a service. The SLA 1004 authorizes the resiliency orchestrator 610 to apply a particular resiliency strategy (e.g., a resiliency operation, a resiliency technique, etc.) to a given File-X metadata type (e.g., Type-2-Type-6 metadata) according to a desired level of service (e.g., a level of data resiliency) of the user 1002. Various example metadata types 1006, 1008, 1010, 1012, 1014 are depicted in the illustrated example including a first example metadata type 1006 (identified by Type-2 Metadata) associated with File-X, a second example metadata type 1008 (identified by Type-3 Metadata) associated with File-X, a third example metadata type 1010 (identified by Type-4 Metadata) associated with File-X, a fifth example metadata type 1012 (identified by Type-5 Metadata) associated with File-X, and a sixth example a metadata type 1014 (identified by Type-6 Metadata) associated with File-X, where File-X may be implemented by a data object (e.g., the digital media object 804 of FIG. 8). For example, Type-2 metadata 1006 may be implemented by the L2 data abstraction, Type-3 metadata 1008 may be implemented by the L3 data abstraction, etc.

In the illustrated example, the metadata types are resiliency protected using example resiliency strategies 1016, 1018, 1020, 1024, 1026, 1028 including a first example resiliency strategy (S1) 1016, a second example resiliency strategy (S2) 1018, a third example resiliency strategy (S3) 1020, a fourth example resiliency strategy (S4) 1022, a fifth example resiliency strategy (S5) 1024, a sixth example resiliency strategy (S6) 1026, a seventh example resiliency strategy (S7) 1028, etc. In this example, S1 1016 may be implemented using distributed ledger technology (e.g., blockchain), S2 1018 may be implemented using digital twin technique(s), S3 1020 may be implemented by utilizing a secondary node (e.g., a redundant node, a duplicate node, a standby node, etc.), S4 1022 may be implemented by a cloud backup pool (e.g., the data pool 642 of FIG. 6), S5 1024 may be implemented by an archive to an RCN (e.g., the data archive 616 of the RCN 602 of FIG. 6), S6 1026 may be implemented by a backup on a local node (e.g., a backup in the local storage 626, the backup storage 634, etc.), and S7 1028 may be implemented with any other data resiliency technique. For example S7 1028 may be implemented by a distributed ledger operation, a digital twin operation, a secondary node operation, a cloud backup pool operation, an archive operation, or a local node backup operation.

In the illustrated example, the Type-2 metadata are resiliency protected using example resiliency strategies, operations, techniques, etc., including the S1 and S3 strategies. In the illustrated example, the Type-4 metadata is protected using the S5 strategy and the Type-6 data is protected using the S6 strategy. In some examples, the possible resiliency strategies are not fixed and may be expanded and/or restricted according to the availability of strategies to the resiliency orchestrator 610.

In some examples, SLAs, such as the SLA 1004 of the illustrated example, can address dynamic terms of service customized for resiliency. For example, the user 1002 may protect data with two resiliency strategies (e.g., S1 and S3) for a configurable amount of time. In some such examples, once time expires, the overall resiliency strategy may fall back or revert to a less costly overall resiliency strategy (e.g., S4) or may terminate the utilization of resiliency strategies altogether. In some such examples, the resiliency orchestrator 610 may destroy data of certain representations that are not needed.

Figure 11:
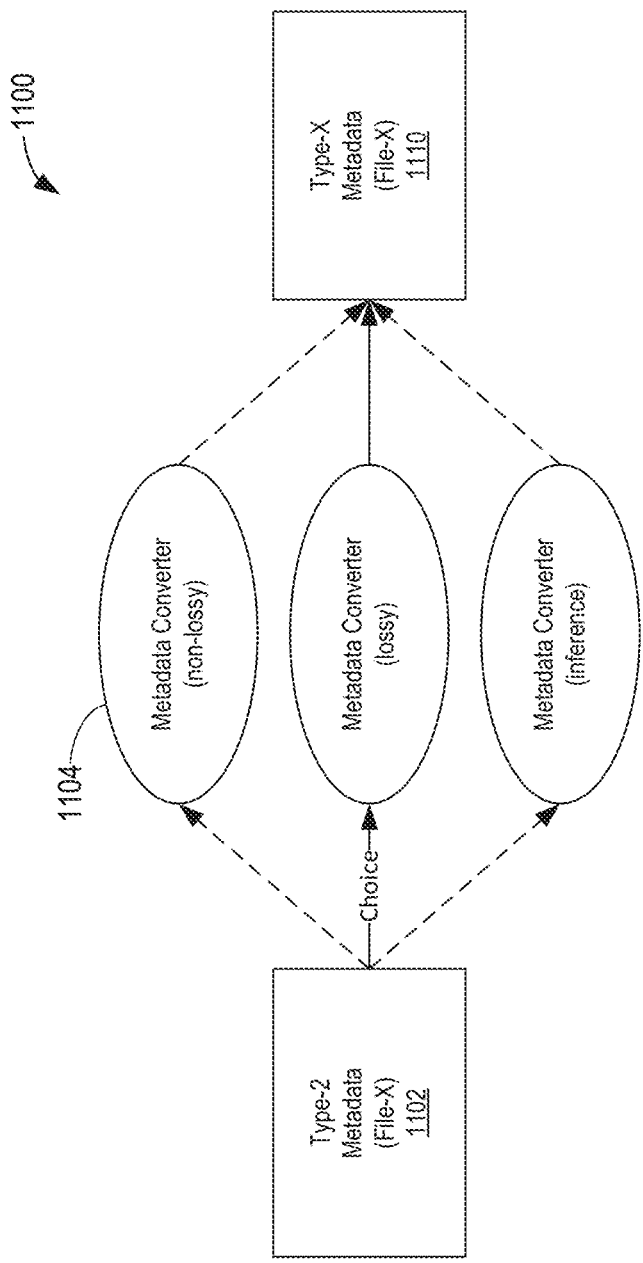
FIG. 11 is a third example workflow of example operations of the example RCN of FIGS. 6 and/or 7.

FIG. 11 is a third example workflow 1100 of example operations of the example RCN 602 of FIG. 6 and/or the resilient control circuitry 702 of FIG. 7. For example, the RCN 602 of FIG. 6 and/or the resilient control circuitry 702 of FIG. 7 may implement the third workflow 1100.

The third workflow 1100 may implement rendering of spectrum data from one or more of the other spectrum data types. For example, given example Type-2 metadata 1102 for File-X (e.g., a data object, the digital media object 804 of FIG. 8, etc.), the resilient control circuitry 700 of FIG. 7 may utilize an example metadata converter 1104 to render the Type-2 metadata 1102 into example Type-X metadata 1106, which may be implemented by one of different spectrum types (e.g., Type-1-Type-6). In this example, the metadata converter 1104 may implement a non-lossy operation (e.g., a non-lossy data recovery operation), a lossy operation (e.g., a lossy data reconstruction operation), or an inference operation (e.g., an inference data reconstruction operation). In some examples, the metadata converters 1104, 1106, 1108 may be implemented by the resiliency operation control circuitry 750 of FIG. 7.

In some examples, the resilient control circuitry 700 may select, choose, etc., a type of metadata to which to convert the Type-2 metadata 1102. For example, the resiliency operation control circuitry 750 may determine to execute a lossy operation when converting from a higher type (e.g., Type-6) to a lower type (e.g., Type-1). In some examples, the resiliency operation control circuitry 750 may select a non-lossy conversion when converting from a lower type (e.g., Type-2, Type-3, etc.) to a higher type (e.g., Type-4, Type-5, etc.). In some examples, the resiliency operation control circuitry 750 may select an inference engine such as a machine learning model (e.g., a CNN, a DNN, etc.) where an inference engine extrapolates synthetic data that approximates the original data. For example, the resiliency operation control circuitry 750 may reconstruct spectrum data using the Type-2 metadata 1102 by executing AI/ML model(s). In some examples, the metadata converter 1104 may reconstruct corrupted data resulting from FAFO events. For example, a metadata conversion from Type-4 to Type-2 where the input data is corrupted may rely on inference to reconstruct corrupted data.

Figure 12:
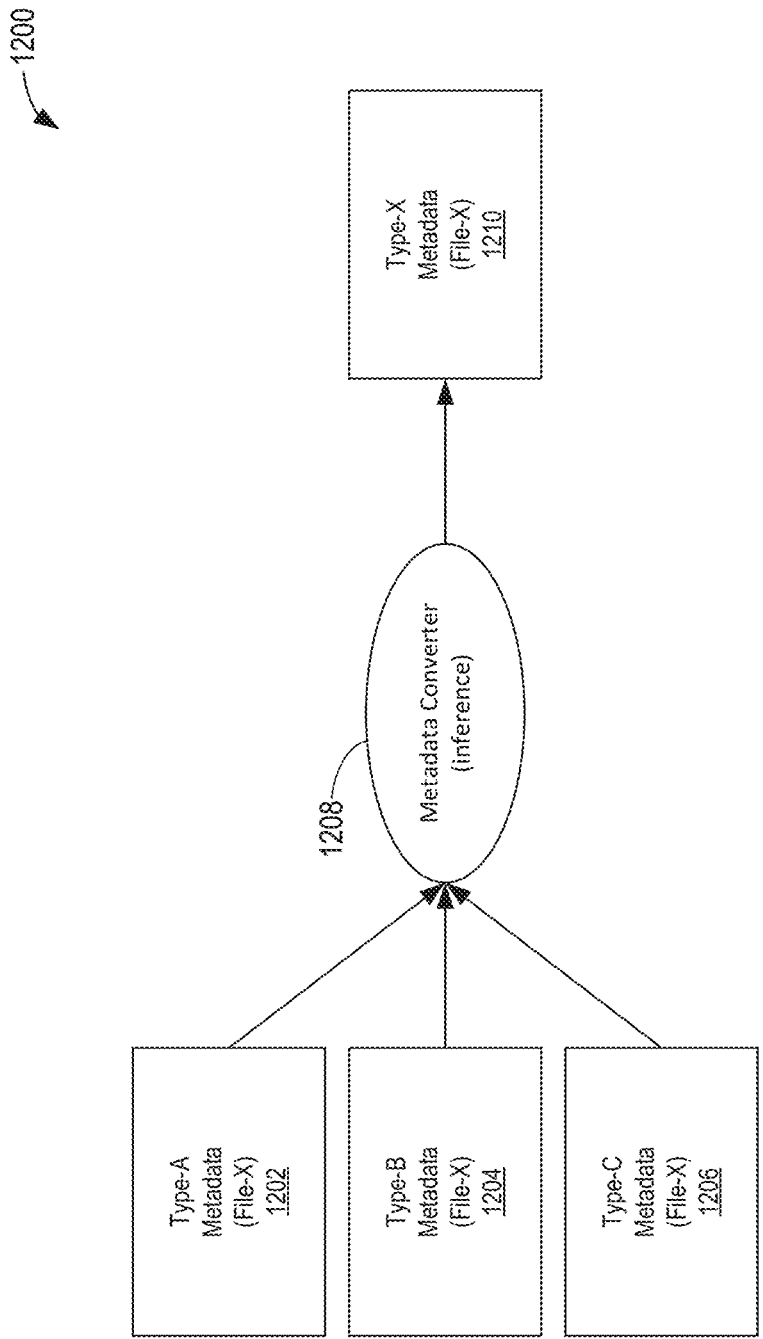
FIG. 12 is a fourth example workflow of example operations of the example RCN of FIGS. 6 and/or 7.

FIG. 12 is a fourth example workflow 1200 of example operations of the example RCN 602 of FIG. 6 and/or the resilient control circuitry 702 of FIG. 7. For example, the RCN 602 of FIG. 6 and/or the resilient control circuitry 702 of FIG. 7 may implement the fourth workflow 1200.

In the illustrated example, if multiple types of spectrum data exist, metadata conversion by inference may be more effective at recovering from FAFO events. For example, given Type-2, Type-3, Type-4 and Type-5 metadata (e.g., Type-A metadata 1202, Type-B metadata 1204, and Type-C metadata 1206, respectively in FIG. 12) and an example metadata converter 1208 that can generate synthetic data, a new Type-6 file (e.g., Type-X 1210 in FIG. 12) can be re-constructed that is nearly non-lossy. In some examples, the metadata converter 1208 may be implemented by an inference engine such as an inference converter, an AI/ML model, etc. In some such examples, the metadata converter 1208 may be implemented by the resiliency operation control circuitry 750 of FIG. 7.

Figure 13:
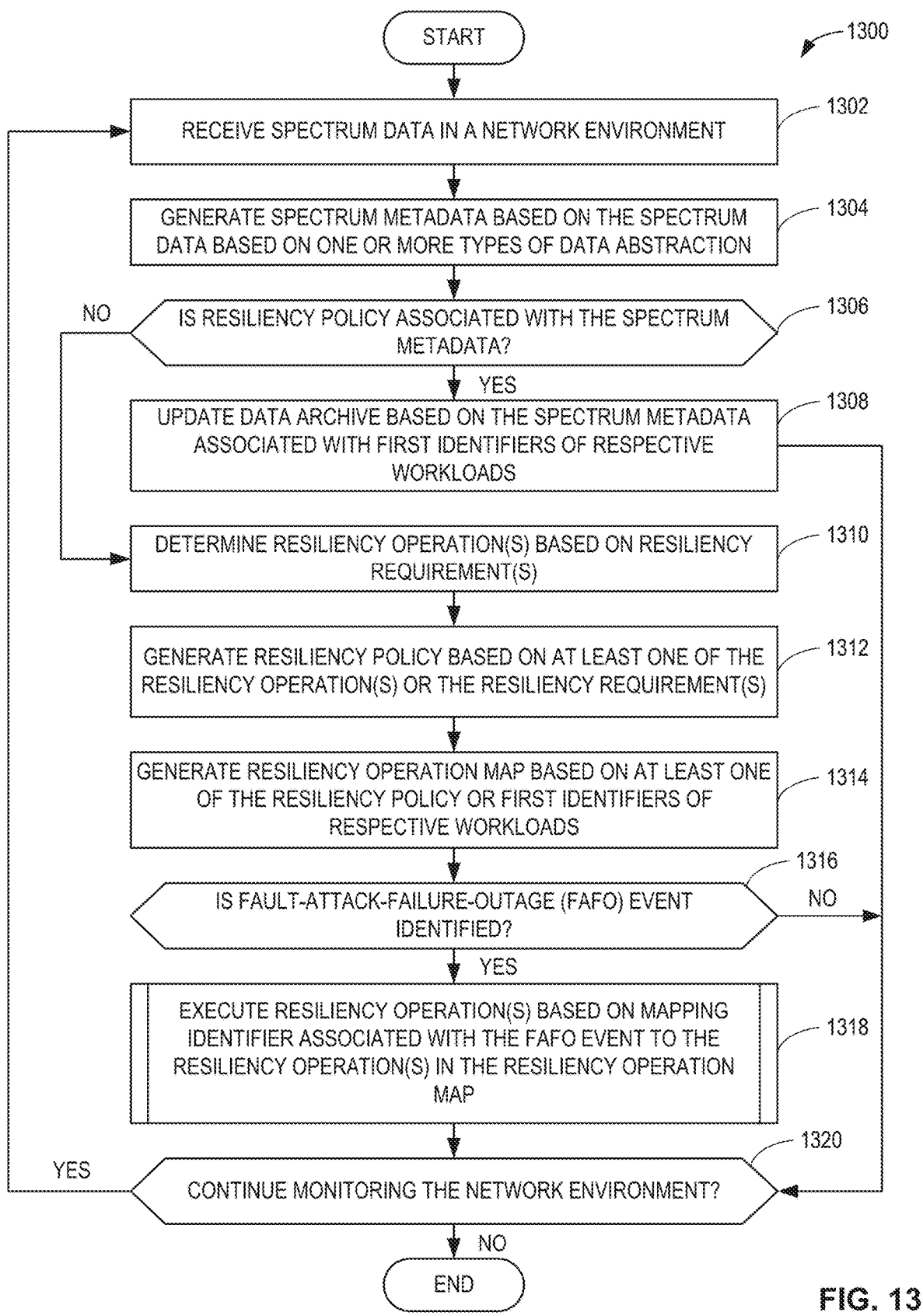
FIG. 13 is a flowchart representative of example machine readable instructions and/or example operations that may be executed by example processor circuitry to implement the example RCN of FIGS. 6 and/or 7 to execute resiliency operation(s) in a network environment.
Figure 14:
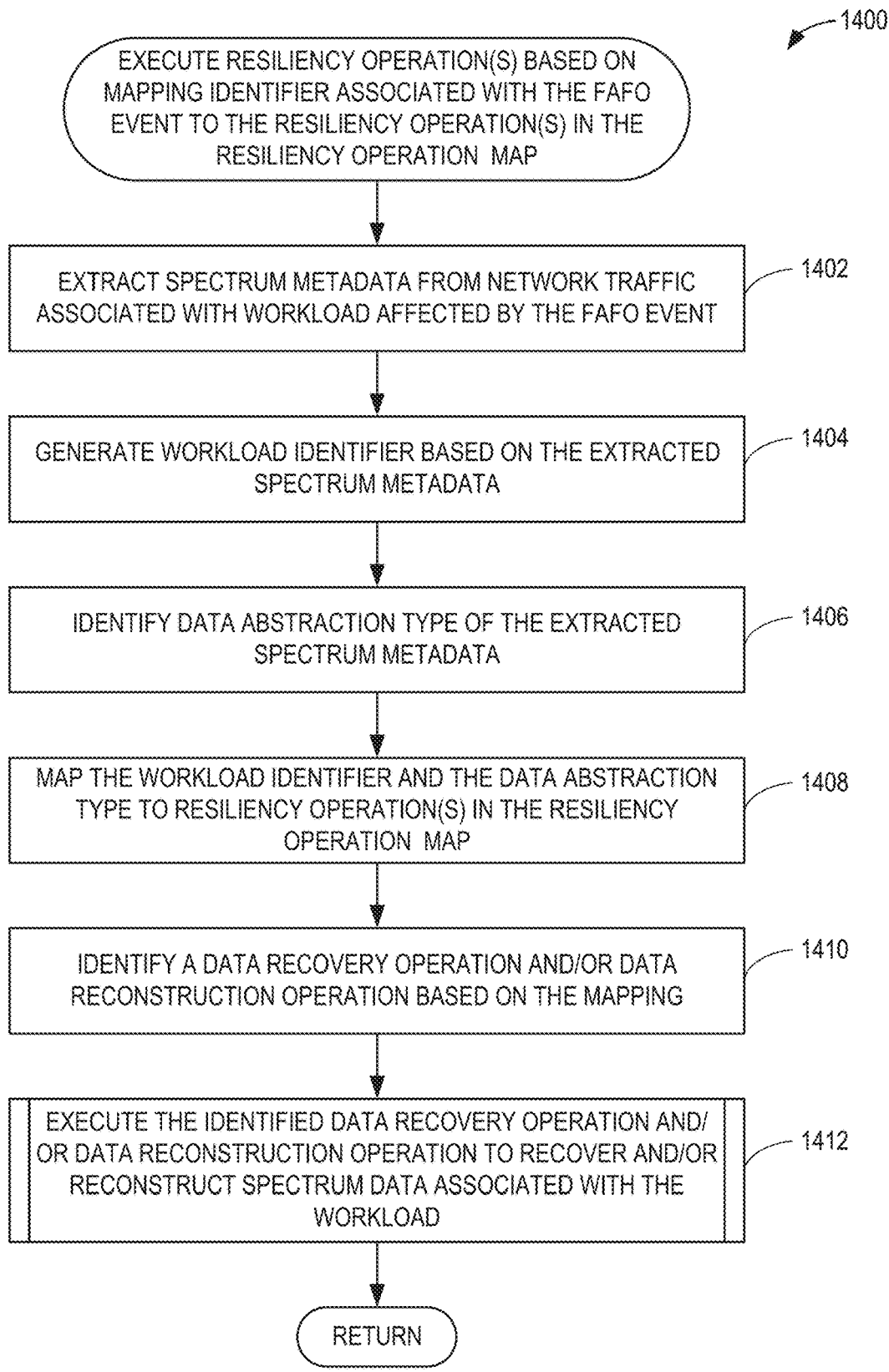
FIG. 14 is a flowchart representative of example machine readable instructions and/or example operations that may be executed by example processor circuitry to implement the example RCN of FIGS. 6 and/or 7 to execute resiliency operation(s) based on mapping an identifier associated with a fault-attack-failure-outage (FAFO) event to the resiliency operation(s) in a resiliency operation map.
Figure 15:
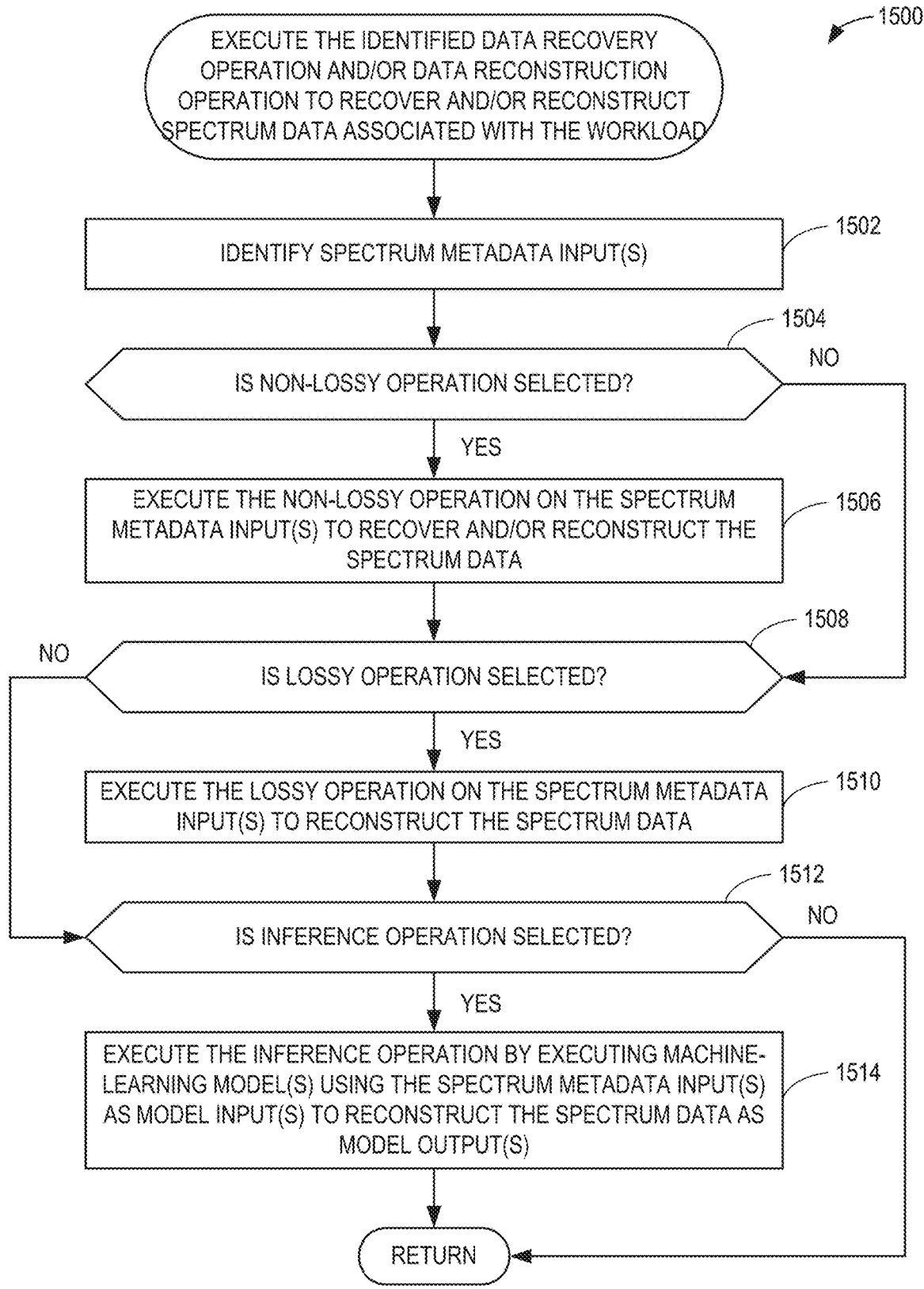
FIG. 15 is a flowchart representative of example machine readable instructions and/or example operations that may be executed by example processor circuitry to implement the example RCN of FIGS. 6 and/or 7 to execute an identified data recovery operation and/or data reconstruction operation to recover and/or reconstruct spectrum data associated with a workload.
Figure 16:
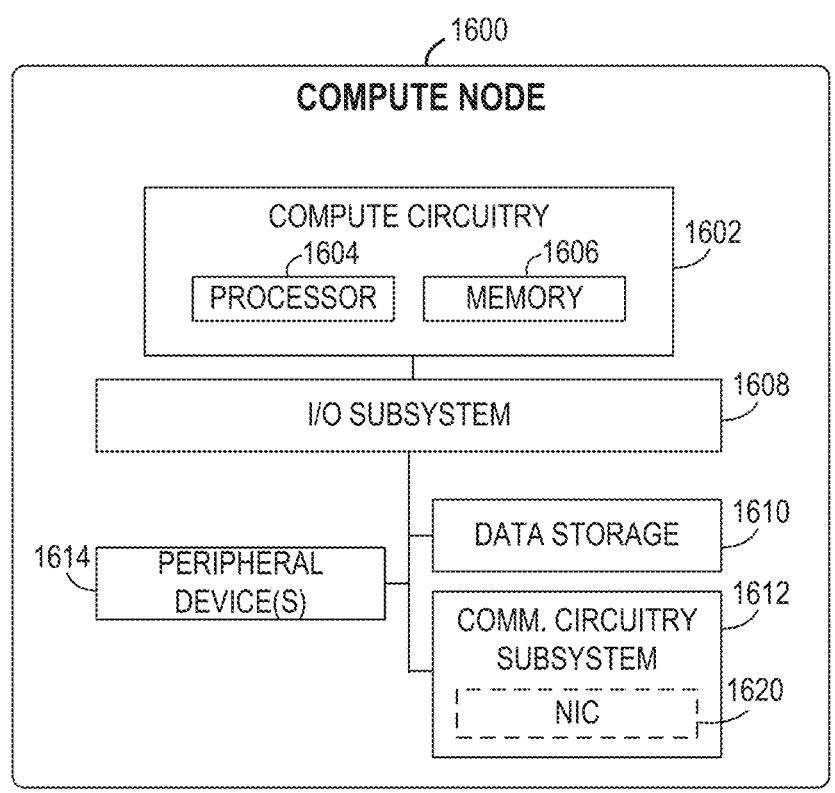
FIG. 16 provides an overview of example components for compute deployed at a compute node in an Edge computing system.

Flowcharts representative of example hardware logic circuitry, machine readable instructions, hardware implemented state machines, and/or any combination thereof for implementing the RCN 602 of FIG. 6 and/or the resilient control circuitry 700 of FIG. 7 are shown in FIGS. 13-15. The machine readable instructions may be one or more executable programs or portion(s) of an executable program for execution by processor circuitry, such as the processor 1604 of FIG. 16 shown in the example compute node 1600 discussed below in connection with FIG. 16, the processor 1752 shown in the example edge/IoT device 1750 discussed below in connection with FIG. 17, the processor circuitry 1812 shown in the example processor platform 1800 discussed below in connection with FIG. 18 and/or the example processor circuitry discussed below in connection with FIGS. 19 and/or 20. The program may be embodied in software stored on one or more non-transitory computer readable storage media such as a CD, a floppy disk, a hard disk drive (HDD), a solid-state drive (SSD), a DVD, a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 13-15, many other methods of implementing the example RCN 602 and/or the example resilient control circuitry 700 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 13-15 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 13 is a flowchart representative of example machine readable instructions and/or example operations 1300 that may be executed and/or instantiated by processor circuitry to execute resiliency operation(s) in a network environment. The machine readable instructions and/or the operations 1300 of FIG. 13 begin at block 1302, at which the resilient control circuitry 700 receives spectrum data in a network environment. For example, the network interface circuitry 710 (FIG. 7) may receive data based on a L1-L6 data abstraction representation.

At block 1304, the resilient control circuitry 700 generates spectrum metadata based on the spectrum data based on one or more types of data abstraction. For example, the metadata handler circuitry 720 (FIG. 7) may generate Type-1-Type-6 spectrum metadata based on the L1-L6 spectrum data.

At block 1306, the resilient control circuitry 700 determines whether a resiliency policy is associated with the spectrum metadata. For example, the resiliency policy handler circuitry 740 (FIG. 7) may determine whether the resiliency policy 776 is associated with the Type1-Type-6 spectrum metadata.

If, at block 1306, the resilient control circuitry 700 determines that there is a resiliency policy associated with the spectrum metadata, then, at block 1308, the resilient control circuitry 700 updates a data archive based on the spectrum metadata associated with first identifiers of respective workloads. For example, the resiliency policy handler circuitry 740 (FIG. 7) may update the data archive 616, the datastore 770, etc., based on the Type-1-Type-6 spectrum metadata associated with APP 1 ID 1, APP ID 2, etc., of FIG. 6 that corresponds to the spectrum metadata. In response to updating the data archive at block 1308, control proceeds to block 1320.

If, at block 1306, the resilient control circuitry 700 determines that there is not a resiliency policy associated with the spectrum metadata, control proceeds to block 1310 to determine resiliency operation(s) based on resiliency requirement(s). For example, the resiliency policy handler circuitry 740 may determine S1, S2, S3, S4 of FIG. 6, S1-S7 1016, 1018, 1020, 1022, 1024, 1026, 1028 of FIG. 10, etc. based on one or more resiliency requirements obtained from the user 1002, a computing device associated with the user 1002, etc.

At block 1312, the resilient control circuitry 700 generates a resiliency policy based on at least one of the resiliency operation(s) or the resiliency requirement(s). For example, the resiliency policy handler circuitry 740 may generate the resiliency policy 776 based on at least one of the one or more resiliency operations or the one or more resiliency requirements.

At block 1314, the resilient control circuitry 700 generates a resiliency operation map based on at least one of the resiliency policy or first identifiers of respective workloads. For example, the resiliency policy handler circuitry 740 may generate the resiliency strategy map 612 of FIG. 6, the resiliency operation map 778 of FIG. 7, etc., based on the identifier(s) 774, which may be implemented by APP 1 ID 1, APP ID 2, etc., of FIG. 6.

At block 1316, the resilient control circuitry 700 determines whether a fault-attack-failure-outage (FAFO) event is identified. For example, the alert manager circuitry 760 (FIG. 7) may determine that one(s) of the sensors 620, the first application 622, and/or, more generally, the device 604 of FIG. 6, is undergoing or has experienced a FAFO event.

If, at block 1316, the resilient control circuitry 700 determines that a FAFO event is not identified, control proceeds to block 1320, otherwise, the resilient control circuitry 700 executes resiliency operation(s) based on mapping an identifier associated with the FAFO event to the resiliency operation(s) in the resiliency operation map. For example, the data identifier circuitry 730 (FIG. 7) may generate the identifier(s) 774, such as APP ID 1 of FIG. 6, and map the identifier(s) 774 to the resiliency operation(s) in the resiliency operation map 778. An example process that may be implemented to execute and/or instantiate block 1318 is described below in connection with FIG. 14.

At block 1320, the resilient control circuitry 700 determines whether to continue monitoring the network environment. For example, the network interface circuitry 710 may determine whether to receive additional spectrum data in the network environment 600 of FIG. 6. If, at block 1320, the resilient control circuitry 700 determines to continue monitoring the network environment, control returns to block 1302, otherwise the example machine readable instructions and/or the operations 1300 of FIG. 13 conclude.

FIG. 14 is a flowchart representative of example machine readable instructions and/or example operations 1400 that may be executed and/or instantiated by processor circuitry to execute resiliency operation(s) based on mapping an identifier associated with a fault-attack-failure-outage (FAFO) event to the resiliency operation(s) in a resiliency operation map. The machine readable instructions and/or the operations 1400 of FIG. 14 may be executed and/or instantiated to implement block 1318 of the example machine readable instructions and/or the operations 1300 of FIG. 13.

The machine readable instructions and/or the operations 1400 of FIG. 14 begin at block 1402, at which the resilient control circuitry 700 extracts spectrum metadata from network traffic associated with a workload affected by the FAFO event. For example, the metadata handler circuitry 720 (FIG. 7) may extract one(s) of Type-1-Type-6 spectrum metadata from a message, network traffic, etc., in one(s) of L1-L6 data abstraction representation(s). In some such examples, the spectrum metadata may be associated with network traffic generated the device 604, which may be experiencing a FAFO event.

At block 1404, the resilient control circuitry 700 generates a workload identifier based on the extracted spectrum metadata. For example, the data identifier circuitry 730 (FIG. 7) may generate one(s) of the identifier(s) 774 based on hash(es) of the extracted spectrum metadata and/or the spectrum data. In some examples, the data identifier circuitry 730 may generate one(s) of the identifiers 814, 824, 834, 844 of FIG. 8 based on the network traffic and/or the extracted spectrum metadata from the network traffic.

At block 1406, the resilient control circuitry 700 identifies a data abstraction type of the extracted spectrum metadata. For example, the data identifier circuitry 730 may identify that the extracted spectrum metadata is Type-1 metadata, Type-2 metadata, etc.

At block 1408, the resilient control circuitry 700 maps the workload identifier and the data abstraction type to resiliency operation(s) in the resiliency operation map. For example, the resiliency policy handler circuitry 740 (FIG. 7) may map an identifier of APP ID 1 and a Type-2 metadata type to S1 in the resiliency strategy map 612 of FIG. 6. In some such examples, S1 may correspond to a distributed ledger technology based operation as depicted in the illustrated example of FIG. 10.

At block 1410, the resilient control circuitry 700 identifies a data recovery operation and/or a data reconstruction operation based on the mapping. For example, the resiliency policy handler circuitry 740 may determine that the mapped resiliency operation is a data recovery operation (e.g., S3 1020, S4 1022, S5 1024, S6 1026, etc. of FIG. 10) or a data reconstruction operation (e.g., S1 1016, S2 1018, an inference operation with AI/ML model(s), etc.).

At block 1412, the resilient control circuitry 700 executes the identified data recovery operation and/or the data reconstruction operation to recover and/or reconstruct spectrum data associated with the workload. For example, the resiliency operation control circuitry 750 (FIG. 7) may execute a data recovery operation by recovering the spectrum data from the local storage 626, the backup storage 634, or from the data pool 642. In some examples, the resiliency operation control circuitry 750 may execute a data reconstruction operation by causing AI/ML model(s) to infer the data from the spectrum metadata. An example process that may be implemented to execute and/or instantiate block 1412 is described below in connection with FIG. 15.

In response to executing the identified data recovery operation and/or the data reconstruction operation to recover and/or reconstruct spectrum data associated with the workload at block 1412, the example machine readable instructions and/or the example operations 1400 of FIG. 14 conclude. For example, the machine readable instructions and/or the operations 1400 of FIG. 14 may return to block 1320 of the machine readable instructions and/or the operations 1300 of FIG. 13.

FIG. 15 is a flowchart representative of example machine readable instructions and/or example operations 1500 that may be executed and/or instantiated by processor circuitry to execute an identified data recovery operation and/or data reconstruction operation to recover and/or reconstruct spectrum data associated with a workload. The machine readable instructions and/or the operations 1500 of FIG. 15 begin at block 1502, at which the resilient control circuitry 700 identifies spectrum metadata input(s). For example, the metadata handler circuitry 720 (FIG. 7) may identify one(s) of the Type-A metadata 1202, the Type-B metadata 1204, and/or the Type-C metadata 1206 of FIG. 12 as metadata input(s) to the metadata converter 1208 of FIG. 12.

At block 1504, the resilient control circuitry 700 determines whether a non-lossy operation is selected. For example, the resiliency policy handler circuitry 740 (FIG. 7) may select a non-lossy operation (e.g., a non-lossy resiliency operation) to recover data that is corrupt, lost, inaccessible, desired, etc., associated with the metadata input(s).

If, at block 1504, the resilient control circuitry 700 determines not to select a non-lossy operation, control proceeds to block 1508, otherwise the resilient control circuitry 700 executes the non-lossy operation on the spectrum metadata input(s) to recover and/or reconstruct the spectrum data. For example, the resiliency operation control circuitry 750 (FIG. 7) may execute the non-lossy operation to recover and/or reconstruct the corrupt, lost, inaccessible, desired, etc., data associated with the metadata input(s).

At block 1508, the resilient control circuitry 700 determines whether a lossy operation is selected. For example, the resiliency policy handler circuitry 740 may select a lossy operation (e.g., a lossy resiliency operation) to reconstruct data that is corrupt, lost, inaccessible, desired, etc., data associated with the metadata input(s).

If, at block 1508, the resilient control circuitry 700 determines not to select a lossy operation, control proceeds to block 1512, otherwise the resilient control circuitry 700 executes the lossy operation on the spectrum metadata input(s) to reconstruct the spectrum data. For example, the resiliency operation control circuitry 750 may execute the lossy operation to reconstruct the corrupt, lost, inaccessible, desired, etc., data associated with the metadata input(s).

At block 1512, the resilient control circuitry 700 determines whether an inference operation is selected. For example, the resiliency policy handler circuitry 740 may select an inference operation (e.g., an inference resiliency operation, an AWL-based resiliency operation, etc.) to reconstruct data that is corrupt, lost, inaccessible, desired, etc., data associated with the metadata input(s).

If, at block 1512, the resilient control circuitry 700 determines not to select an inference operation, the example machine readable instructions and/or the example operations 1500 of FIG. 15 conclude. For example, the machine readable instructions and/or the operations 1500 of FIG. 15 may return to block 1320 of the machine readable instructions and/or the operations 1300 of FIG. 13 (e.g., by way of returning from block 1412 of the machine readable instructions and/or the operations 1400 of FIG. 14).

If, at block 1512, the resilient control circuitry 700 determines to select an inference operation, the resilient control circuitry 700 executes the inference operation by executing machine-learning model(s) using the spectrum metadata input(s) as model input(s) to reconstruct the spectrum data as model output(s). For example, the resiliency operation control circuitry 750 may execute AI/ML model(s) using the metadata spectrum input(s) as AI/ML model input(s) to reconstruct the corrupt, lost, inaccessible, desired, etc., data associated with the metadata input(s) as AI/ML model output(s).

In response to executing the inference operation at block 1514, the example machine readable instructions and/or the example operations 1500 of FIG. 15 conclude. For example, the machine readable instructions and/or the operations 1500 of FIG. 15 may return to block 1320 of the machine readable instructions and/or the operations 1300 of FIG. 13 (e.g., by way of returning from block 1412 of the machine readable instructions and/or the operations 1400 of FIG. 14).

In further examples, any of the compute nodes or devices discussed with reference to the present Edge computing systems and environment may be fulfilled based on the components depicted in FIGS. 16 and 17. Respective Edge compute nodes may be embodied as a type of device, appliance, computer, or other "thing" capable of communicating with other Edge, networking, or endpoint components. For example, an Edge compute device may be embodied as a personal computer, server, smartphone, a mobile compute device, a smart appliance, an in-vehicle compute system (e.g., a navigation system), a self-contained device having an outer case, shell, etc., or other device or system capable of performing the described functions.

In the simplified example depicted in FIG. 16, an Edge compute node 1600 includes a compute engine (also referred to herein as "compute circuitry") 1602, an input/output (I/O) subsystem (also referred to herein as "I/O circuitry") 1608, data storage (also referred to herein as "data storage circuitry") 1610, a communication circuitry subsystem 1612, and, optionally, one or more peripheral devices (also referred to herein as "peripheral device circuitry") 1614. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 1600 may be embodied as any type of engine, device, or collection of devices capable of performing various compute functions. In some examples, the compute node 1600 may be embodied as a single device such as an integrated circuit, an embedded system, a field-programmable gate array (FPGA), a system-on-a-chip (SOC), or other integrated system or device. In the illustrative example, the compute node 1600 includes or is embodied as a processor (also referred to herein as "processor circuitry") 1604 and a memory (also referred to herein as "memory circuitry") 1606. The processor 1604 may be embodied as any type of processor(s) capable of performing the functions described herein (e.g., executing an application). For example, the processor 1604 may be embodied as a multi-core processor(s), a microcontroller, a processing unit, a specialized or special purpose processing unit, or other processor or processing/controlling circuit.

In some examples, the processor 1604 may be embodied as, include, or be coupled to an FPGA, an application specific integrated circuit (ASIC), reconfigurable hardware or hardware circuitry, or other specialized hardware to facilitate performance of the functions described herein. Also in some examples, the processor 1604 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, storage disks, or AI hardware (e.g., GPUs, programmed FPGAs, or ASICs tailored to implement an AI model such as a neural network). Such an xPU may be designed to receive, retrieve, and/or otherwise obtain programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that an xPU, an SOC, a CPU, and other variations of the processor 1604 may work in coordination with each other to execute many types of operations and instructions within and on behalf of the compute node 1600.

The memory 1606 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device (e.g., memory circuitry) is any number of block addressable memory devices, such as those based on NAND or NOR technologies (for example, Single-Level Cell ("SLC"), Multi-Level Cell ("MLC"), Quad-Level Cell ("QLC"), Tri-Level Cell ("TLC"), or some other NAND). In some examples, the memory device(s) includes a byte-addressable write-in-place three dimensional crosspoint memory device, or other byte addressable write-in-place non-volatile memory (NVM) devices, such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric transistor random access memory (FeTRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, a combination of any of the above, or other suitable memory. A memory device may also include a three-dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may include a transistor-less stackable cross point architecture in which memory cells sit at the intersection of word lines and bit lines and are individually addressable and in which bit storage is based on a change in bulk resistance. In some examples, all or a portion of the memory 1606 may be integrated into the processor 1604. The memory 1606 may store various software and data used during operation such as one or more applications, data operated on by the application(s), libraries, and drivers.

In some examples, resistor-based and/or transistor-less memory architectures include nanometer scale phase-change memory (PCM) devices in which a volume of phase-change material resides between at least two electrodes. Portions of the example phase-change material exhibit varying degrees of crystalline phases and amorphous phases, in which varying degrees of resistance between the at least two electrodes can be measured. In some examples, the phase-change material is a chalcogenide-based glass material. Such resistive memory devices are sometimes referred to as memristive devices that remember the history of the current that previously flowed through them. Stored data is retrieved from example PCM devices by measuring the electrical resistance, in which the crystalline phases exhibit a relatively lower resistance value(s) (e.g., logical "0") when compared to the amorphous phases having a relatively higher resistance value(s) (e.g., logical "1").

Example PCM devices store data for long periods of time (e.g., approximately 10 years at room temperature). Write operations to example PCM devices (e.g., set to logical "0", set to logical "1", set to an intermediary resistance value) are accomplished by applying one or more current pulses to the at least two electrodes, in which the pulses have a particular current magnitude and duration. For instance, a long low current pulse (SET) applied to the at least two electrodes causes the example PCM device to reside in a low-resistance crystalline state, while a comparatively short high current pulse (RESET) applied to the at least two electrodes causes the example PCM device to reside in a high-resistance amorphous state.

In some examples, implementation of PCM devices facilitates non-von Neumann computing architectures that enable in-memory computing capabilities. Generally speaking, traditional computing architectures include a central processing unit (CPU) communicatively connected to one or more memory devices via a bus. As such, a finite amount of energy and time is consumed to transfer data between the CPU and memory, which is a known bottleneck of von Neumann computing architectures. However, PCM devices minimize and, in some cases, eliminate data transfers between the CPU and memory by performing some computing operations in-memory. Stated differently, PCM devices both store information and execute computational tasks. Such non-von Neumann computing architectures may implement vectors having a relatively high dimensionality to facilitate hyperdimensional computing, such as vectors having 10,000 bits. Relatively large bit width vectors enable computing paradigms modeled after the human brain, which also processes information analogous to wide bit vectors.

The compute circuitry 1602 is communicatively coupled to other components of the compute node 1600 via the I/O subsystem 1608, which may be embodied as circuitry and/or components to facilitate input/output operations with the compute circuitry 1602 (e.g., with the processor 1604 and/or the main memory 1606) and other components of the compute circuitry 1602. For example, the I/O subsystem 1608 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 1608 may form a portion of a system-on-a-chip (SoC) and be incorporated, along with one or more of the processor 1604, the memory 1606, and other components of the compute circuitry 1602, into the compute circuitry 1602.

The one or more illustrative data storage devices/disks 1610 may be embodied as one or more of any type(s) of physical device(s) configured for short-term or long-term storage of data such as, for example, memory devices, memory, circuitry, memory cards, flash memory, hard disk drives (HDDs), solid-state drives (SSDs), and/or other data storage devices/disks. Individual data storage devices/disks 1610 may include a system partition that stores data and firmware code for the data storage device/disk 1610. Individual data storage devices/disks 1610 may also include one or more operating system partitions that store data files and executables for operating systems depending on, for example, the type of compute node 1600.

The communication circuitry 1612 may be embodied as any communication circuit, device, or collection thereof, capable of enabling communications over a network between the compute circuitry 1602 and another compute device (e.g., an Edge gateway of an implementing Edge computing system). The communication circuitry 1612 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 1612 includes a network interface controller (NIC) 1620, which may also be referred to as a host fabric interface (HFI). The NIC 1620 may be embodied as one or more add-in-boards, daughter cards, network interface cards, controller chips, chipsets, or other devices that may be used by the compute node 1600 to connect with another compute device (e.g., an Edge gateway node). In some examples, the NIC 1620 may be embodied as part of a system-on-a-chip (SoC) that includes one or more processors, or included on a multichip package that also contains one or more processors. In some examples, the NIC 1620 may include a local processor (not shown) and/or a local memory (not shown) that are both local to the NIC 1620. In such examples, the local processor of the NIC 1620 may be capable of performing one or more of the functions of the compute circuitry 1602 described herein. Additionally, or alternatively, in such examples, the local memory of the NIC 1620 may be integrated into one or more components of the client compute node at the board level, socket level, chip level, and/or other levels.

Additionally, in some examples, a respective compute node 1600 may include one or more peripheral devices 1614. Such peripheral devices 1614 may include any type of peripheral device found in a compute device or server such as audio input devices, a display, other input/output devices, interface devices, and/or other peripheral devices, depending on the particular type of the compute node 1600. In further examples, the compute node 1600 may be embodied by a respective Edge compute node (whether a client, gateway, or aggregation node) in an Edge computing system or like forms of appliances, computers, subsystems, circuitry, or other components.

Figure 17:
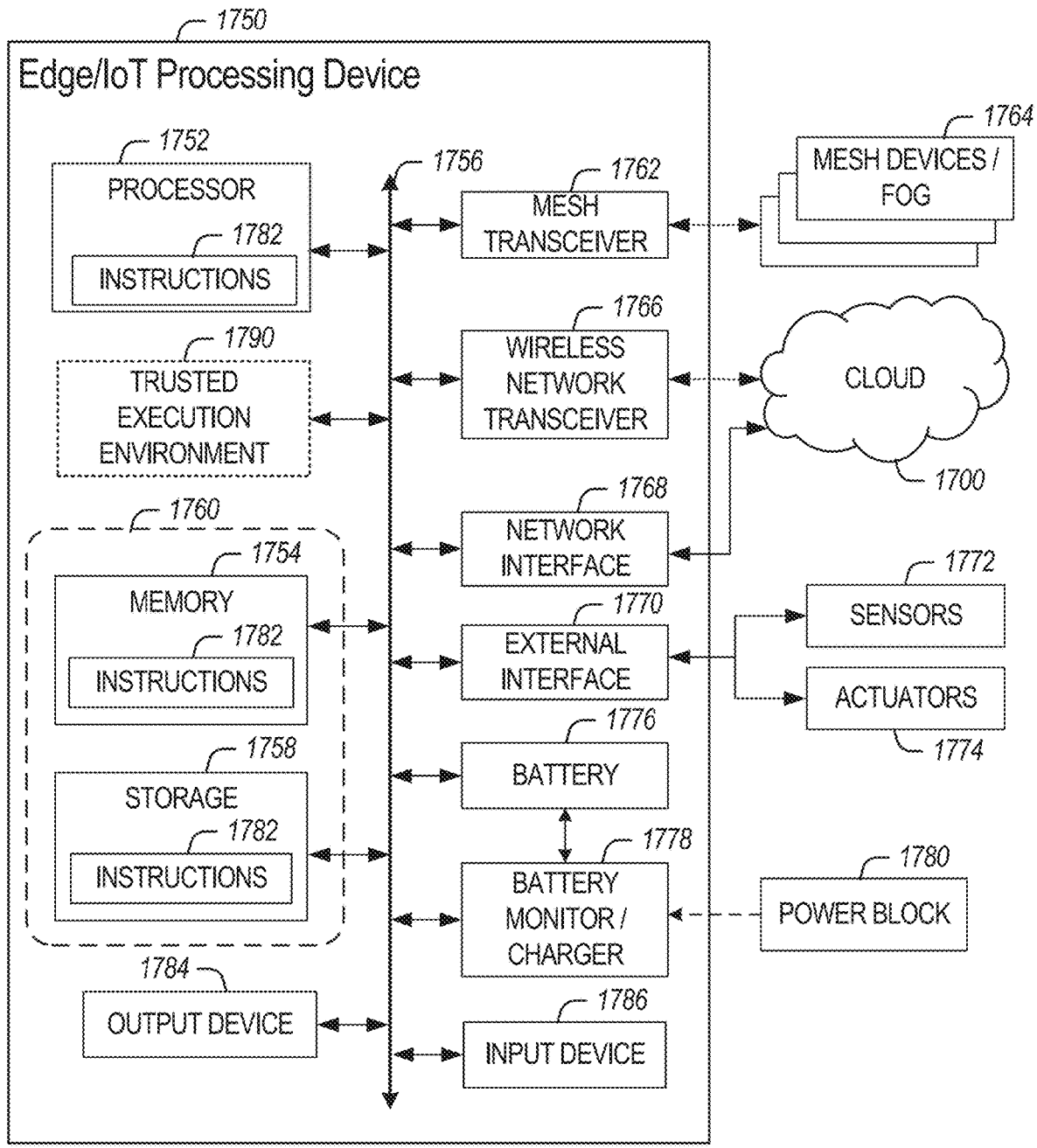
FIG. 17 provides a further overview of example components within a computing device in an Edge computing system.

In a more detailed example, FIG. 17 illustrates a block diagram of an example of components that may be present in an Edge computing node 1750 for implementing the techniques (e.g., operations, processes, methods, and methodologies) described herein. This Edge computing node 1750 provides a closer view of the respective components of node 1700 when implemented as or as part of a computing device (e.g., as a mobile device, a base station, server, gateway, etc.). The Edge computing node 1750 may include any combination of the hardware or logical components referenced herein, and it may include or couple with any device usable with an Edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the Edge computing node 1750, or as components otherwise incorporated within a chassis of a larger system.

The Edge computing device 1750 may include processing circuitry in the form of a processor 1752, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 1752 may be a part of a system on a chip (SoC) in which the processor 1752 and other components are formed into a single integrated circuit, or a single package, such as the Edison™ or Galileo™ SoC boards from Intel Corporation, Santa Clara, California. As an example, the processor 1752 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 1752 and accompanying circuitry may be provided in a single socket form factor, multiple socket form factor, or a variety of other formats, including in limited hardware configurations or configurations that include fewer than all elements shown in FIG. 17.

The processor 1752 may communicate with a system memory 1754 over an interconnect 1756 (e.g., a bus). Any number of memory devices may be used to provide for a given amount of system memory. As examples, the memory 1754 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDDIMMs or MiniDIMMs.

To provide for persistent storage of information such as data, applications, operating systems and so forth, a storage 1758 may also couple to the processor 1752 via the interconnect 1756. In an example, the storage 1758 may be implemented via a solid-state disk drive (SSDD). Other devices that may be used for the storage 1758 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 1758 may be on-die memory or registers associated with the processor 1752. However, in some examples, the storage 1758 may be implemented using a micro hard disk drive (HDD). Further, any number of new technologies may be used for the storage 1758 in addition to, or instead of, the technologies described, such resistance change memories, phase change memories, holographic memories, or chemical memories, among others.

The components may communicate over the interconnect 1756. The interconnect 1756 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1756 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 1756 may couple the processor 1752 to a transceiver 1766, for communications with the connected Edge devices 1762. The transceiver 1766 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected Edge devices 1762. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 1766 (or multiple transceivers) may communicate using multiple standards or radios for communications at a different range. For example, the Edge computing node 1750 may communicate with close devices, e.g., within about 10 meters, using a local transceiver based on Bluetooth Low Energy (BLE), or another low power radio, to save power. More distant connected Edge devices 1762, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 1766 (e.g., a radio transceiver) may be included to communicate with devices or services in a cloud (e.g., an Edge cloud 1795) via local or wide area network protocols. The wireless network transceiver 1766 may be a low-power wide-area (LPWA) transceiver that follows the IEEE 802.15.4, or IEEE 802.15.4g standards, among others. The Edge computing node 1750 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 1766, as described herein. For example, the transceiver 1766 may include a cellular transceiver that uses spread spectrum (SPA/SAS) communications for implementing high-speed communications. Further, any number of other protocols may be used, such as Wi-Fi® networks for medium speed communications and provision of network communications. The transceiver 1766 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 1768 may be included to provide a wired communication to nodes of the Edge cloud 1795 or to other devices, such as the connected Edge devices 1762 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 1768 may be included to enable connecting to a second network, for example, a first NIC 1768 providing communications to the cloud over Ethernet, and a second NIC 1768 providing communications to other devices over another type of network.

Given the variety of types of applicable communications from the device to another component or network, applicable communications circuitry used by the device may include or be embodied by any one or more of components 1764, 1766, 1768, or 1770. Accordingly, in various examples, applicable means for communicating (e.g., receiving, transmitting, etc.) may be embodied by such communications circuitry.

The Edge computing node 1750 may include or be coupled to acceleration circuitry 1764, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific Edge computing tasks for service management and service operations discussed elsewhere in this document.

The interconnect 1756 may couple the processor 1752 to a sensor hub or external interface 1770 that is used to connect additional devices or subsystems. The devices may include sensors 1772, such as accelerometers, level sensors, flow sensors, optical light sensors, camera sensors, temperature sensors, global navigation system (e.g., GPS) sensors, pressure sensors, barometric pressure sensors, and the like. The hub or interface 1770 further may be used to connect the Edge computing node 1750 to actuators 1774, such as power switches, valve actuators, an audible sound generator, a visual warning device, and the like.

In some optional examples, various input/output (I/O) devices may be present within or connected to, the Edge computing node 1750. For example, a display or other output device 1784 may be included to show information, such as sensor readings or actuator position. An input device 1786, such as a touch screen or keypad may be included to accept input. An output device 1784 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the Edge computing node 1750. A display or console hardware, in the context of the present system, may be used to provide output and receive input of an Edge computing system; to manage components or services of an Edge computing system; identify a state of an Edge computing component or service; or to conduct any other number of management or administration functions or service use cases.

A battery 1776 may power the Edge computing node 1750, although, in examples in which the Edge computing node 1750 is mounted in a fixed location, it may have a power supply coupled to an electrical grid, or the battery may be used as a backup or for temporary capabilities. The battery 1776 may be a lithium ion battery, or a metal-air battery, such as a zinc-air battery, an aluminum-air battery, a lithium-air battery, and the like.

A battery monitor/charger 1778 may be included in the Edge computing node 1750 to track the state of charge (SoCh) of the battery 1776, if included. The battery monitor/charger 1778 may be used to monitor other parameters of the battery 1776 to provide failure predictions, such as the state of health (SoH) and the state of function (SoF) of the battery 1776. The battery monitor/charger 1778 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, TX. The battery monitor/charger 1778 may communicate the information on the battery 1776 to the processor 1752 over the interconnect 1756. The battery monitor/charger 1778 may also include an analog-to-digital (ADC) converter that enables the processor 1752 to directly monitor the voltage of the battery 1776 or the current flow from the battery 1776. The battery parameters may be used to determine actions that the Edge computing node 1750 may perform, such as transmission frequency, mesh network operation, sensing frequency, and the like.

A power block 1780, or other power supply coupled to a grid, may be coupled with the battery monitor/charger 1778 to charge the battery 1776. In some examples, the power block 1780 may be replaced with a wireless power receiver to obtain the power wirelessly, for example, through a loop antenna in the Edge computing node 1750. A wireless battery charging circuit, such as an LTC4020 chip from Linear Technologies of Milpitas, California, among others, may be included in the battery monitor/charger 1778. The specific charging circuits may be selected based on the size of the battery 1776, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1758 may include instructions 1782 in the form of software, firmware, or hardware commands to implement the techniques described herein. Although such instructions 1782 are shown as code blocks included in the memory 1754 and the storage 1758, it may be understood that any of the code blocks may be replaced with hardwired circuits, for example, built into an application specific integrated circuit (ASIC).

In an example, the instructions 1782 provided via the memory 1754, the storage 1758, or the processor 1752 may be embodied as a non-transitory, machine-readable medium 1760 including code to direct the processor 1752 to perform electronic operations in the Edge computing node 1750. The processor 1752 may access the non-transitory, machine-readable medium 1760 over the interconnect 1756. For instance, the non-transitory, machine-readable medium 1760 may be embodied by devices described for the storage 1758 or may include specific storage units such as storage devices and/or storage disks that include optical disks (e.g., digital versatile disk (DVD), compact disk (CD), CD-ROM, Blu-ray disk), flash drives, floppy disks, hard drives (e.g., SSDs), or any number of other hardware devices in which information is stored for any duration (e.g., for extended time periods, permanently, for brief instances, for temporarily buffering, and/or caching). The non-transitory, machine-readable medium 1760 may include instructions to direct the processor 1752 to perform a specific sequence or flow of actions, for example, as described with respect to the flowchart(s) and block diagram(s) of operations and functionality depicted above. As used herein, the terms "machine-readable medium" and "computer-readable medium" are interchangeable. As used herein, the term "non-transitory computer-readable medium" is expressly defined to include any type of computer readable storage device and/or storage disk and to exclude propagating signals and to exclude transmission media.

Also in a specific example, the instructions 1782 on the processor 1752 (separately, or in combination with the instructions 1782 of the machine readable medium 1760) may configure execution or operation of a trusted execution environment (TEE) 1790. In an example, the TEE 1790 operates as a protected area accessible to the processor 1752 for secure execution of instructions and secure access to data. Various implementations of the TEE 1790, and an accompanying secure area in the processor 1752 or the memory 1754 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 1750 through the TEE 1790 and the processor 1752.

While the illustrated examples of FIG. 16 and FIG. 17 include example components for a compute node and a computing device, respectively, examples disclosed herein are not limited thereto. As used herein, a "computer" may include some or all of the example components of FIGS. 16 and/or 17 in different types of computing environments. Example computing environments include Edge computing devices (e.g., Edge computers) in a distributed networking arrangement such that particular ones of participating Edge computing devices are heterogenous or homogeneous devices. As used herein, a "computer" may include a personal computer, a server, user equipment, an accelerator, etc., including any combinations thereof. In some examples, distributed networking and/or distributed computing includes any number of such Edge computing devices as illustrated in FIGS. 16 and/or 17, each of which may include different sub-components, different memory capacities, I/O capabilities, etc. For example, because some implementations of distributed networking and/or distributed computing are associated with particular desired functionality, examples disclosed herein include different combinations of components illustrated in FIGS. 16 and/or 17 to satisfy functional objectives of distributed computing tasks. In some examples, the term "compute node" or "computer" only includes the example processor 1604, memory 1606 and I/O subsystem 1608 of FIG. 16. In some examples, one or more objective functions of a distributed computing task(s) rely on one or more alternate devices/structure located in different parts of an Edge networking environment, such as devices to accommodate data storage (e.g., the example data storage 1610), input/output capabilities (e.g., the example peripheral device(s) 1614), and/or network communication capabilities (e.g., the example NIC 1620).

In some examples, computers operating in a distributed computing and/or distributed networking environment (e.g., an Edge network) are structured to accommodate particular objective functionality in a manner that reduces computational waste. For instance, because a computer includes a subset of the components disclosed in FIGS. 16 and 17, such computers satisfy execution of distributed computing objective functions without including computing structure that would otherwise be unused and/or underutilized. As such, the term "computer" as used herein includes any combination of structure of FIGS. 16 and/or 17 that is capable of satisfying and/or otherwise executing objective functions of distributed computing tasks. In some examples, computers are structured in a manner commensurate to corresponding distributed computing objective functions in a manner that downscales or upscales in connection with dynamic demand. In some examples, different computers are invoked and/or otherwise instantiated in view of their ability to process one or more tasks of the distributed computing request(s), such that any computer capable of satisfying the tasks proceed with such computing activity.

In the illustrated examples of FIGS. 16 and 17, computing devices include operating systems. As used herein, an "operating system" is software to control example computing devices, such as the example Edge compute node 1600 of FIG. 16 and/or the example Edge compute node 1750 of FIG. 17. Example operating systems include, but are not limited to consumer-based operating systems (e.g., Microsoft® Windows® 10, Google® Android® OS, Apple® Mac® OS, etc.). Example operating systems also include, but are not limited to industry-focused operating systems, such as real-time operating systems, hypervisors, etc. An example operating system on a first Edge compute node may be the same or different than an example operating system on a second Edge compute node. In some examples, the operating system invokes alternate software to facilitate one or more functions and/or operations that are not native to the operating system, such as particular communication protocols and/or interpreters. In some examples, the operating system instantiates various functionalities that are not native to the operating system. In some examples, operating systems include varying degrees of complexity and/or capabilities. For instance, a first operating system corresponding to a first Edge compute node includes a real-time operating system having particular performance expectations of responsivity to dynamic input conditions, and a second operating system corresponding to a second Edge compute node includes graphical user interface capabilities to facilitate end-user I/O.

Figure 18:
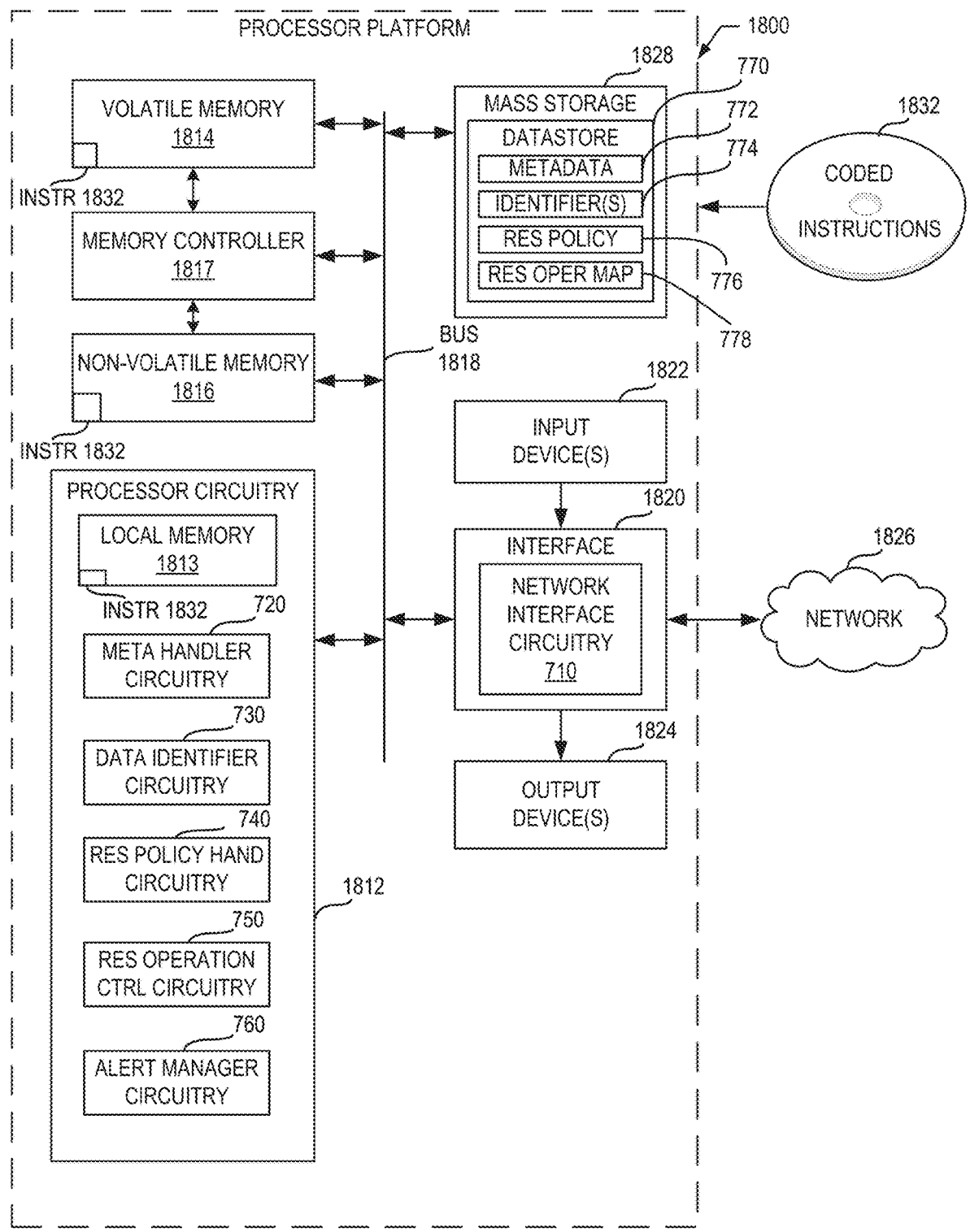
FIG. 18 is a block diagram of an example processing platform including processor circuitry structured to execute the example machine readable instructions and/or the example operations of FIGS. 13-15 to implement the example RCN of FIGS. 6 and/or 7.

FIG. 18 is a block diagram of an example processor platform 1800 structured to execute and/or instantiate the machine readable instructions and/or the operations of FIGS. 13-15 to implement the RCN 602 of FIG. 6 and/or the resilient control circuitry 700 of FIG. 7. The processor platform 1800 can be, for example, a server, a personal computer, a workstation, a self-learning machine (e.g., a neural network), or any other type of computing device.

The processor platform 1800 of the illustrated example includes processor circuitry 1812. The processor circuitry 1812 of the illustrated example is hardware. For example, the processor circuitry 1812 can be implemented by one or more integrated circuits, logic circuits, FPGAs microprocessors, CPUs, GPUs, DSPs, and/or microcontrollers from any desired family or manufacturer. The processor circuitry 1812 may be implemented by one or more semiconductor based (e.g., silicon based) devices. In this example, the processor circuitry 1812 implements the example metadata handler circuitry 720 (identified by META HANDLER CIRCUITRY), the example data identifier circuitry 730, the example resiliency policy handler circuitry 740 (identified by RES POLICY HAND CIRCUITRY), the example resiliency operation control circuitry 750 (identified by RES OPERATION CTRL CIRCUITRY), and the example alert manager circuitry 760 of FIG. 7.

The processor circuitry 1812 of the illustrated example includes a local memory 1813 (e.g., a cache, registers, etc.). The processor circuitry 1812 of the illustrated example is in communication with a main memory including a volatile memory 1814 and a non-volatile memory 1816 by a bus 1818. In some examples, the bus 1818 may implement the bus 780 of FIG. 7. The volatile memory 1814 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1816 may be implemented by flash memory and/or any other desired type of memory device. Access to the main memory 1814, 1816 of the illustrated example is controlled by a memory controller 1817.

The processor platform 1800 of the illustrated example also includes interface circuitry 1820. The interface circuitry 1820 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface. In this example, the interface circuitry 1820 implements the network interface circuitry 710 of FIG. 7.

In the illustrated example, one or more input devices 1822 are connected to the interface circuitry 1820. The input device(s) 1822 permit(s) a user to enter data and/or commands into the processor circuitry 1812. The input device(s) 1822 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1824 are also connected to the interface circuitry 1820 of the illustrated example. The output device(s) 1824 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1820 of the illustrated example, thus, typically includes a graphics driver card, a graphics driver chip, and/or graphics processor circuitry such as a GPU.

The interface circuitry 1820 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1826. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1800 of the illustrated example also includes one or more mass storage devices 1828 to store software and/or data. Examples of such mass storage devices 1828 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives. In this example, the one or more mass storage devices 1828 implement the example datastore 770 of FIG. 7, which includes the example metadata 772, the example identifier(s) 774, the example resiliency policy 776 (identified by RES POLICY), and the example resiliency operation map 778 (identified by RES OPER MAP) of FIG. 7.

The machine executable instructions 1832, which may be implemented by the machine readable instructions of FIGS. 13-15, may be stored in the mass storage device 1828, in the volatile memory 1814, in the non-volatile memory 1816, and/or on a removable non-transitory computer readable storage medium such as a CD or DVD.

Figure 19:
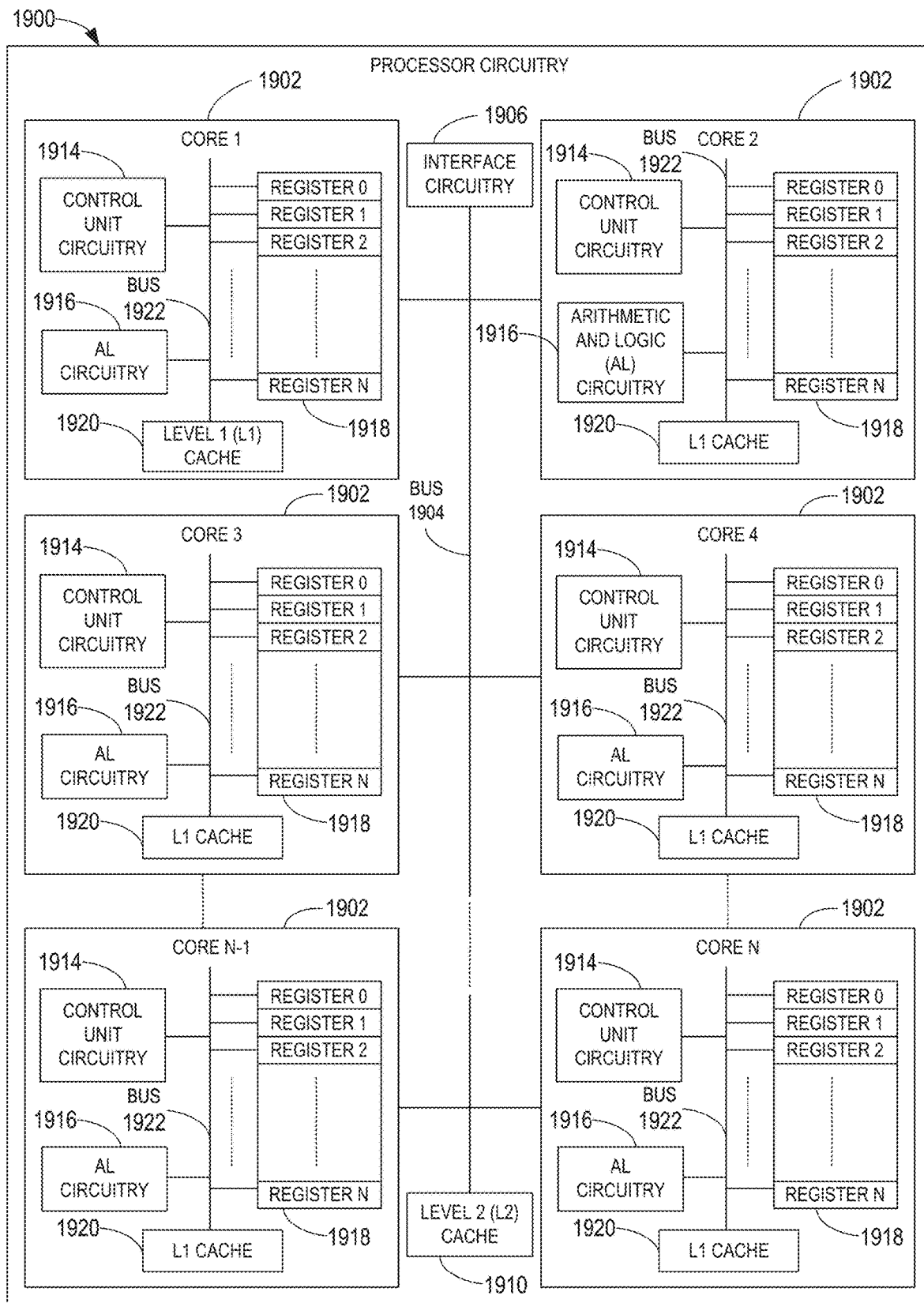
FIG. 19 is a block diagram of an example implementation of the processor circuitry of FIG. 18.

FIG. 19 is a block diagram of an example implementation of the processor circuitry 1812 of FIG. 18. In this example, the processor circuitry 1812 of FIG. 18 is implemented by a general purpose microprocessor 1900. The general purpose microprocessor circuitry 1900 execute some or all of the machine readable instructions of the flowcharts of FIGS. 13-15 to effectively instantiate the resilient control circuitry 700 of FIG. 7 as logic circuits to perform the operations corresponding to those machine readable instructions. For example, the microprocessor 1900 may implement multi-core hardware circuitry such as a CPU, a DSP, a GPU, an XPU, etc. Although it may include any number of example cores 1902 (e.g., 1 core), the microprocessor 1900 of this example is a multi-core semiconductor device including N cores. The cores 1902 of the microprocessor 1900 may operate independently or may cooperate to execute machine readable instructions. For example, machine code corresponding to a firmware program, an embedded software program, or a software program may be executed by one of the cores 1902 or may be executed by multiple ones of the cores 1902 at the same or different times. In some examples, the machine code corresponding to the firmware program, the embedded software program, or the software program is split into threads and executed in parallel by two or more of the cores 1902. The software program may correspond to a portion or all of the machine readable instructions and/or operations represented by the flowchart of FIG. _.

The cores 1902 may communicate by a first example bus 1904. In some examples, the first bus 1904 may implement a communication bus to effectuate communication associated with one(s) of the cores 1902. For example, the first bus 1904 may implement at least one of an Inter-Integrated Circuit (I2C) bus, a Serial Peripheral Interface (SPI) bus, a PCI bus, or a PCIe bus. Additionally or alternatively, the first bus 1904 may implement any other type of computing or electrical bus. The cores 1902 may obtain data, instructions, and/or signals from one or more external devices by example interface circuitry 1906. The cores 1902 may output data, instructions, and/or signals to the one or more external devices by the interface circuitry 1906. Although the cores 1902 of this example include example local memory 1920 (e.g., Level 1 (L1) cache that may be split into an L1 data cache and an L1 instruction cache), the microprocessor 1900 also includes example shared memory 1910 that may be shared by the cores (e.g., Level 2 (L2_ cache)) for high-speed access to data and/or instructions. Data and/or instructions may be transferred (e.g., shared) by writing to and/or reading from the shared memory 1910. The local memory 1920 of each of the cores 1902 and the shared memory 1910 may be part of a hierarchy of storage devices including multiple levels of cache memory and the main memory (e.g., the main memory 1814, 1816 of FIG. 18). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1902 may be referred to as a CPU, DSP, GPU, etc., or any other type of hardware circuitry. Each core 1902 includes control unit circuitry 1914, arithmetic and logic (AL) circuitry (sometimes referred to as an ALU) 1916, a plurality of registers 1918, the L1 cache 1920, and a second example bus 1922. Other structures may be present. For example, each core 1902 may include vector unit circuitry, single instruction multiple data (SIMD) unit circuitry, load/store unit (LSU) circuitry, branch/jump unit circuitry, floating-point unit (FPU) circuitry, etc. The control unit circuitry 1914 includes semiconductor-based circuits structured to control (e.g., coordinate) data movement within the corresponding core 1902. The AL circuitry 1916 includes semiconductor-based circuits structured to perform one or more mathematic and/or logic operations on the data within the corresponding core 1902. The AL circuitry 1916 of some examples performs integer based operations. In other examples, the AL circuitry 1916 also performs floating point operations. In yet other examples, the AL circuitry 1916 may include first AL circuitry that performs integer based operations and second AL circuitry that performs floating point operations. In some examples, the AL circuitry 1916 may be referred to as an Arithmetic Logic Unit (ALU). The registers 1918 are semiconductor-based structures to store data and/or instructions such as results of one or more of the operations performed by the AL circuitry 1916 of the corresponding core 1902. For example, the registers 1918 may include vector register(s), SIMD register(s), general purpose register (s), flag register(s), segment register(s), machine specific register(s), instruction pointer register(s), control register(s), debug register(s), memory management register(s), machine check register(s), etc. The registers 1918 may be arranged in a bank as shown in FIG. 19. Alternatively, the registers 1918 may be organized in any other arrangement, format, or structure including distributed throughout the core 1902 to shorten access time. The second bus 1922 may implement at least one of an I2C bus, a SPI bus, a PCI bus, or a PCIe bus Each core 1902 and/or, more generally, the microprocessor 1900 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1900 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 20:
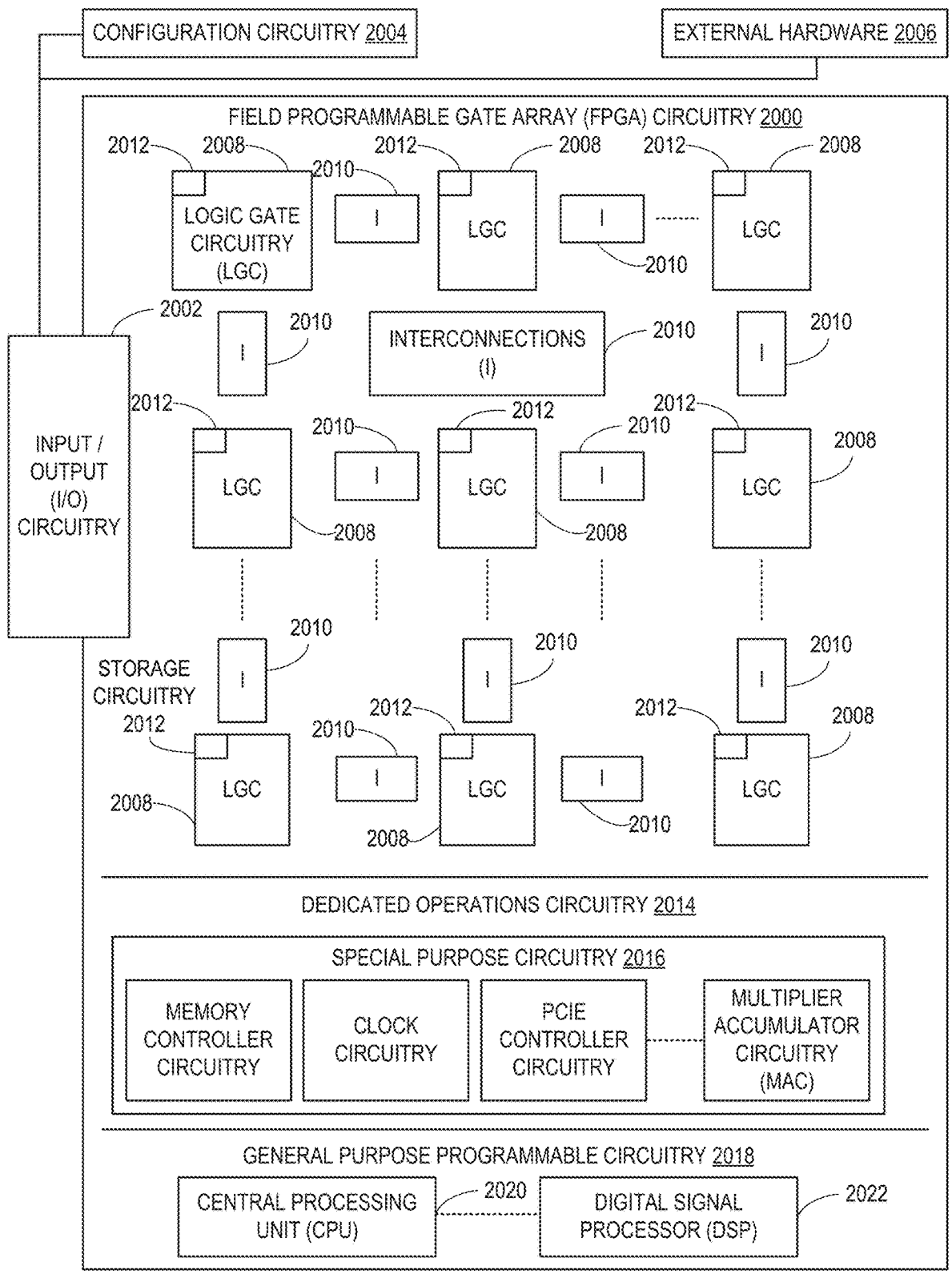
FIG. 20 is a block diagram of another example implementation of the processor circuitry of FIG. 18.

FIG. 20 is a block diagram of another example implementation of the processor circuitry 1812 of FIG. 18. In this example, the processor circuitry 1812 is implemented by FPGA circuitry 2000. The FPGA circuitry 2000 can be used, for example, to perform operations that could otherwise be performed by the example microprocessor 1900 of FIG. 19 executing corresponding machine readable instructions. However, once configured, the FPGA circuitry 2000 instantiates the machine readable instructions in hardware and, thus, can often execute the operations faster than they could be performed by a general purpose microprocessor executing the corresponding software.

More specifically, in contrast to the microprocessor 1900 of FIG. 19 described above (which is a general purpose device that may be programmed to execute some or all of the machine readable instructions represented by the flowcharts of FIG. 13-15 but whose interconnections and logic circuitry are fixed once fabricated), the FPGA circuitry 2000 of the example of FIG. 20 includes interconnections and logic circuitry that may be configured and/or interconnected in different ways after fabrication to instantiate, for example, some or all of the machine readable instructions represented by the flowcharts of FIGS. 13-15. In particular, the FPGA 2000 may be thought of as an array of logic gates, interconnections, and switches. The switches can be programmed to change how the logic gates are interconnected by the interconnections, effectively forming one or more dedicated logic circuits (unless and until the FPGA circuitry 2000 is reprogrammed). The configured logic circuits enable the logic gates to cooperate in different ways to perform different operations on data received by input circuitry. Those operations may correspond to some or all of the software represented by the flowcharts of FIGS. 13-15. As such, the FPGA circuitry 2000 may be structured to effectively instantiate some or all of the machine readable instructions of the flowcharts of FIGS. 13-15 as dedicated logic circuits to perform the operations corresponding to those software instructions in a dedicated manner analogous to an ASIC. Therefore, the FPGA circuitry 2000 may perform the operations corresponding to the some or all of the machine readable instructions of FIGS. 13-15 faster than the general purpose microprocessor can execute the same.

In the example of FIG. 20, the FPGA circuitry 2000 is structured to be programmed (and/or reprogrammed one or more times) by an end user by a hardware description language (HDL) such as Verilog. The FPGA circuitry 2000 of FIG. 20, includes example input/output (I/O) circuitry 2002 to obtain and/or output data to/from example configuration circuitry 2004 and/or external hardware (e.g., external hardware circuitry) 2006. For example, the configuration circuitry 2004 may implement interface circuitry that may obtain machine readable instructions to configure the FPGA circuitry 2000, or portion(s) thereof. In some such examples, the configuration circuitry 2004 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 2006 may implement the microprocessor 1900 of FIG. 19. The FPGA circuitry 2000 also includes an array of example logic gate circuitry 2008, a plurality of example configurable interconnections 2010, and example storage circuitry 2012. The logic gate circuitry 2008 and interconnections 2010 are configurable to instantiate one or more operations that may correspond to at least some of the machine readable instructions of FIGS. 13-15 and/or other desired operations. The logic gate circuitry 2008 shown in FIG. 20 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 2008 to enable configuration of the electrical structures and/or the logic gates to form circuits to perform desired operations. The logic gate circuitry 2008 may include other electrical structures such as look-up tables (LUTs), registers (e.g., flip-flops or latches), multiplexers, etc.

The interconnections 2010 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 2008 to program desired logic circuits.

The storage circuitry 2012 of the illustrated example is structured to store result(s) of the one or more of the operations performed by corresponding logic gates. The storage circuitry 2012 may be implemented by registers or the like. In the illustrated example, the storage circuitry 2012 is distributed amongst the logic gate circuitry 2008 to facilitate access and increase execution speed.

The example FPGA circuitry 2000 of FIG. 20 also includes example Dedicated Operations Circuitry 2014. In this example, the Dedicated Operations Circuitry 2014 includes special purpose circuitry 2016 that may be invoked to implement commonly used functions to avoid the need to program those functions in the field. Examples of such special purpose circuitry 2016 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 2000 may also include example general purpose programmable circuitry 2018 such as an example CPU 2020 and/or an example DSP 2022. Other general purpose programmable circuitry 2018 may additionally or alternatively be present such as a GPU, an XPU, etc., that can be programmed to perform other operations.

Although FIGS. 19 and 20 illustrate two example implementations of the processor circuitry 1812 of FIG. 18, many other approaches are contemplated. For example, as mentioned above, modern FPGA circuitry may include an on-board CPU, such as one or more of the example CPU 2020 of FIG. 20. Therefore, the processor circuitry 1812 of FIG. 18 may additionally be implemented by combining the example microprocessor 1900 of FIG. 19 and the example FPGA circuitry 2000 of FIG. 20. In some such hybrid examples, a first portion of the machine readable instructions represented by the flowcharts of FIGS. 13-15 may be executed by one or more of the cores 1902 of FIG. 19 and a second portion of the machine readable instructions represented by the flowcharts of FIGS. 13-15 may be executed by the FPGA circuitry 2000 of FIG. 20.

In some examples, the processor circuitry 1812 of FIG. 18 may be in one or more packages. For example, the processor circuitry 1900 of FIG. 19 and/or the FPGA circuitry 2000 of FIG. 20 may be in one or more packages. In some examples, an XPU may be implemented by the processor circuitry 1812 of FIG. 18, which may be in one or more packages. For example, the XPU may include a CPU in one package, a DSP in another package, a GPU in yet another package, and an FPGA in still yet another package.

Figure 21:
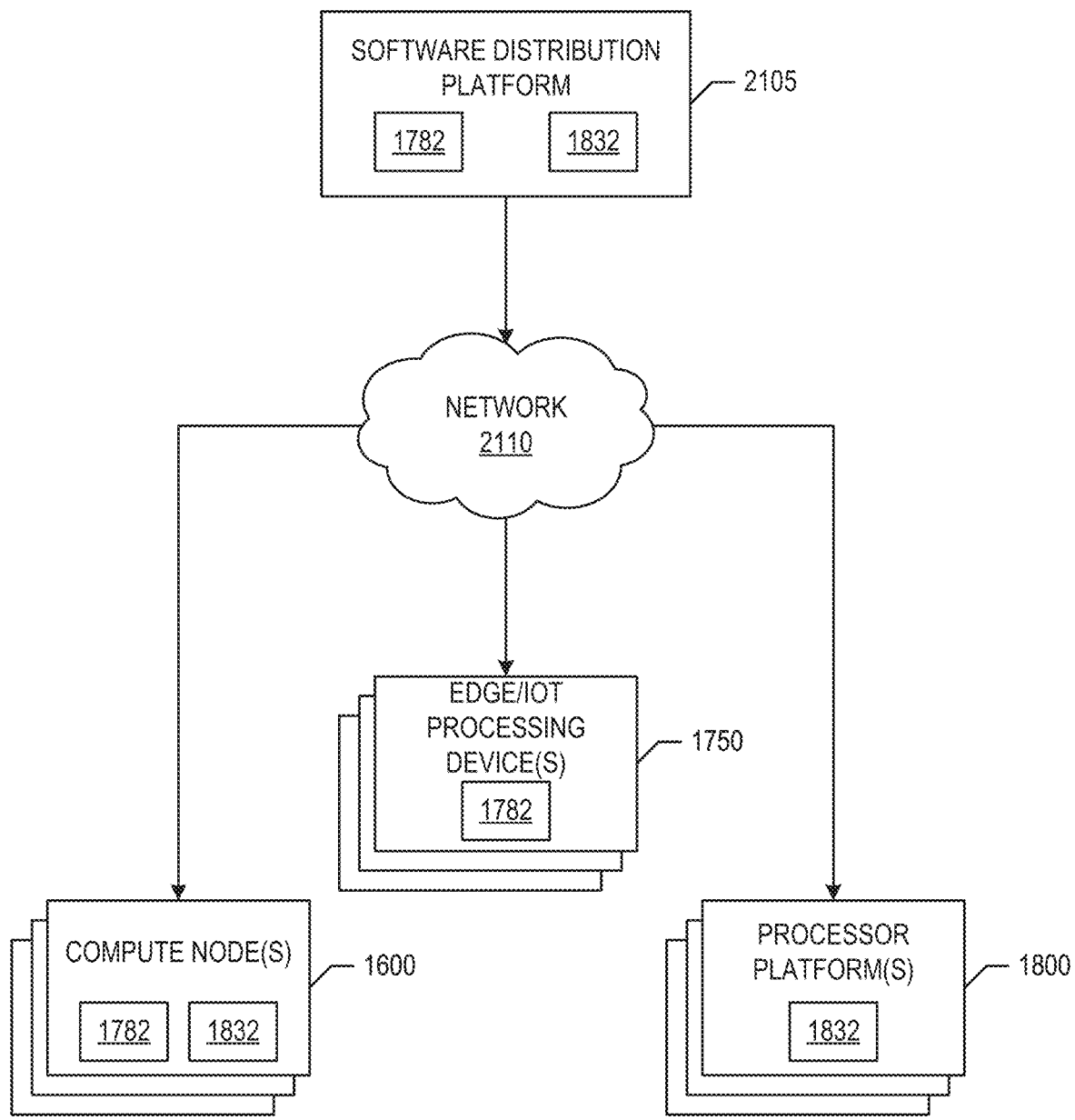
FIG. 21 is a block diagram of an example software distribution platform (e.g., one or more servers) to distribute software (e.g., software corresponding to the example machine readable instructions of FIGS. 13-15) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 2105 to distribute software such as the example machine readable instructions 1782 of FIG. 17 and/or the example machine readable instructions 1832 of FIG. 18 to hardware devices owned and/or operated by third parties is illustrated in FIG. 21. The example software distribution platform 2105 may be implemented by any computer server, data facility, cloud service, etc., capable of storing and transmitting software to other computing devices. The third parties may be customers of the entity owning and/or operating the software distribution platform 2105. For example, the entity that owns and/or operates the software distribution platform 2105 may be a developer, a seller, and/or a licensor of software such as the example machine readable instructions 1782 of FIG. 17 and/or the example machine readable instructions 1832 of FIG. 18. The third parties may be consumers, users, retailers, OEMs, etc., who purchase and/or license the software for use and/or re-sale and/or sub-licensing. In the illustrated example, the software distribution platform 2105 includes one or more servers and one or more storage devices. The storage devices store the machine readable instructions 1782, 1832, which may correspond to the example machine readable instructions 1300, 1400, 1500 of FIGS. 13-15, as described above. The one or more servers of the example software distribution platform 2105 are in communication with a network 2110, which may correspond to any one or more of the Internet and/or any of the example networks 110, 1700, 1826 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1782, 1832 from the software distribution platform 2105. For example, the software, which may correspond to the example machine readable instructions 1300, 1400, 1500 of FIGS. 13-15, may be downloaded to the example compute node 1600, the example edge/IoT processing device 1750, and/or the example processor platform 1800, which is/are to execute the machine readable instructions 1782, 1832 to implement the example RCN 602 of FIG. 6 and/or the example resilient control circuitry 700 of FIG. 7. In some example, one or more servers of the software distribution platform 2105 periodically offer, transmit, and/or force updates to the software (e.g., the example machine readable instructions 1782 of FIG. 17 and/or the example machine readable instructions 1832 of FIG. 18) to ensure improvements, patches, updates, etc., are distributed and applied to the software at the end user devices.

From the foregoing, it will be appreciated that example systems, methods, apparatus, and articles of manufacture have been disclosed for improved data resiliency in a network environment, such as an edge network environment. Examples disclosed herein post-process data (e.g., prior to FAFO events or when a FAFO event is predicted to occur) such as to create spectrum data where the same data set may include representations from different possible manifestations (e.g., L1-L6 data abstractions as described above). Examples disclosed herein include low-cost and effective network resiliency strategies available for the spectrum data. Examples disclosed herein may utilize different spectrum classes than a spectrum class or level of the spectrum data of interest to recover, re-render, reconstruct, or rebuild the data. Examples disclosed herein employ AI/ML techniques to re-create a synthetic copy of lost data from other available spectrum data. Disclosed systems, methods, apparatus, and articles of manufacture improve the efficiency of using a computing device by reducing the requirement for multiple levels of data redundancy, and thereby reduce storage size considerations to store data of interest, by effectuating data recovery and/or reconstruction from different spectrum classes or levels. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture for data resiliency in an edge network environment are disclosed herein. Further examples and combinations thereof include the following:

Example 1 includes an apparatus for data resiliency, the apparatus comprising at least one memory, instructions in the apparatus, and processor circuitry to at least one of execute and/or instantiate the instructions to generate spectrum metadata based on spectrum data associated with a network environment, the spectrum metadata based on one or more types of data abstraction, determine a resiliency operation based on one or more resiliency requirements, generate a resiliency policy based on at least one of the resiliency operation or the one or more resiliency requirements, the resiliency policy representative of at least one of recovering or reconstructing the spectrum data in response to identifying a fault-attack-failure-outage (FAFO) event associated with the spectrum data, generate a resiliency operation map based on at least one of the resiliency policy or first identifiers of respective workloads associated with the network environment, the first identifiers including a second identifier, and in response to identifying a FAFO event associated with the second identifier, execute the resiliency operation based on mapping the second identifier to the resiliency operation in the resiliency operation map.

Example 2 includes the apparatus of example 1, wherein the spectrum metadata is first spectrum metadata, the respective workloads include a first workload associated with the FAFO event, and the processor circuitry is to at least one of execute and/or instantiate the instructions to extract second spectrum metadata from network traffic associated with the first workload, generate the second identifier associated with the first workload based on the second spectrum metadata, identify a data abstraction type of the second spectrum metadata, and map the second identifier and the data abstraction type to the resiliency operation in the resiliency operation map.

Example 3 includes the apparatus of example 2, wherein the processor circuitry is to at least one of execute and/or instantiate the instructions to in response to identifying the resiliency operation as a data recovery operation, execute the data recovery operation to recover the spectrum data associated with the first workload from one or more datastores, or in response to identifying the resiliency operation as a data reconstruction operation, execute the data reconstruction operation to reconstruct the spectrum data associated with the first workload based on at least one of the second spectrum metadata or third spectrum metadata.

Example 4 includes the apparatus of example 1, wherein the resiliency operation is a non-lossy operation, and the processor circuitry is to at least one of execute and/or instantiate the instructions to identify the spectrum metadata as spectrum metadata inputs, and execute the non-lossy operation on the spectrum metadata inputs to at least one of recover or reconstruct the spectrum data.

Example 5 includes the apparatus of example 1, wherein the resiliency operation is a lossy operation, and the processor circuitry is to at least one of execute and/or instantiate the instructions to identify the spectrum metadata as spectrum metadata inputs, and execute the lossy operation on the spectrum metadata inputs to reconstruct the spectrum data.

Example 6 includes the apparatus of example 1, wherein the resiliency operation is an inference operation, and the processor circuitry is to at least one of execute and/or instantiate the instructions to identify the spectrum metadata as spectrum metadata inputs, and execute a machine-learning model using the spectrum metadata inputs as model inputs to reconstruct the spectrum data as model outputs.

Example 7 includes the apparatus of example 1, wherein the processor circuitry is to at least one of execute and/or instantiate the instructions to execute the resiliency operation as a distributed ledger operation, a digital twin operation, a secondary node operation, a cloud backup pool operation, an archive operation, or a local node backup operation.

Example 8 includes a non-transitory computer readable storage medium comprising instructions that, when executed, cause processor circuitry to at least generate spectrum metadata based on spectrum data associated with a network environment, the spectrum metadata based on one or more types of data abstraction, determine a resiliency operation based on one or more resiliency requirements, generate a resiliency policy based on at least one of the resiliency operation or the one or more resiliency requirements, the resiliency policy representative of at least one of recovering or reconstructing the spectrum data in response to identifying a fault-attack-failure-outage (FAFO) event associated with the spectrum data, generate a resiliency operation map based on at least one of the resiliency policy or first identifiers of respective workloads associated with the network environment, the first identifiers including a second identifier, and in response to identifying a FAFO event associated with the second identifier, execute the resiliency operation based on mapping the second identifier to the resiliency operation in the resiliency operation map.

Example 9 includes the non-transitory computer readable storage medium of example 8, wherein the spectrum metadata is first spectrum metadata, the respective workloads include a first workload associated with the FAFO event, and the instructions, when executed, cause the processor circuitry to extract second spectrum metadata from network traffic associated with the first workload, generate the second identifier associated with the first workload based on the second spectrum metadata, identify a data abstraction type of the second spectrum metadata, and map the second identifier and the data abstraction type to the resiliency operation in the resiliency operation map.

Example 10 includes the non-transitory computer readable storage medium of example 9, wherein the instructions, when executed, cause the processor circuitry to in response to identifying the resiliency operation as a data recovery operation, execute the data recovery operation to recover the spectrum data associated with the first workload from one or more datastores, or in response to identifying the resiliency operation as a data reconstruction operation, execute the data reconstruction operation to reconstruct the spectrum data associated with the first workload based on at least one of the second spectrum metadata or third spectrum metadata.

Example 11 includes the non-transitory computer readable storage medium of example 8, wherein the resiliency operation is a non-lossy operation, and the instructions, when executed, cause the processor circuitry to identify the spectrum metadata as spectrum metadata inputs, and execute the non-lossy operation on the spectrum metadata inputs to at least one of recover or reconstruct the spectrum data.

Example 12 includes the non-transitory computer readable storage medium of example 8, wherein the resiliency operation is a lossy operation, and the instructions, when executed, cause the processor circuitry to identify the spectrum metadata as spectrum metadata inputs, and execute the lossy operation on the spectrum metadata inputs to reconstruct the spectrum data.

Example 13 includes the non-transitory computer readable storage medium of example 8, wherein the resiliency operation is an inference operation, and the instructions, when executed, cause the processor circuitry to identify the spectrum metadata as spectrum metadata inputs, and execute a machine-learning model using the spectrum metadata inputs as model inputs to reconstruct the spectrum data as model outputs.

Example 14 includes the non-transitory computer readable storage medium of example 8, wherein the instructions, cause the processor circuitry to execute the resiliency operation as a distributed ledger operation, a digital twin operation, a secondary node operation, a cloud backup pool operation, an archive operation, or a local node backup operation.

Example 15 includes a method for data resiliency, the method comprising generating spectrum metadata based on spectrum data associated with a network environment, the spectrum metadata based on one or more types of data abstraction, determining a resiliency operation based on one or more resiliency requirements, generating a resiliency policy based on at least one of the resiliency operation or the one or more resiliency requirements, the resiliency policy representative of at least one of recovering or reconstructing the spectrum data in response to identifying a fault-attack-failure-outage (FAFO) event associated with the spectrum data, generating a resiliency operation map based on at least one of the resiliency policy or first identifiers of respective workloads associated with the network environment, the first identifiers including a second identifier, and in response to identifying a FAFO event associated with the second identifier, executing the resiliency operation based on mapping the second identifier to the resiliency operation in the resiliency operation map.

Example 16 includes the method of example 15, wherein the spectrum metadata is first spectrum metadata, the respective workloads include a first workload associated with the FAFO event, and further including extracting second spectrum metadata from network traffic associated with the first workload, generating the second identifier associated with the first workload based on the second spectrum metadata, identifying a data abstraction type of the second spectrum metadata, and mapping the second identifier and the data abstraction type to the resiliency operation in the resiliency operation map.

Example 17 includes the method of example 16, further including in response to identifying the resiliency operation as a data recovery operation, executing the data recovery operation to recover the spectrum data associated with the first workload from one or more datastores, or in response to identifying the resiliency operation as a data reconstruction operation, executing the data reconstruction operation to reconstruct the spectrum data associated with the first workload based on at least one of the second spectrum metadata or third spectrum metadata.

Example 18 includes the method of example 15, wherein the resiliency operation is a non-lossy operation, and further including identifying the spectrum metadata as spectrum metadata inputs, and executing the non-lossy operation on the spectrum metadata inputs to at least one of recover or reconstruct the spectrum data.

Example 19 includes the method of example 15, wherein the resiliency operation is a lossy operation, and further including identifying the spectrum metadata as spectrum metadata inputs, and executing the lossy operation on the spectrum metadata inputs to reconstruct the spectrum data.

Example 20 includes the method of example 15, wherein the resiliency operation is an inference operation, and further including identifying the spectrum metadata as spectrum metadata inputs, and executing a machine-learning model using the spectrum metadata inputs as model inputs to reconstruct the spectrum data as model outputs.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus comprising:
at least one memory;
instructions; and
at least one processor circuit to at least one of execute or instantiate the instructions to:
generate spectrum metadata based on spectrum data associated with a network environment, the spectrum data having first data of a first data abstraction and second data of a second data abstraction, the spectrum metadata based on the first data abstraction and the second data abstraction, the first data abstraction corresponds to data for a first operation, and the second data abstraction corresponds to data for a second operation;

generate a resiliency policy based on a resiliency requirement, the resiliency policy representative of at least one of recovering or reconstructing the spectrum data based on a fault-attack-failure-outage (FAFO) event associated with the spectrum data;

generate a resiliency operation map based on the resiliency policy and a workload associated with the network environment, the resiliency operation map representative of an association of the first data abstraction to a first resiliency operation of the resiliency policy and an association of the second data abstraction to a second resiliency after identifying the FAFO event associated with the workload, execute the first resiliency operation based on the association of the first data of the first data abstraction in the resiliency operation map.

2. The apparatus of claim 1, wherein the spectrum metadata is first spectrum metadata, and the one or more of the at least one processor circuit is to:

extract second spectrum metadata from network traffic associated with the workload, the second spectrum metadata based on third data of a third data abstraction;

generate a third resiliency operation of the resiliency policy associated with the workload based on the third data of the second spectrum metadata; and map the third data abstraction to the third resiliency operation in the resiliency operation map.

3. The apparatus of claim 2, wherein the one or more of the at least one processor circuit is to:

after identifying the second resiliency operation as a data recovery operation, execute the data recovery operation to recover the second data of the spectrum data associated with the workload from one or more datastores; or after identifying the third resiliency operation as a data reconstruction operation, execute the data reconstruction operation to reconstruct the third data of the spectrum data associated with the first workload based on at least one of the second spectrum metadata or third spectrum metadata.

4. The apparatus of claim 1, wherein the first resiliency operation is a non-lossy operation, and one or more of the at least one processor circuit is to:

identify the spectrum metadata as spectrum metadata inputs; and execute the non-lossy operation on the spectrum metadata inputs to at least one of recover or reconstruct the spectrum data.

5. The apparatus of claim 1, wherein the first resiliency operation is a lossy operation, and one or more of the at least one processor circuit is to:

identify the spectrum metadata as spectrum metadata inputs; and execute the lossy operation on the spectrum metadata inputs to reconstruct the spectrum data.

6. The apparatus of claim 1, wherein the first resiliency operation is an inference operation, and one or more of the at least one processor circuit is to:

identify the spectrum metadata as spectrum metadata inputs; and execute a machine-learning model using the spectrum metadata inputs as model inputs to reconstruct the spectrum data as model outputs.

7. The apparatus of claim 1, wherein one or more of the at least one processor circuit is to execute the first resiliency operation as a distributed ledger operation, a digital twin operation, a secondary node operation, a cloud backup pool operation, an archive operation, or a local node backup operation.

8. At least one non-transitory computer readable storage medium comprising instructions that cause processor circuitry to at least:

generate spectrum metadata based on spectrum data associated with a network environment, the spectrum data having first data of a first data abstraction and second data of a second data abstraction, the spectrum metadata based on the first data abstraction and the second data abstraction, the first data abstraction corresponds to data for a first operation, and the second data abstraction corresponds to data for a second operation;

generate a resiliency policy based on a resiliency requirement, the resiliency policy representative of at least one of recovering or reconstructing the spectrum data based on a fault-attack-failure-outage (FAFO) event associated with the spectrum data;

generate a resiliency operation map based on the resiliency policy and a workload associated with the network environment, the resiliency operation map representative of an association of the first data abstraction to a first resiliency operation of the resiliency policy and an association of the second data abstraction to a second resiliency operation of the resiliency policy; and after identifying the FAFO event associated with the workload, execute the first resiliency operation based on the association of the first data of the first data abstraction in the resiliency operation map.

9. The at least one non-transitory computer readable storage medium of claim 8, wherein the spectrum metadata is first spectrum metadata, and the instructions; cause the processor circuitry to:

extract second spectrum metadata from network traffic associated with the workload, the second spectrum metadata based on third data of a third data abstraction;

generate a third resiliency operation of the resiliency policy associated with the workload based on the second spectrum metadata;

identify a data abstraction type of the second spectrum metadata; and map the third data abstraction to the third resiliency operation in the resiliency operation map.

10. The at least one non-transitory computer readable storage medium of claim 9, wherein the instructions cause the processor circuitry to:

after identifying the second resiliency operation as a data recovery operation, execute the data recovery operation to recover the second data of the spectrum data associated with the workload from one or more datastores; or after identifying the third resiliency operation as a data reconstruction operation, execute the data reconstruction operation to reconstruct the third data of the spectrum data associated with the workload based on at least one of the second spectrum metadata or third spectrum metadata.

11. The at least one non-transitory computer readable storage medium of claim 8, wherein the first resiliency operation is a non-lossy operation, and the instructions cause the processor circuitry to:

identify the spectrum metadata as spectrum metadata inputs; and execute the non-lossy operation on the spectrum metadata inputs to at least one of recover or reconstruct the spectrum data.

12. The at least one non-transitory computer readable storage medium of claim 8, wherein the first resiliency operation is a lossy operation, and the instructions cause the processor circuitry to:
identify the spectrum metadata as spectrum metadata inputs; and
execute the lossy operation on the spectrum metadata inputs to reconstruct the spectrum data.

13. The at least one non-transitory computer readable storage medium of claim 8, wherein the first resiliency operation is an inference operation, and the instructions cause the processor circuitry to:
identify the spectrum metadata as spectrum metadata inputs; and
execute a machine-learning model using the spectrum metadata inputs as model inputs to reconstruct the spectrum data as model outputs.

14. The at least one non-transitory computer readable storage medium of claim 8, wherein the instructions cause the processor circuitry to execute the first resiliency operation as a distributed ledger operation, a digital twin operation, a secondary node operation, a cloud backup pool operation, an archive operation, or a local node backup operation.

15. A method for data resiliency, the method comprising:
generating, by executing an instruction with processor circuitry, spectrum metadata based on spectrum data associated with a network environment, the spectrum data having first data of a first data abstraction and second data of a second data abstraction, the spectrum metadata based on the first data abstraction and the second data abstraction, the first data abstraction corresponds to data for a first operation, and the second data abstraction corresponds to data for a second operation;
generating, by executing an instruction with the processor circuitry, a resiliency policy based on a resiliency requirement, the resiliency policy representative of at least one of recovering or reconstructing the spectrum data based on a fault-attack-failure-outage (FAFO) event associated with the spectrum data;
generating, by executing an instruction with the processor circuitry, a resiliency operation map based on the resiliency policy and a workload associated with the network environment, the resiliency operation map representative of an association of the first data abstraction to a first resiliency operation of the resiliency policy and an association of the second data abstraction to a second resilience operation of the resiliency policy; and
after identifying the FAFO event associated with the workload, executing, by executing an instruction with the processor circuitry, the first resiliency operation based on the association of the first data of the first data abstraction in the resiliency operation map.

16. The method of claim 15, wherein the spectrum metadata is first spectrum metadata, and including:
extracting second spectrum metadata from network traffic associated with the workload, the second spectrum metadata based on third data of a third data abstraction;
generating a third resiliency operation of the resiliency policy the associated with the workload based on the third data of the second spectrum metadata; and
mapping the third data abstraction to the third resiliency operation in the resiliency operation map.

17. The method of claim 16, including:
after identifying the second resiliency operation as a data recovery operation, executing the data recovery operation to recover the second data of the spectrum data associated with the workload from one or more datastores; or
after identifying the third resiliency operation as a data reconstruction operation, executing the data reconstruction operation to reconstruct the third data of the spectrum data associated with the first workload based on at least one of the second spectrum metadata or third spectrum metadata.

18. The method of claim 15, wherein the first resiliency operation is a non-lossy operation, and including:
identifying the spectrum metadata as spectrum metadata inputs; and
executing the non-lossy operation on the spectrum metadata inputs to at least one of recover or reconstruct the spectrum data.

19. The method of claim 15, wherein the first resiliency operation is a lossy operation, and including:
identifying the spectrum metadata as spectrum metadata inputs; and
executing the lossy operation on the spectrum metadata inputs to reconstruct the spectrum data.

20. The method of claim 15, wherein the first resiliency operation is an inference operation, and including:
identifying the spectrum metadata as spectrum metadata inputs; and
executing a machine-learning model using the spectrum metadata inputs as model inputs to reconstruct the spectrum data as model outputs.

* * * * *

UNITED STATES PATENT AND TRADEMARK OFFICE
CERTIFICATE OF CORRECTION

PATENT NO. : 12,432,111 B2
APPLICATION NO. : 17/485366
DATED : September 30, 2025
INVENTOR(S) : Smith et al.

It is certified that error appears in the above-identified patent and that said Letters Patent is hereby corrected as shown below:

In the Claims

In Column 63, Claim 1, Line 15, insert --to a second resiliency operation of the resiliency policy; and-- after 'a second resiliency'.

In Column 63, Claim 3, Line 42, delete "first".

In Column 66, Claim 15, Line 2, replace "resilience" with --resiliency--.

In Column 66, Claim 16, Line 14, replace "the associated" with --associated--.

In Column 66, Claim 17, Line 28, delete "first".

Signed and Sealed this
Twentieth Day of January, 2026

John A. Squires
*Director of the United States Patent and Trademark Office*